United States Patent

[11] 3,623,011

[72] Inventors Joseph S. Baynard, Jr.
Burlington, N.C.;
Ronald L. Coffin, Cedar Rapids, Iowa;
James E. Cullom, Greensboro, N.C.;
Nathan Ehrlich, Morris Township, Morris County, N.J.; Garner Jones, Burlington, N.C.; John W. Olson, Morris Township, Morris County, N.J.; Dennis F. Widman, Lake Hiawatha, N.J.

[21] Appl. No. 836,241
[22] Filed June 25, 1969
[45] Patented Nov. 23, 1971
[73] Assignees Bell Telephone Laboratories, Incorporated Murray Hill, N.J.
by said Coffin, said Ehrlich and said Olson; Western Electric Company, Incorporated New York, N.Y., by said Baynard, said Cullom, said Jones and said Widman

[54] TIME-SHARED ACCESS TO COMPUTER REGISTERS
24 Claims, 37 Drawing Figs.

[52] U.S. Cl. .......... 340/172.5
[51] Int. Cl. .......... G06f 11/00
[50] Field of Search .......... 340/172.5; 235/157

[56] References Cited
UNITED STATES PATENTS

| | | | |
|---|---|---|---|
| 3,213,428 | 10/1965 | Bianchi et al. | 340/172.5 |
| 3,252,149 | 5/1966 | Weida et al. | 340/172.5 |
| 3,311,890 | 3/1967 | Waaben | 340/172.5 |
| 3,336,579 | 8/1967 | Heymann | 340/172.5 |
| 3,377,471 | 4/1968 | Althaus et al. | 340/172.5 |
| 3,377,623 | 4/1968 | Reut et al. | 340/172.5 |
| 3,387,276 | 6/1968 | Reichow | 340/172.5 |
| 3,401,379 | 9/1968 | Prell et al. | 340/172.5 |
| 3,409,877 | 11/1968 | Alterman et al. | 340/172.5 |
| 3,436,734 | 4/1969 | Pomerene et al. | 340/172.5 |
| 3,525,985 | 8/1970 | Melliar-Smith | 340/172.5 |

*Primary Examiner*—Raulfe B. Zache
*Assistant Examiner*—Edward Nusbaum
*Attorneys*—R. J. Guenther and William L. Keefauver

ABSTRACT: A multiprocessor computer system is disclosed in which a number of processing units, program storage units, variable storage units and input-output units are selectively combined to form one or more independent data processing systems. A maintenance and diagnostic subsystem has access to all of the critical elements of the data processing system by means of a bussing system independent of the normal data paths. The maintenance and diagnostic subsystem uses this bussing system to test and monitor portions of the data processing system, reading data from and writing data into the various elements, as desired. The bussing system includes time-divided bilateral data links for such data reading and writing.

INVENTORS
J. S. BAYNARD, JR.
G. JONES
R. L. COFFIN
J. W. OLSON
J. E. CULLOM
D. F. WIDMAN
N. EHRLICH
BY
R.O. Nimtz
ATTORNEY

CENTRAL LOGIC AND CONTROL (FUNCTIONAL)

STORE ACCESS

PROGRAM CONTROL UNIT

FIG. 6 OPERAND CONTROL UNIT

ARITHMETIC CONTROL UNIT

VARIABLE STORE INTERFACE SWITCHING UNIT

INPUT/OUTPUT CONTROLLER AND RECORDING SUBSYSTEM

TIMING AND STATUS UNIT

STATUS UNIT

FIG. 13 TIMING GENERATOR

MAINTENANCE AND DIAGNOSTIC SUBSYSTEM

BUFFER CIRCUITS

FIG. 19A
GATE
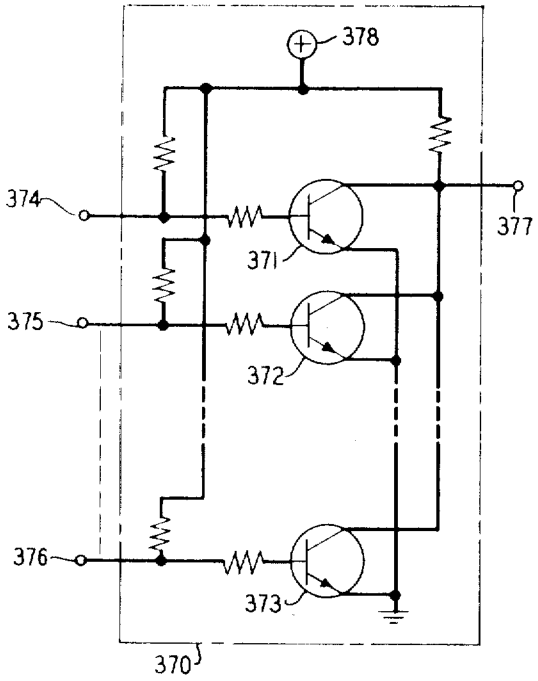
FIG. 19B
NAND
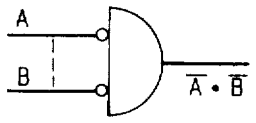
FIG. 19C
NOR
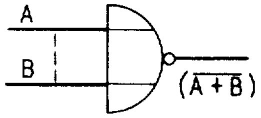
FIG. 19D
| A \ B | 0 | 1 |
|---|---|---|
| 0 | 1 | 0 |
| 1 | 0 | 0 |
FIG. 20A
FLIP FLOP
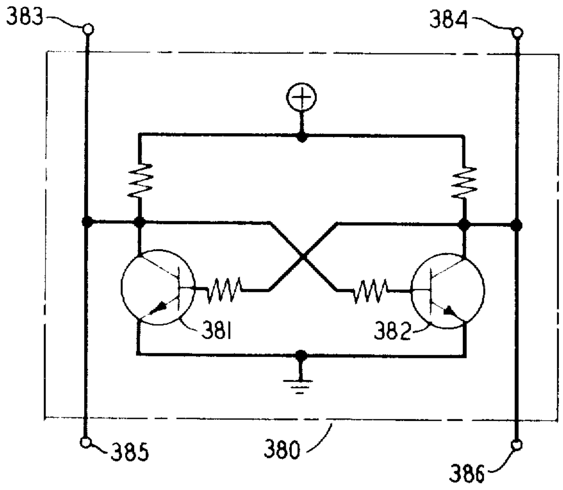
FIG. 20B
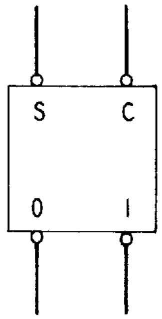

INVERTER

EMITTER FOLLOWER

CABLE DRIVER

PULSE SET AND INDICATE
(LOGIC)

PULSE SET AND INDICATE
(CIRCUIT)

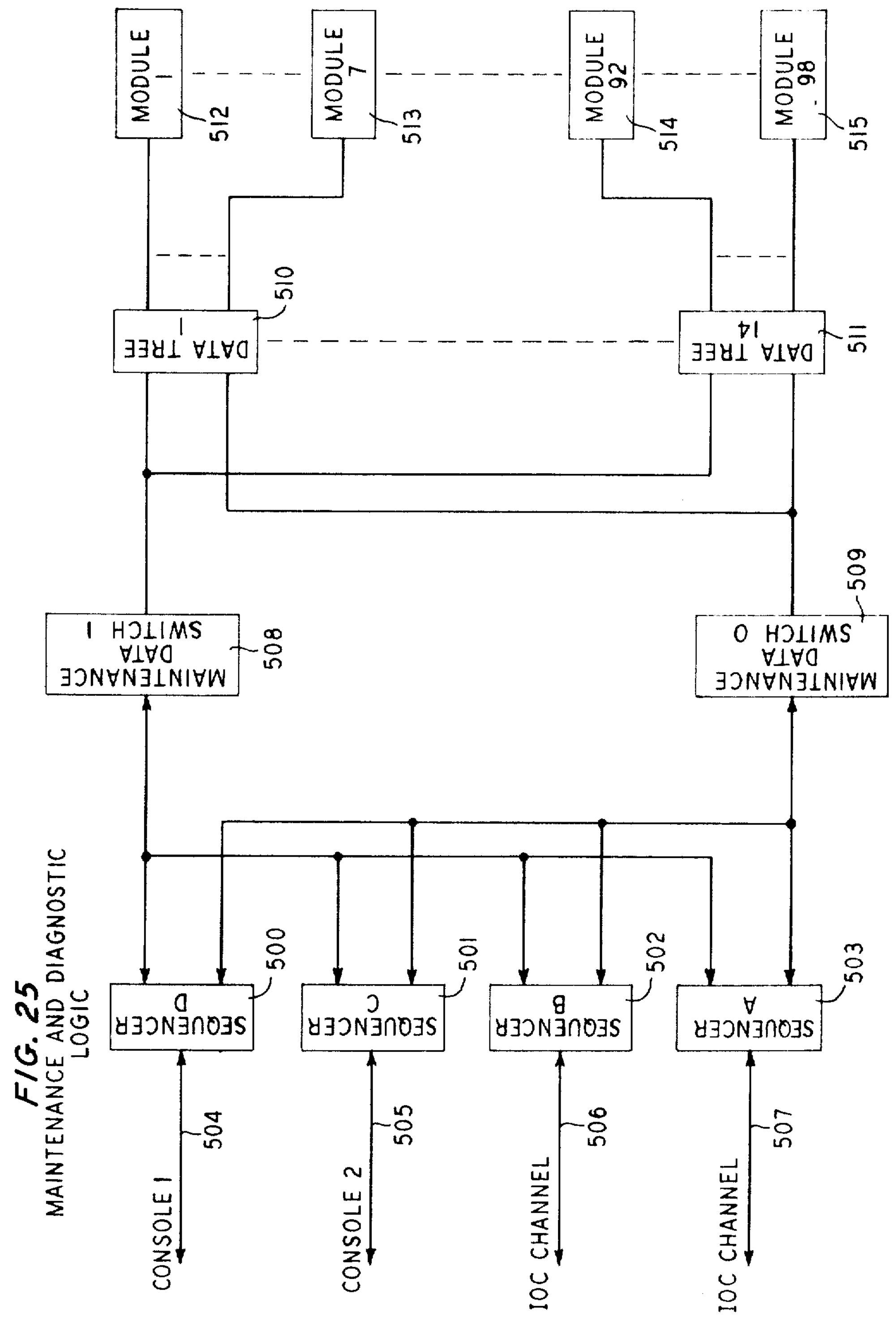
FIG. 25 MAINTENANCE AND DIAGNOSTIC LOGIC

FIG. 27 SEQUENCER

MAINTENANCE SWITCH (2 REQ'D)

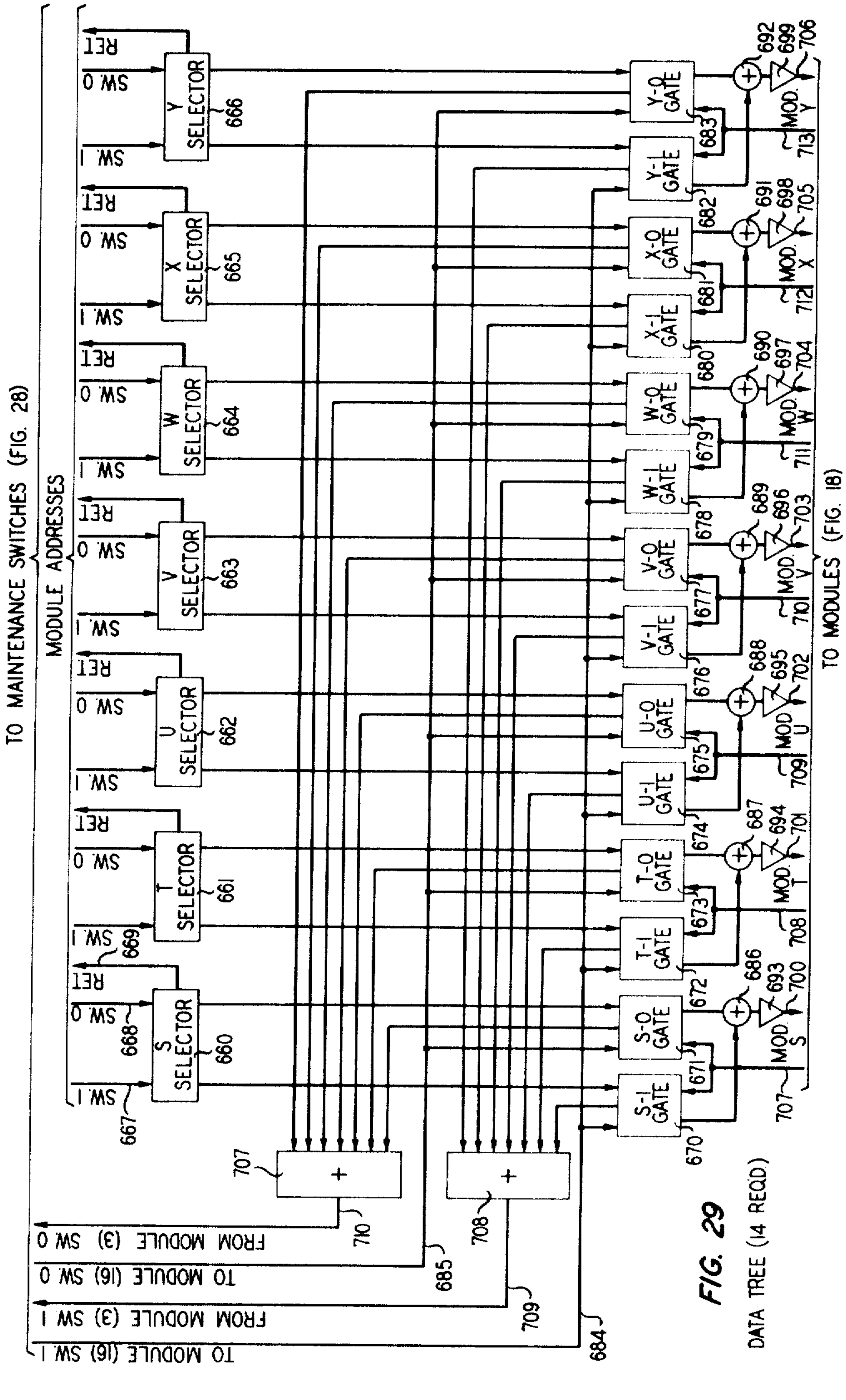
FIG. 29 DATA TREE (14 REQ'D)

TIME-SHARED ACCESS TO COMPUTER REGISTERS

GOVERNMENT CONTRACT

The invention herein claimed was made in the course of, or under contract with the Department of the Army.

FIELD OF THE INVENTION

This invention relates to multiprocessor data processing systems and, more particularly, to accessing the various registers in such systems for maintenance and diagnostic purposes.

BACKGROUND OF THE INVENTION

It has become increasingly common to construct large data processing systems in a modular fashion, permitting growth merely by adding further modules. The basic functional modules for a data processing system include the central processing unit, the memory unit and the input-output unit. In the ideal situation, the number of each of these units can be varied to produce an optimum configuration for the data processing activity for which it is being used.

One major problem with such large data processing systems is the detection and location of faults in the various parts of the system. In large systems, such detection and location of faults can consume large amounts of the data processor's time and thus reduce efficiency to a large extent.

In addition to detecting and locating faults, specific directions for correcting the fault are necessary. Until the fault is localized to a single replaceable unit, it cannot easily be repaired. This is a particularly serious problem in real time computing systems in which data processing must be continued on a real time basis.

It is an object of the present invention to reduce the down time of large data processing systems.

It is a more specific object of the invention to reduce the time required to detect, locate and correct faulty conditions in a large data processing system.

It is another object of the invention to improve the access to the significant portions of a large data processing system for maintenance and diagnostic purposes.

SUMMARY OF THE INVENTION

In accordance with the present invention, the normal data paths in a large data processing system are not alone relied on for the detection and location of faults. An independent set of data paths are provided to obtain access to all of the major portions of the data processing system.

More specifically, a data bussing system, independent of the normal data paths, is provided to obtain direct access to all of the important registers of the system. Using this bussing system, data can be entered into or read from these registers as an aid in diagnostics. Failures in the normal data paths, therefore, do not inhibit the operation of the maintenance and diagnostic system.

In order to simplify the bussing system, a special circuit, called a "Pulsed Set Indicator" (PSI) is provided to provide two-way access to the critical registers of the data processing system. A buffer chassis is provided on each module of the data processing system to interface between the register access leads within the module and a time-shared diagnostic bus to the maintenance and diagnostic center.

The above arrangements have the advantage of locating faults independently of all normal data paths, and permitting the exercising of a faulty module at a slow enough rate to permit fault isolation. Moreover, processing time on the balance of the data processing system need not be used for fault isolation. In accordance with the copending application of W. M. Artz et al. Ser. No. 836,242, filed June 25, 1969, assigned to applicants' assignee, the faulty module can be isolated from the balance of the system during fault location.

These and other objects and features, the nature of the present invention and its various advantages, will be more readily understood from a consideration of the attached drawings and from the following description of the drawings.

BRIEF DESCRIPTION OF THE DRAWINGS

In the drawings:

FIGS. 19A, 19B, 19C and 19D are a detailed circuit diagram, NAND symbol, NOR symbol, and a truth table, respectively, for a basic logic gate useful in implementing the circuits of the remainder of the drawings;

FIGS. 20A and 20B are a circuit diagram and circuit symbol, respectively, of a flip-flop circuit useful in realizing the circuits of the remainder of the drawings;

FIG. 25 is a general block diagram of the logic circuits of the maintenance and diagnostic subsystem shown in block form in FIG. 16;

FIG. 29 is a detailed block diagram of the data tree circuit shown in block form in FIG. 25.

DETAILED DESCRIPTION OF THE DRAWINGS

Figure 1:
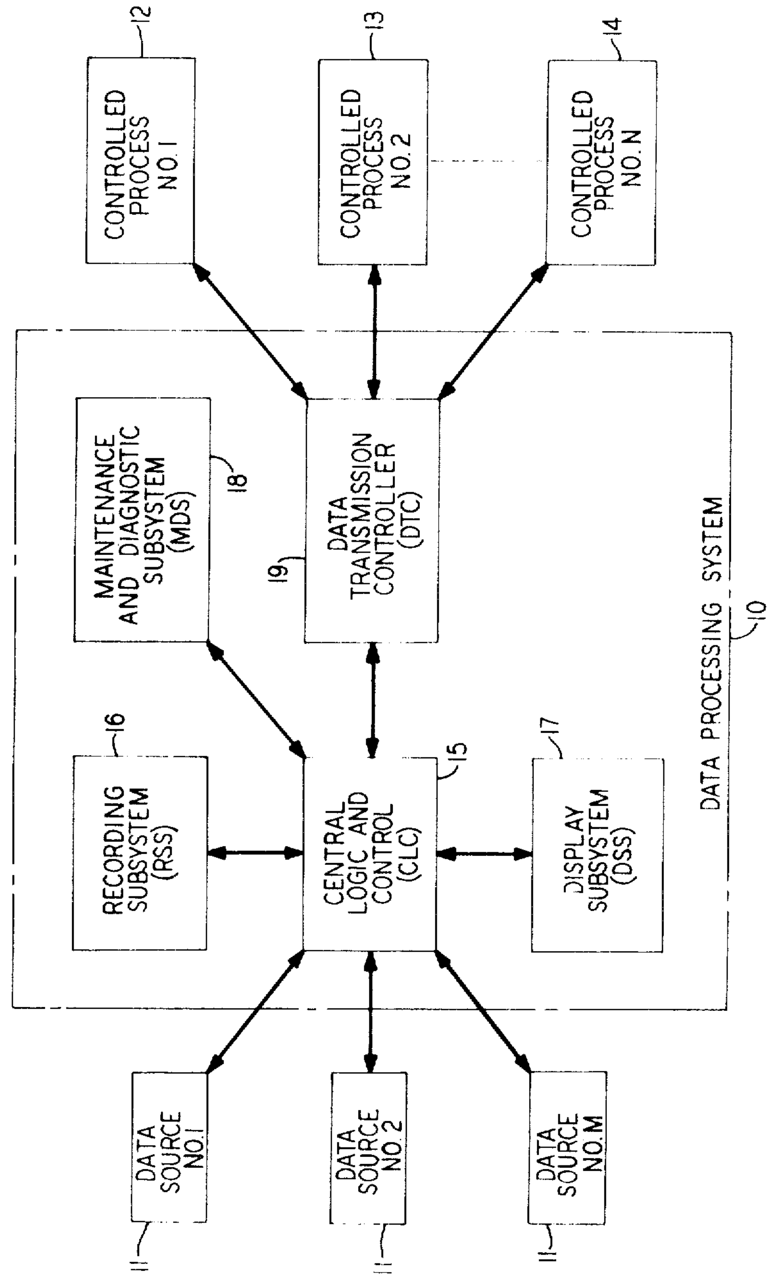
FIG. 1 is a general block diagram of a process control system utilizing a data processor and suitable for the use of the present invention.

Referring more particularly to FIG. 1, there is shown a general block diagram of a real-time data processing system 10 which accepts real-time data from data sources 11 and delivers real-time control signals to a plurality of controlled processes 12, 13 and 14. The data processing system 10 comprises a central logic and control 15 which includes the memory units, input-output control units and instruction execution units normally associated with a digital computing system. A recording subsystem 16 is associated with central logic and control 15 to provide permanent records of data derived from control 15 and to provide machine input into control 15. Subsystem 16 includes the punched card equipment, magnetic tapes and magnetic disk units normally associated with a data processing system. A display subsystem 17 is also associated with central logic and control 15 and includes a real-time display of certain of the operating characteristics of central logic and control 15.

A maintenance and diagnostic subsystem 18 is likewise associated with central logic and control 15 and includes all the circuits necessary to monitor the operation of control 15 to detect errors in that operation and to initiate the required automatic error correction or reorganization procedures. A data transmission controller 19 receives real-time data output from central logic and control 15 and utilizes this output to derive control signals for the control of processes 12, 13 and 14. Processes 12, 13 and 14 also include means for generating indication and verification signals for transmission back through transmission controller 19 to central logic and control 15 to indicate the progress and state of the operations being controlled.

The control system of FIG. 1 may be used for any real-time, computer-controlled operation such as, for example, an automatically controlled petroleum processing plant, an automated warehouse system, or even a fire control system for military applications. All such systems have in common the requirements of accepting input data in real-time, performing detailed computations on this input data, and generating output control signals in real-time. Many other applications of such a system will be readily apparent to those skilled in the art.

The central logic and control 15 of FIG. 1 is the central control element for the entire system. In situations where it is necessary to control large and complicated processes, it is necessary that substantial computing power be available in control 15. To this end, control 15 is organized on a modular basis. That is, each function required by central logic and control 15 is implemented by a plurality of identical units, the number of which may be varied to accommodate the specific data processing job required.

Figure 2:
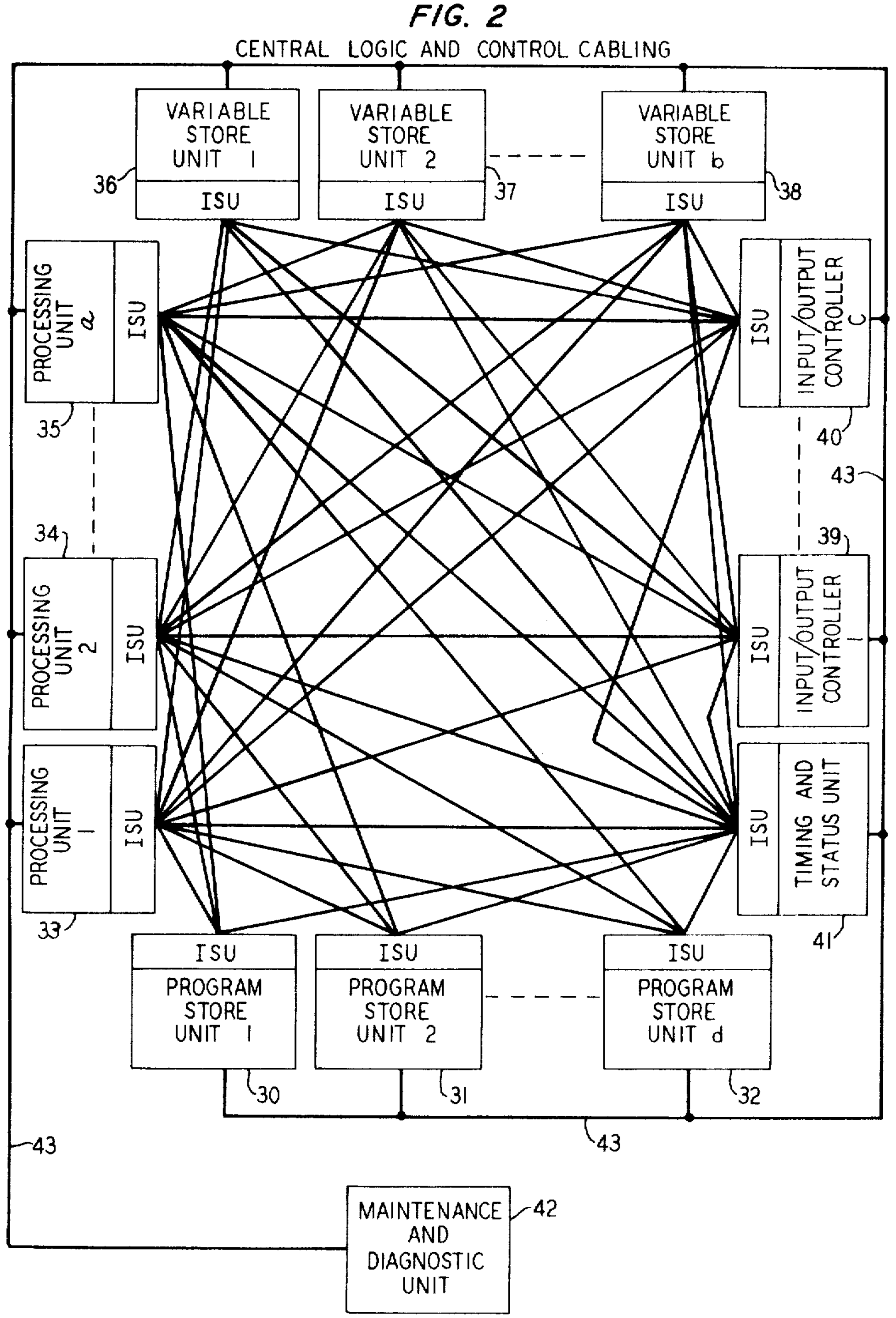
FIG. 2 is a block diagram of the interunit cabling required for the central logic and control shown in FIG. 1.

Turning then to FIG. 2, there is shown a schematic block diagram of a central logic and control suitable for use in the system such as that illustrated in FIG. 1. The basic modular units included in the central logic and control of FIG. 2 are a program store unit, a processing unit, a variable or operand store unit, an input-output controller and a timing and status unit. As can be seen in FIG. 2, a plurality of program store units 30, 31 and 32 are provided to store the sequence of machine instructions or commands necessary to operate the overall system.

A plurality of processing units 33, 34 and 35 are provided to execute the instructions when retrieved from the program store units 30 through 32. A plurality of variable store units 36, 37 and 38 are provided as temporary storage devices for data which is to serve as operands in the execution of instructions by the processing units 33 through 35. A plurality of input-output controllers 39, 40 are provided to control the transfer of data from the central logic and control of FIG. 2 to the remainder of the data processing system.

A timing and status unit 41 is provided to generate and distribute the basic timing required in the control of the system. In addition, unit 41 receives status reports in the form of binary data signals from all of the other units and records this information in appropriate registers for use in maintenance and diagnostic procedures.

In order to take full advantage of the modular arrangement of the central logic and control of FIG. 2, it is necessary that each of the units 30 through 41 be capable of interconnection with any one of the other units. This is accomplished by means of an interface switching unit (ISU) forming a portion of each of the units 30 through 41. The interface switching units terminate cables, illustrated in FIG. 2 by the solid lines, which are connected between the various units. The ISU's provide the selective gating necessary for the various connections and, also, provide a degree of priority control over the various interconnections.

A maintenance and diagnostic unit 42 is shown which serves to collect certain information from all of the other units of FIG. 2 by means of a multiplex data bus 43 and to use this information to diagnose and maintain the central logic and control. This maintenance and diagnostic unit 42 does not form a part of the central logic and control in a functional sense but is shown in FIG. 2 to illustrate the complete separation and independence of the data acquisition bus 43 from the normal data paths extending between the ISU's of the various units 30 through 41. It can thus be seen that the collection of maintenance and diagnostic information is not dependent upon the operability of all or any portion of the normal data processing paths. This considerably simplifies the monitoring function and increases reliability to a significant extent.

Figure 3:
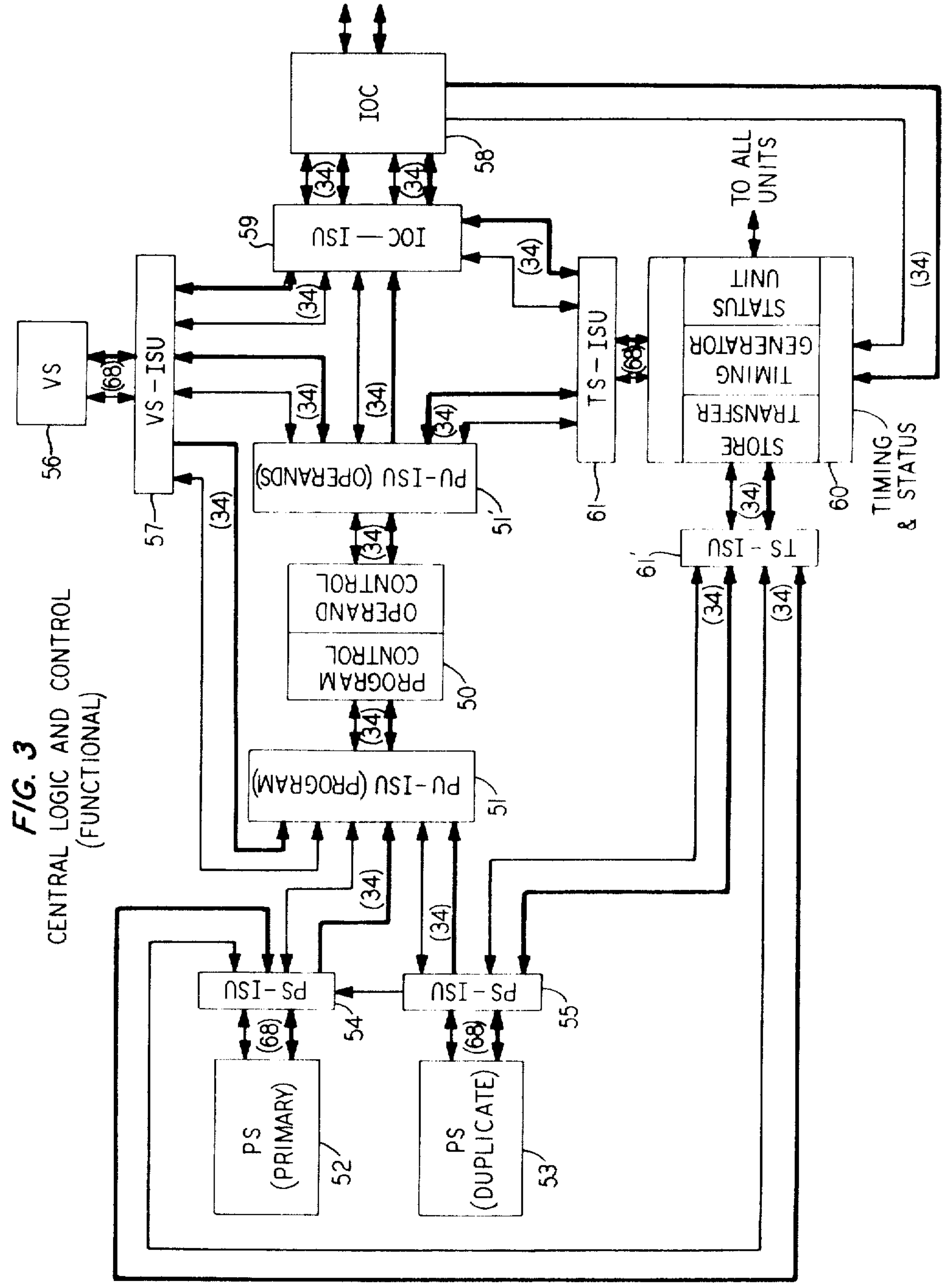
FIG. 3 is a block diagram of the functional inter-relationships within the central logic and control of FIG. 1.

In order to better understand the operation of the central logic and control, a functional block diagram is shown in FIG. 3 showing the functional interrelationship of the various units of FIG. 2. Only a single one of each type of unit is shown in FIG. 3 for the purposes of simplicity, it being understood that similar interconnections exist between the multiple units as illustrated generally in FIG. 2.

In FIG. 3, data paths are illustrated by the heavy lines and control signal paths by the lighter lines. The number of binary positions or bits carried by each line is indicated by the numbers in parentheses adjacent the heavy lines. It can be seen that uniform cabling has been achieved by standardizing the cable size to 34 bits.

Referring then to FIG. 3, it can be seen that the central logic and control comprises processing unit 50 with its associated interface switching unit 51, shown in FIG. 3 as being divided into two portions. One portion communicates with the program control portion of processing unit 50, while the other communicates with the operand portion of processing unit 50. The program control portion of processing unit 50 receives program instructions from program store units 52 and 53 by way of interface switching units 54 and 55, respectively. For purposes of reliability, the same program instructions are registered in two different program store units. Thus, program store unit 52 is identified as the primary program store, while program store unit 53 is identified as the duplicate program store unit. Identical requests for the next instruction are issued to both store units 52 and 53 and the first program store unit to respond automatically cancels the request to the other unit. In this way, if program instructions in any one program store unit are lost through malfunctions, the system can continue to operate with essentially no loss of time.

The operand control portion of processing unit 50 retrieves data from the variable store unit 52' and interface switching unit 57.

An input-output controller 58 is arranged to communicate with all of the other units by way of interface switching unit 59. That is, it may exchange data and commands with the operand control portion of processing unit 50 by way of interface switching units 51' and 59. It may also exchange data and commands with variable store unit 56 by way of interface switching units 57 and 59. Finally, it may exchange data and commands with timing and status unit 60 by way of interface switching unit 61. The input-output controller 58, of course, controls transfers of information between the central logic and control of FIG. 3 and all the other units of the data processing system shown in FIG. 1.

The timing and status unit 60 includes three independent subsystems necessary for the operation of the overall central logic and control. A store transfer subsystem controls the writing of program instructions into the program store units such as 52 and 53. Indeed, the store transfer subsystem is the only means for altering program instructions and communicates with the program store units by way of interface switching unit 61', which is actually a portion of interface switching unit 61.

The timing generator subsystem and timing and status unit 60 provides all of the timing and clock information required for the operation of the system. Utilizing master clock signals, this timing generator subsystem maintains time-of-day information and issues timed commands for synchronizing various cycles of real-time data processing.

The status unit subsystem of timing and status unit 60 maintains a current record of the status of all units of the central logic and control, and periodically transfers this information into variable store units such as unit 56. The status unit also contains the control circuit for isolation, segmentation and partitioning.

It can also be seen that the program control portion of processing unit 50 can obtain program instructions from variable store 56 by way of interface switching units 51 and 57. This permits temporary program sequences to be stored in variable store unit 56 and to be used to control processing unit 50. It will also be noted that all cables extending between the different units of the central logic and control of FIG. 3 include 34 bits of information, thus permitting uniform cable design.

As was previously noted, the central logic and control is the heart of the data processing system of FIG. 1. The central logic and control performs all of the data processing and computation required for the overall system. The central logic and control therefore includes many requestors which are capable of asynchronously requesting and receiving access to the various store units in the system. All possible pairs of these units are interconnected by direct switching paths to provide a high speed, flexible data processing capacity. The modular construction of the central logic and control permits its data processing capacity to be tailored to the needs of any particular application as well as providing high system reliability without excessive duplication. Only the program store has been duplicated in order to have full assurance that programs are available when required. Each storage unit is independent and a failure in any one unit does not disable the entire memory.

Figure 4:
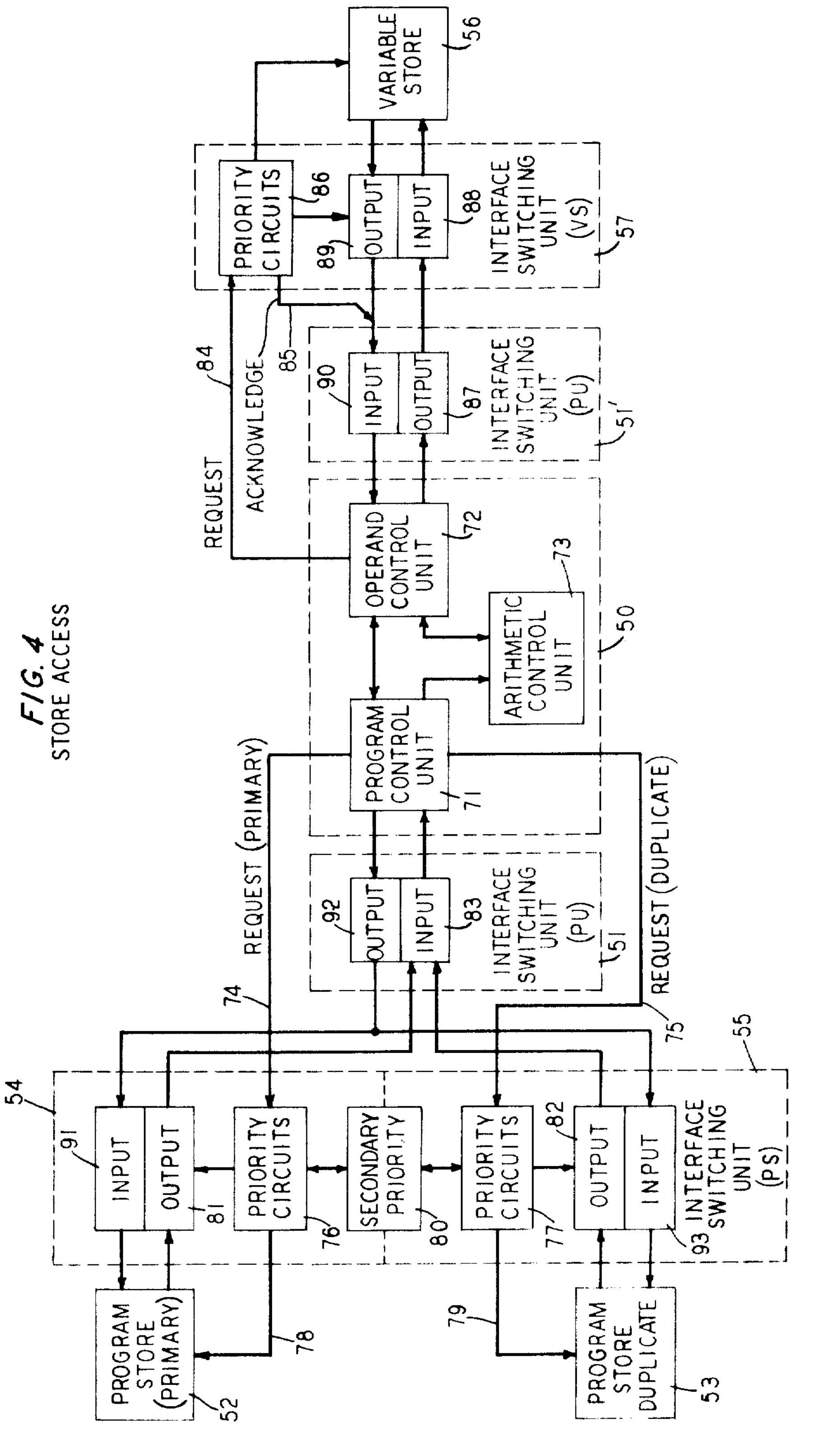
FIG. 4 is a more detailed block diagram of store access arrangements used by the processor unit of the central logic and control of FIG. 3.

In FIG. 4 there is shown a more detailed block diagram of the accessing circuits for the various store units and their relationship to the processing unit. Thus, the processing unit 50 includes a program control unit 71, an operand control unit 72 and an arithmetic control unit 73. Program control unit 71 simultaneously issues requests on leads 74 and 75 to retrieve program instructions from primary program store unit 52 and duplicate store unit 53, respectively. The request on lead 74 is applied to priority circuits 76 in interface switching unit 54. The request on lead 75 is applied to priority circuits 77 in interface switching unit 55. Priority circuits 76 and 77 form a queue of requests from the various processing unit and, when requested, attach particular priorities to the request from particular units. The request which is next to be served is applied by way of lead 78 to program store unit 52 and by way of lead 79 to program store unit 53. At the same time, an indication that the request is being serviced is applied to secondary priority circuit 80. Secondary priority circuit 80 operates to remove the duplicate request from the queue of requests in the other one of priority circuits 76 and 77.

The program store unit ultimately receiving the request also receives an instruction address from program control unit 71, by way of output buffer 92 and input buffer 91 or 93. In response to this address, the appropriate program store unit 52 or 53 delivers the requested instruction to the output buffer 81 or 82 where it is routed to the appropriate one of the processing units. Thus, in FIG. 4 it is supplied to the input buffer 83 of interface switching unit 51. Input buffer 83 serves to gather instructions requested from the various different program stores and supply these instructions to program control unit 71.

Program control unit 71 performs certain initial operations on the program instructions received from input buffer 82 and passes the instruction on to operand control unit 72 or arithmetic control unit 73. Operand control unit 72 receives the operand address portion of the instruction and issues a request on lead 84 to the addressed variable store unit to supply the data required. This request is acknowledged by way of lead 85 from priority circuit 86, which, in turn, permits operand control unit 72 to issue an address by way of output buffer 87 in interface switching unit 51' to input buffer 88 in interface switching unit 57. This address is applied to variable store unit 56 to access the required operand which, in turn, is supplied to output buffer 89 in interface switching unit 57. This operand is transferred by way of input buffer 90 in interface switching unit 51' to operand control unit 72. Using this operand data, arithmetic control unit 73 is then able to complete the execution of the program instruction.

It can be seen that each interface switching unit comprises buffers for receiving information from any one of a plurality of units and separate buffers for delivering information to any one of a plurality of other units. In addition, each interface switching unit includes priority circuits which are used to order the servicing of requests from the various other units.

Figure 5:
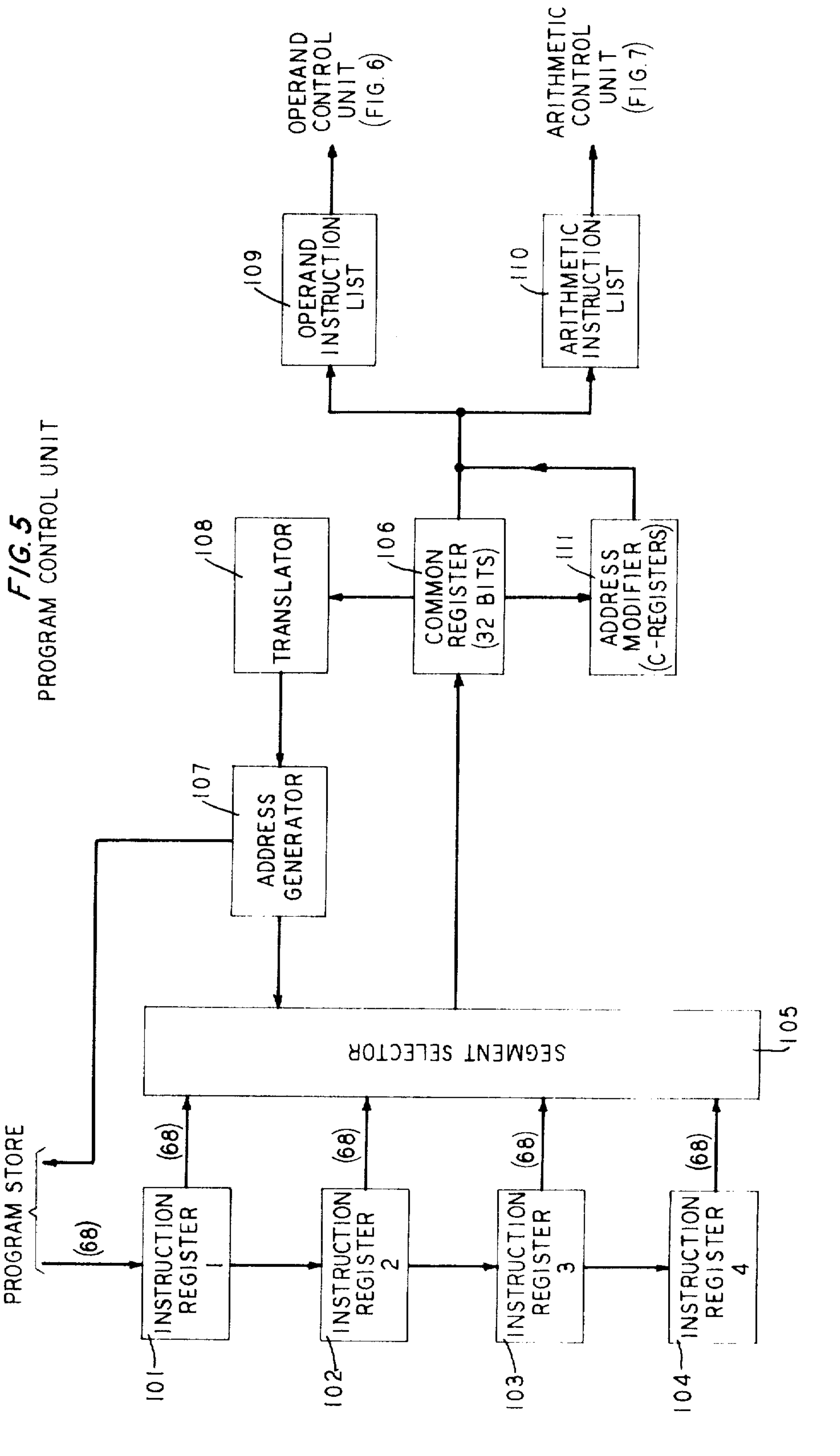
FIG. 5 is a more detailed block diagram of the program control unit of the processor unit shown in FIG. 4.

Before proceeding with the description of FIG. 5 of the drawings, it will be useful to first discuss the instruction format of the instructions received from the program store units 52 and 53 of FIG. 4. These program store units are organized into 68-bit words. That is, each address supplied to the program store unit causes a 68-bit word to be delivered to the interface switching unit. This 68-bit word is divided into 34-bit halfwords which are delivered sequentially to the processing unit.

From a functional point of view, each 68-bit program store word is divided into four, 17-bit, segments each of which includes 16 bits of instruction information and one parity bit. The parity bits are discarded prior to execution of the instructions. These instructions may be in a 16-bit format or in a 32-bit format. Thus, each segment may constitute a 16-bit instruction and any two adjacent segments may constitute a 32-bit instruction. In this context, the last segment of one program store word and the first segment of the next succeeding program store word are considered to be adjacent and may constitute a single 32-bit instruction.

Referring now to FIG. 5, there is shown a schematic block diagram of the program control unit 71 (FIG. 4) forming a portion of the processing unit 50. The program control unit of FIG. 5 comprises a four-stage instruction register including registers 101, 102, 103 and 104. Each of registers 101 through 104 is capable of storing one 68-bit program store word. Program store words are initially received by instruction register 101. Normally, as program execution proceeds, the contents of instruction register 101 are transferred to instruction register 102.

The segment 105 transfers two adjacent segments of the word in instruction register 102, or two adjacent segments of the words in instruction registers 102 and 103, to the common register 106. When all the segments of register 102 have been transferred to common register 106, the contents of each of registers 101, 102 and 103 are transferred to the next succeeding register i.e., 101 to 102, 102 to 103 and 103 to 104. At this time, the address generator 107 generates an address to initiate the fetch of the next sequential store word for entry into instruction register 101. The original contents of register 104 are destroyed by the transfer of the contents of register 103. If instruction register 102 is emptied before the new program store word is received by register 101, then this new word is immediately transferred through register 101 to register 102.

Instruction registers 103 and 104 provide storage for so-called "short loops" in which a sequence of instructions (including up to 16 segments) can be repeated any number of times without requiring additional fetches from the program store unit. This arrangement saves a considerable amount of time otherwise necessary for the extra fetches required for repeated execution.

Each program store address includes five bits which identify the appropriate one of the program store units. The next 13 bits identify one of 8192 program store words in the program store unit. Two additional bits are utilized to identify one of the four segments of each 68-bit word. One final bit is used as a parity bit. These instruction addresses are generated by address generator 107 which includes four independent program counters. These counters can be used at different times under program control to control instruction fetching. Transfer or jump instructions operate by way of translator 108 to modify the normal sequential operation of address generator 107 in order to direct the fetching of a nonsequential program store word. It should be noted that the two segment-identifying bits are transferred to segment selector 103 and hence never leave the program control unit of FIG. 5.

Instructions in the common register 106 are analyzed to determine whether they can be executed in the program control unit itself or must be forwarded to the operand control unit or the arithmetic control unit. In the latter two cases, the instructions are placed in either one of two four-stage queueing registers called the operand instruction list 109 and the arithmetic instruction list 110. In addition, address modifying circuits 111 are provided to modify the addresses of the instructions. Address modifying circuits 111 include four four-bit C-registers which are used to indicate the value of the address modification. After such modification, the instructions are passed on to instruction lists 109 and 110 as before.

Those instructions which can be retained in and executed by the program control unit of FIG. 5 are C-register manipulations, register address field modifications and jump instructions. Instructions requiring the fetching or storing of data words in the variable store units are placed in the operand instruction list 109. Instructions requiring arithmetic or logical manipulations of data normally take place in the arithmetic control unit and hence are placed in the arithmetic instruction list 110.

Figure 6:
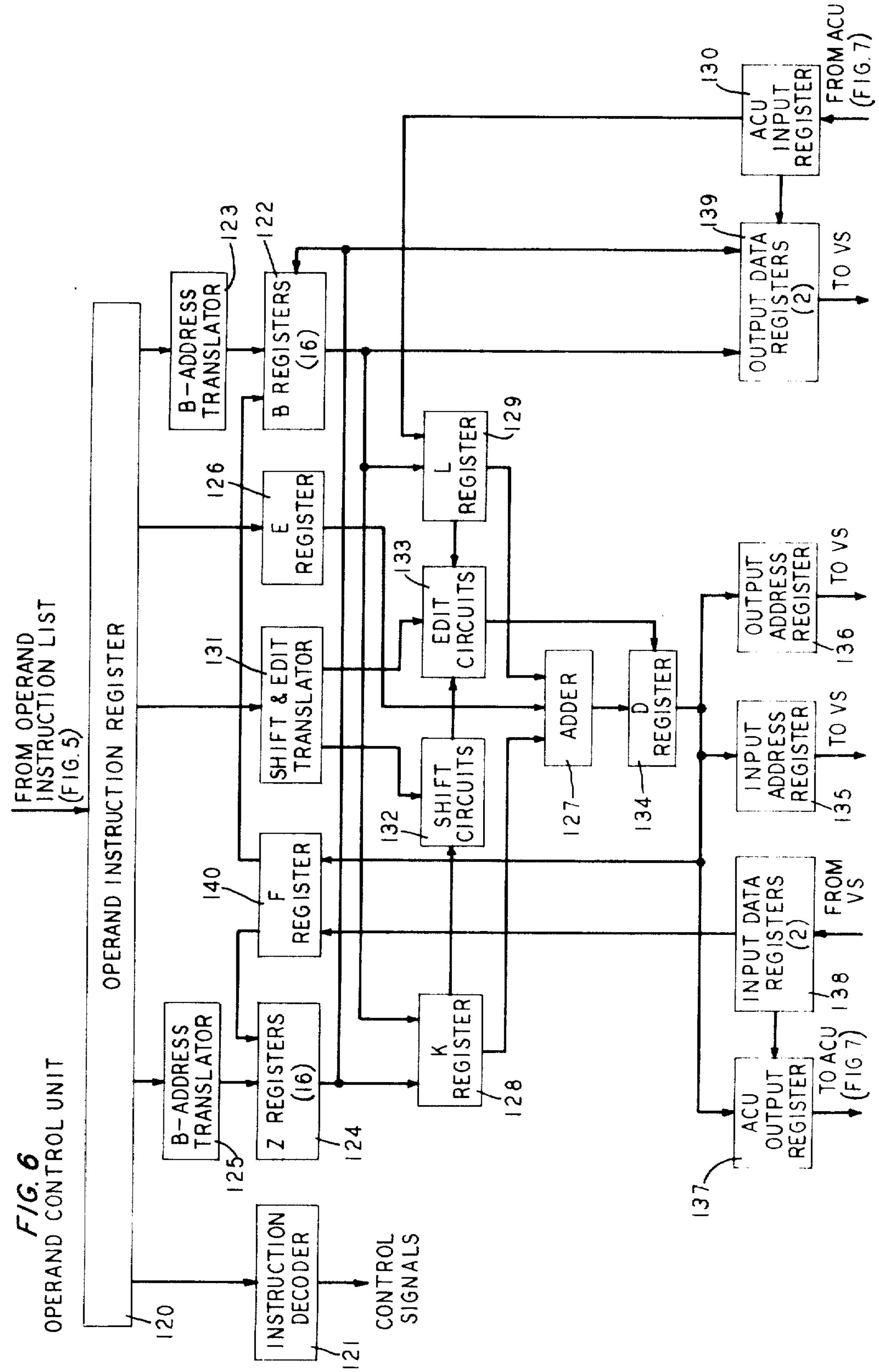
FIG. 6 is a more detailed block diagram of the operand control unit of the processor unit shown in FIG. 4.

Turning now to FIG. 6, there is shown a schematic block diagram of the operand control unit 72 (FIG. 4). The operand control unit of FIG. 6 comprises an operand instruction register 120 which receives instructions from the operand instruction list 109 in FIG. 5. The operation code portion of the instruction is supplied to instruction decoder 121 where it is decoded and control signals generated to direct the execution of the identified instruction. The operand control unit also includes 16 B-registers 122 which are used as index registers in operand address modification. A B-address translator 123 selects the appropriate one of the 16 B-registers by translating certain identifying fields of the instruction in register 120. Similarly 16 Z-registers 124 are used to store various parameters required for program interrupts. These parameters include such things as the breakpoint addresses, error recovery addresses, error return addresses and other similar quantities. A Z-address translator 125 identifies one of the 16 Z-registers by translating an appropriate field of the instruction in register 120.

The E-register 126 is used to store explicit parameters which form a portion of the instruction itself. These parameters are stored in the E-register 126 prior to arithmetic operations in a three-input adder circuit 127. The K- and L-registers 128 and 129 are used to store other quantities required for the addition operation. These quantities can be derived from the B-registers 122, the Z-registers 124 or from the arithmetic control input unit register 130.

A shift and edit translator 131 translates appropriate fields of the instruction in register 120 to control shift circuits 132 and edit circuits 133 to provide shifting and editing of quantities in the various other registers.

The results of additions in adder circuit 127 are stored in D-register 134 from which they are supplied to variable store input address register 135, variable store output address register 136 or arithmetic control unit output register 137. Finally, data from the variable store units is supplied to input data registers 138 and data to be stored in the variable store units is supplied to output data registers 139. An F-register 140 is provided to store data prior to entry into Z-registers 124 or B-registers 122. This data may be received from the variable store units by way of data input registers 138 or may be available as a result of an arithmetic operation from D-register 134.

Figure 7:
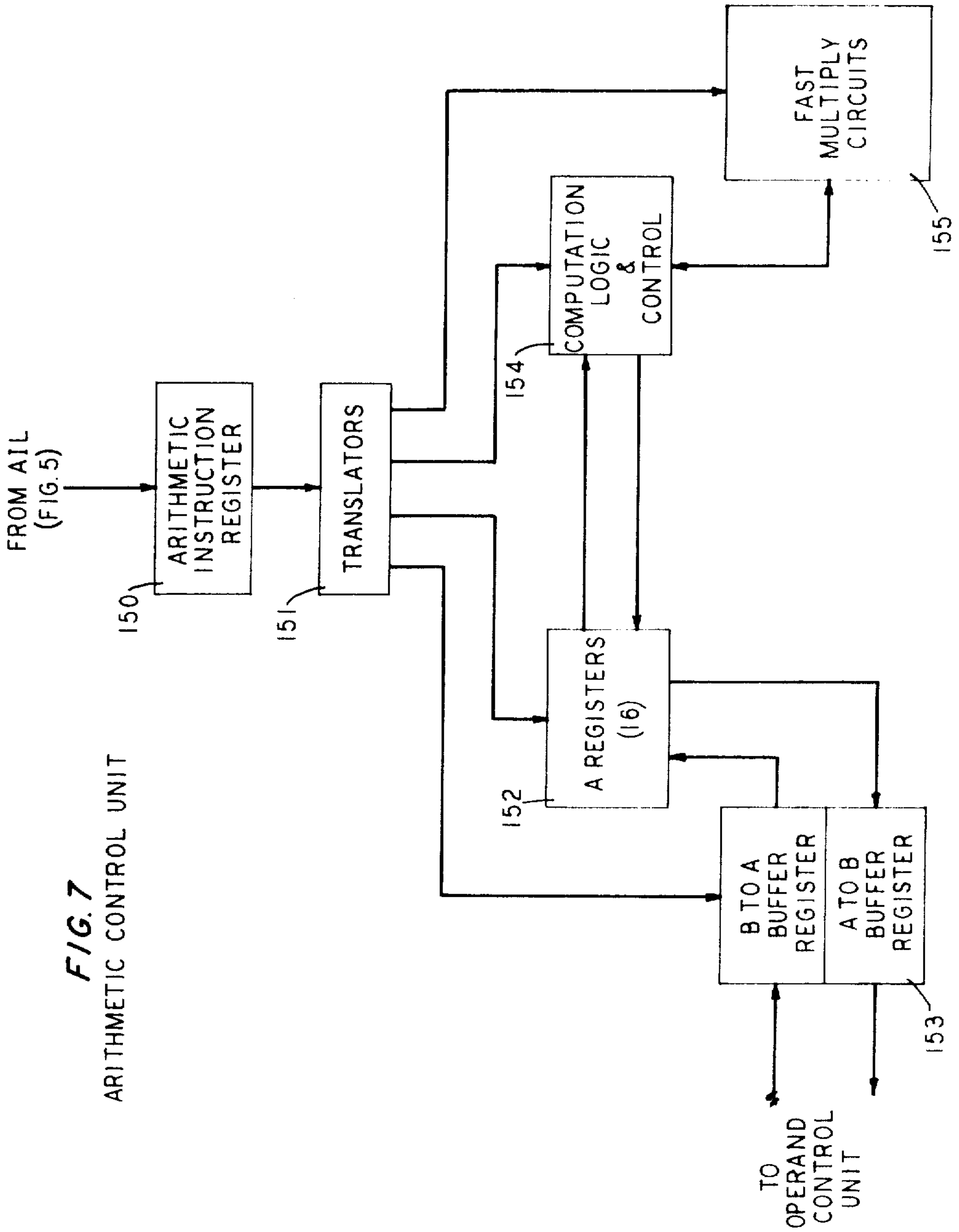
FIG. 7 is a more detailed block diagram of the arithmetic control unit of the processor unit shown in FIG. 4.

In FIG. 7 there is shown in detailed block diagram form the arithmetic control unit illustrated as block 73 in FIG. 4. The arithmetic control unit in FIG. 7 comprises an arithmetic instruction register 150 which receives arithmetic instructions from the arithmetic instruction list 110 of FIG. 5. These instructions are delivered to register 150, one at a time and, in turn, are applied to translating circuits 151. Translators 151 decode the arithmetic instructions and generate control signals necessary for the execution of those instructions.

A plurality of local storage registers, A-registers 152, are provided to store arithmetic operands during the progress of, and between the executions of, arithmetic instructions. The A-registers 152 communicate with the operand control unit of FIG. 6 by way of buffer registers 153. Operands may therefore be transferred back and forth between the operand control unit of FIG. 6 and the A-registers 152.

Also included in the arithmetic control unit of FIG. 7 are the computation logic and control circuits 154 which include all the basic logic and arithmetic control circuitry necessary to perform these operations on the operands stored in the A-registers 152. In order to prevent undue delays in the execution of arithmetic instructions, fast multiply circuits 155 are provided to provide rapid execution of instructions involving multiplication. As is well known, such instructions otherwise require considerably greater time for their execution than do other classes of instructions.

The instruction repertoire of the process or unit can be summarized as follows:

Arithmetic on A-Registers

| | | |
|---|---|---|
| 1. ADD | I,J | ADD. Add contents of register A(I) to the contents of register A(J) and store sum in A(O). |
| 2. ADR | I,J | ADD AND REPLACE. Add contents of register A(I) to the contents of register A(J) and store the sum in A(O) and in A(J). |
| 3. ALTR | I,J,N | ADD LEFT HALF A TRUE AND REPLACE. Add N to left half of register A(I) and store the sum in A(O) and in A(J). |
| 4. ARTR | I,J,N | ADD RIGHT HALF A TRUE AND REPLACE. Add N to right half of register A(I) and store the sum in A(O) and in A(J). |
| 5. SUB | I,J | SUBTRACT. Subtract the contents of register A(J) from the contents of register A(I) and store the difference in A(O). |
| 6. SBR | I,J | SUBTRACT AND REPLACE. Subtract the contents of register A(J) from the contents of register A(I) and store the difference in A(O) and in A(J). |
| 7. RSB | I,J | REVERSE SUBTRACT. Subtract the contents of register A(I) from the contents of register A(J) and store the difference in A(O). |
| 8. RSR | I,J | REVERSE SUBTRACT AND REPLACE. Subtract the contents of register A(I) from the contents of register A(J) and store the difference in A(O) and in A(J). |
| 9. SLTR | I,J,N | SUBTRACT LEFT HALF A TRUE AND REPLACE. Subtract N from the left half of register A(I) and store the difference in A(O) and in A(J). |

| | | |
|---|---|---|
| 10. SRTR | I,J,N | SUBTRACT RIGHT HALF A TRUE AND REPLACE. Subtract N from the right half of register A(I) and store the difference in A(O) and in A(J). |
| 11. MPY | I,J | MULTIPLY. Multiply the contents of register A(I) by the contents of register A(J) and store the product in A(O)-R. |
| 12. MPR | I,J | MULTIPLY AND REPLACE. Multiply the contents of register A(I) by the contents of register A(J) and store the product in A(O)-R and the most significant part in A(J). |
| 13. MTR | I,J,N | MULTIPLY TRUE AND REPLACE. Multiply the contents of register A(I) by N and place the product in A(O)-R and the most significant part in A(J). |
| 14. HMP | I,J | HALF MULTIPLY. Multiply the contents of register A(J) by the left half of the contents of register A(I) and place the product in A(O)-R. |
| 15. HMR | I,J | HALF MULTIPLY AND REPLACE. Multiply the contents of register A(J) by the left half of the contents of register A(I) and place the product in A(O)-R and the most significant part in A(J). |
| 16. DIV | I,J | DIVIDE. Divide the contents in register A(I)-R by the contents in register A(J) and place the quotient in A(O) with the remainder in the R register. |
| 17. DVR | I,J | DIVIDE AND REPLACE. Divide the contents of register A(I)-R by the contents of register A(J) and place the quotient in A(O) and in A(J) (with the remainder in R). |
| 18. SQR | I,J | SQUARE ROOT AND REPLACE. Take the square root of the contents of register A(I) and store in A(O) and in A(J). |
| 19. RND | | ROUND. Round off the contents of register A(O), depending on the first digit of the R register. |
| 20. MGR | I,J | MAGNITUDE AND REPLACE. Store the magnitude of the contents of register A(I) in A(O) and A(J). |
| 21. NMR | I,J | NEGATIVE MAGNITUDE AND REPLACE. Store the negative of the magnitude of the contents of register A(I) in A(O) and A(J). |
| 22. CNOO | I,J | COUNT NUMBER OF ONES IN A. Store the count of the number of ones in register A(I) into the last six places of A(J). |
| 23. ENCR | I,J | ENCODE BITS IN A AND REPLACE. Shift register A(O) to the right until first "1" is encountered, place shift count in A(J), reset "1" bit, and left shift A(O) to original position. |

SHIFTS

| | | |
|---|---|---|
| 24. SHR | S | RIGHT SHIFT. Shift the contents of register A(O) or A(O)-R to the right S places with options for rounding, circular shift and sign padding. |
| 25. SHL | S | LEFT SHIFT. Shift the contents of registers A(O) or A(O)-R to the left S places, with options for rounding and circular shifts. |
| 26. SRI | I | RIGHT SHIFT INDIRECT. Shift contents of registers A(O) or A(O)-R right by the lower order eight bits of the contents of register A(I), with options for rounding, circular shift and sign padding. |
| 27. SLI | I | LEFT SHIFT INDIRECT. Shift the contents of registers A(O) or A(O)-R to the left by the lower order eight bits to the contents of A(I), with options for rounding and circular shifts. |
| 28. SHLO | S | SHIFT LEFT WITH OVERFLOW DETECTION. Shift the contents of registers A(O) or A(O)-R to the left S places, with options, and set interrupt register bit 19 on overflow. |
| 29. SLIO | I | SHIFT LEFT INDIRECT WITH OVERFLOW DETECTION. Shift contents of registers A(O) or A(O)-R to the left by the lower order eight bits of the contents of A(I), with options, and overflow detection in bit 19 of interrupt register. |

LOGICAL ON A

| | | |
|---|---|---|
| 30. LOR | I,J | LOGICAL OR. OR the contents of A(I) with the contents of register A(J) and store the results in register A(O). |
| 31. LORR | I,J | LOGICAL OR AND REPLACE. OR the contents of register A(I) with the contents of register A(J) and store the results in the registers A(O) and A(J). |
| 32. LAND | I,J | LOGICAL AND. AND the contents of register A(I) with the contents of register A(J) and store the results in the register A(O). |
| 33. LANR | I,J | LOGICAL AND and REPLACE. AND the contents of register A(I) with the contents of register A(J) and store the results in registers A(O) and A(J). |

TRUE OPERATIONS ON A

| | | |
|---|---|---|
| 34. LLAT | J,N | LOAD LEFT HALF A TRUE. Load N into the left half of register A(J) and clear the right half. |
| 35. LRAT | J,N | LOAD RIGHT HALF A TRUE. Load N into the right half of register A(J) and clear the left half. |
| 36. OLTR | I,J,N | LOGICAL "OR" LEFT HALF A TRUE AND REPLACE. OR the contents of register A(I) with N, left adjusted, and place the results in registers A(O) and A(J). |
| 37. ORTR | I,J,N | LOGICAL "OR" RIGHT HALF A TRUE AND REPLACE. OR the contents of register A(I) with N, right adjusted, and place the results in registers A(O) and A(J). |
| 38. NLTR | I,J,N | LOGICAL "AND" LEFT HALF A TRUE AND REPLACE. AND the contents of register A(I) with N, left adjusted, and place the results in registers A(O) and A(J). |
| 39. NRTR | I,J,N | LOGICAL "AND" RIGHT HALF A TRUE AND REPLACE. AND the contents of register A(I) with N, right adjusted, and place the results in registers A(O) and A(J). |

LOAD, ADD ON B OR Z

| | | |
|---|---|---|
| 40. LBAT | K,N | LOAD B ADDRESS TRUE. Load N, right adjusted, into B(K) and clear the balance of register B(K). |
| 41. LBIT | K,N | LOAD B INCREMENT TRUE. Load N, left adjusted, into register B(K), leaving the balance of B(K) unchanged. |
| 42. ABAT | K,L,N | ADD B ADDRESS TRUE. Add N to the contents of the right 20 bits of register B(K) and place the sum in the right 20 bits of B(L). |
| 43. SBAT | K,L,N | SUBTRACT B ADDRESS TRUE. Subtract N from the contents of the right 20 bits of register B(K) and place the difference in the right 20 bits of B(L). |
| 44. NKB | K | INCREMENT B. Add the contents of bits 0-11 of register B(K) to the contents of bits 12-31 of register B(K) and place the sum in bits 12-31 of B(K). |
| 45. ADB | K,L | ADD B. Add the contents of bits 12-31 of register B(K) to the contents of bits 12-31 of B(L) and place the sum in bits 12-31 of B(L). |
| 46. SBB | K,L | SUBTRACT B. Subtract the contents of bits 12-31 of register B(L) from the contents of bits 12-31 of register B(K) and put the difference in bits 12-31 of B(L). |
| 47. SBBK | K,L | SUBTRACT B INTO B(K). Subtract the contents of bits 12-31 of |

register B(L) from the contents of bits 12–31 of register B(K) and put the difference in bits 12–31 of register B(K).

| | | |
|---|---|---|
| 48. LZAT | Y,N | LOAD Z ADDRESS TRUE. Load N into bits 12–31 of register Z(Y). |
| 49. LZIT | | LOAD Z INCREMENT TRUE. Load N into bits 0–11 of register Z(Y). |

LOGICAL ON B

| | | |
|---|---|---|
| 50. BCBL | K,L | BIT CHECK INTO B(L). AND the contents of B(K) with the one's complement of the contents of register B(L) and place the results in B(L). |
| 51. BCBK | K,L | BIT CHECK INTO B(K). AND the contents of B(K) with the one's complement of the contents of register B(L) and place the results in B(K). |
| 52. LORB | K,L | LOGICAL "OR" B. OR the contents of register B(K) with the contents of register B(L) and place the results in B(L). |
| 53. LERB | K,L | LOGICAL EXCLUSIVE "OR" B. EXCLUSIVE OR the contents of registers B(K) and B(L) and place the results in B(L). |
| 54. LANB | K,L | LOGICAL "AND" B. AND the contents of register B(K) with the contents of register B(L) and place the results in B(L). |

EDIT

| | | |
|---|---|---|
| 55. EDTI | K,L,S, W1,W2 | EDIT AND INSERT. Shift the contents of register B(K) right circular S places and insert the portion of B(K) between bits W1 and W2 into the corresponding positions of B(L) with the remainder of B(L) unchanged. |
| 56. EDTS | K,L,S, W1,W2 | EDIT AND STORE. Shift the contents of register B(K) right circular S places and insert the portion of B(K) between bits W1 and W2 into the corresponding positions of B(L) with the remainder of B(L) set to zero. |
| 57. EDTP | K,L,S, W1,W2 | EDIT AND PAD. Shift the contents of register B(K) right circular S places and insert the portion of B(K) )between bits W1 and W2 into the corresponding positions of B(L) with the bits to the right of bit W2 set to zero and to the left of W1 set as W1. |
| 58. EDTA | K,J,S W1,W2 | EDIT INTO A AND PAD. Shift the contents of register B(K) right circular S places; then place bits W1 through W2 of B(K) into bits W1 through W2 of A(J). Bits to the right of bit W2 set to zero and bits to the left of W1 set to bit W1. |
| 59. EDII | K,L,M | EDIT INDIRECT AND INSERT. Same as EDTI except S, W1 and W2 fields are in B(M). |
| 60. EDIS | K,L,M | EDIT INDIRECT AND STORE. Same as EDTS except S, W1 and W2 fields are in B(M). |
| 61. EDAS | K,J,S, W1,W2 | EDIT INTO A AND STORE. Same as EDTS except bits into register A(J) instead of B(L). |
| 62. EIAS | K,J,M | EDIT INDIRECT INTO A AND STORE. Same as EDAS except S, W1 and W2 fields are in B(M). |
| 63. EDIP | K,L,M | EDIT INDIRECT AND PAD. Same as EDTP except S, W1 and W2 fields are in B(M). |
| 64. EIAP | K,J,M | EDIT INDIRECT INTO A AND PAD. Same as EDTA except S, W1 and W2 fields are in B(M). |

MOVES

| | | |
|---|---|---|
| 65. CMA | I | CLEAR R AND MOVE A. Move the contents of register A(I) into register A(O) and clear R. |
| 66. CMN | I | CLEAR R AND MOVE A NEGATIVE. Move the negative of the contents of register A(I) into the register A(O) and clear R. |
| 67. XCH | | EXCHANGE. Move the contents of register A(O) into R and move the contents of (R) into A(O). |
| 68. ICA | I,J | INTERCHANGE A. Move the contents of register A(I) into the register A(J) and move the contents of register A(J) into A(I). |
| 69. PAR | I | PLACE IN R. Move the contents of register A(I) into R. |
| 70. LAR | J | LOAD FROM R. Load the contents of register R into A(J). |
| 71. MVA | I,J | MOVE A. Move the contents of register A(I) into A(J). |
| 72. MAB | I,L | MOVE A TO B. Move the contents of register A(I) to B(L). |
| 73. MBA | K,J | MOVE B TO A. Move the contents of register B(K) into register A(J). |
| 74. MVB | K,L | MOVE B. Move the contents of register B(K) into register B(L). |
| 75. MBC | P1,L | MOVE B TO C. Move the contents of bits 28–31 of register B(L) into register C(G), where G is right two bits of P1. |
| 76. MCB | P1,L | MOVE C TO B. Move the contents of register C(G), where G is the right two bits of P1, into bits 28–31 of register B(L) and clear bits 0–27 of register B(L). |
| 77. MBZ | K,Y | MOVE B TO Z. Move the contents of register B(K) into the register Z(Y). |
| 78. MZB | Y,L | MOVE Z TO B. Move the contents of register Z(Y) into register B(L). |
| 79. ONRA | J,L | ONRS TO A. Place the inverse of the contents of register B(L) into register A(I). If L=0, load all one's into A(I). |
| 80. ONRB | K,L | ONRS TO B. Place the inverse of the contents of register B(L) into register B(K). If L=0, load all one's into B(K). |

FETCHES

| | | |
|---|---|---|
| 81. FDA | K,J, M,U | FETCH INTO A DIRECT. Fetch the contents of the variable store half word location specified by the sum of the contents of registers B(K), B(M), and U and store in register A(J). |
| 82. DFDA | K,J(2), M,U | DOUBLE FETCH INTO A DIRECT. Fetch the contents of the variable store full word location specified by the sum of the contents of registers B(K), B(M) and U and store in registers A(J)–A(J+) (J must be even). |
| 83. FBN | K,L, M,U | FETCH AND BIAS NEGATIVE. Load contents of variable store half word location specified by the sum of registers B(K), B(M) and U into B(L). Reset bits 0 and 1 of variable store location with ones. |
| 84. DFBN | K,L, M,U | DOUBLE FETCH AND BIAS NEGATIVE. Load contents of variable store full word location specified by the sum of registers B(K), B(M) (and U into B(L)–B(L+). L must be even. Reset bits 0 and 1 of variable store location to ones. |
| 85. FIA | K,J, M,U | FETCH INTO A INDIRECT. Fetch contents variable store half word location specified by the sum of registers B(K), B(M) and U. If bit 3 is 1, continue fetching, using corresponding fields K, M and U. When bit 3 is 0, load contents of that variable store location into A(J). Final address is in B(M). |
| 86. DFIA | K,J, M,U | DOUBLE FETCH INTO A INDIRECT. Same as above for full word, which is loaded into A(J)–A(J+). |
| 87. FDB | K,L, M,U | FETCH INTO B DIRECT. Load contents of variable store half word location specified by the sum of the contents of registers B(K), B(M) and U into register B(L). |
| 88. FDZ | K,Y, M,U | FETCH INTO Z DIRECT. Load contents of variable store half word location specified by the sum of the contents of registers B(K), B(M) and U into register Z(Y). |

89. DFDB — K,L, M,N, — DOUBLE FETCH INTO B DIRECT. Load contents of variable store full word location specified by the sum of the contents of registers B(K), B(M) and U into B(L)–B(L+).

90. DFDZ — K,Y, M,U — DOUBLE FETCH INTO Z DIRECT. Load contents of variable store full word location specified by the sum of the contents of registers B(K), B(M) and U into Z(Y)–Z(Y+).

91. FIB — K,L, M,U — FETCH INTO B INDIRECT. Fetch contents of variable store half word location specified by the sum of contents of registers B(K), B(M) and U. If bit 3 is 1, continue fetching using K, M and U fields of fetched words. When bit 3 is a 0, load contents of the variable store location specified by that word into register B(L).

92. DFIB — K,L, M,U — DOUBLE FETCH INTO B INDIRECT. Same as above for full word, which is loaded into B(L)–B(L+). L must be even.

93. FOBA — K,U — FETCH INTO B ABSOLUTE. Fetch the contents of the variable store half word location specified by U into register B(K).

94. DFBA — K,U — DOUBLE FETCH INTO B ABSOLUTE. Same as FOBA for full word, which is loaded into B(K)–B(K+).

STORES

95. SDA — K,J, M,U — STORE FROM A DIRECT. Store the contents of register A(J) in the variable store half word location specified by the sum of the contents of B(K), B(M) and U.

96. DSDA — K,J, M,U — DOUBLE STORE FROM A DIRECT. Store the contents of registers A(J)–A(J+1) into the variable store full word location specified by the sum of the contents of registers B(K), B(M) and U. J must be even.

97. SAI — K,J, M,U — STORE FROM A INDIRECT. Fetch the contents of the variable store half word location specified by the sum of the contents of registers B(K), B(M) and U. If bit 3 is 1, continue fetching, using K, M and U fields of fetched words. When bit 3 is 0, store A(J) in variable store location specified by that word.

98. DSIA — K,J, M,U — DOUBLE STORE FROM A INDIRECT. Same as above for full word, which is stored from A(J)–A(J+) into the last specified variable store location.

99. SDB — K,L, M,U — STORE FROM B DIRECT. Store contents of register B(L) into the variable store half word location specified by the sum of the contents of B(K), B(M) and U.

100. SDZ — K,Y, M,U — STORED FROM Z DIRECT. Store contents of register Z(Y) into the variable store half word location specified by the sum of the contents of B(K), B(M) and U.

101. DSDB — K,L, M,U — DOUBLE STORE FROM B DIRECT. Store the contents of registered B(L)–B(L+1) into the variable store full word location specified by sum of the contents of B(K), B(M) and U. L must be even.

102. DSDZ — K,Y, M,U — DOUBLE STORE FROM Z DIRECT. Store the contents of registers Z(Y)–Z(Y+1) into the variable store full word location specified by the sum of the contents of B(K), B(M) and U. L must be even.

103. DCSB — K,L, M,U — DOUBLE CONDITIONAL STORE. Store the contents of registers B(L)–B(L+1) into the variable store full word location specified by the sum of the contents of B(L), B(M) and U, but *only* if the first two bits of the storage location are not "11." L must be even.

104. SIB — K,L, M,U — STORE FROM B INDIRECT. Fetch the contents of the variable store half word location specified by the sum of the contents of B(K), B(M) and U. If bit 3 is 1, continue fetching, using new K, M and U fields of fetched words. When bit 3 is 0, store contents of B(L) in the last specified variable store locations.

105. DSIB — K,L(2), M,U — DOUBLE STORE FROM B INDIRECT. Same as above for full word stored from B(L)–B(L+) into last specified variable store location.

106. SOBA — K,U — STORE FROM B ABSOLUTE. Store the contents of register B(K) at the variable store half word location specified by U.

107. DSBA — K,U — DOUBLE STORE FROM B ABSOLUTE. Store the contents of registers B(K)–B(K+1) into the variable store full word location specified by U. K must be even.

JUMPS

108. UCJ — U — UNCONDITIONAL JUMP. The program control unit jumps to address in U.

109. UJM — K,U — UNCONDITIONAL JUMP MODIFIED. Jump to U+B(K).

110. SRJ — K,U — SUBROUTINE JUMP. Next instruction address into B(K) and jump to U.

111. JAE — I,U — CONDITIONAL JUMP IF A EQUAL. Jump to U if I=0 and A(O)=0, if I≠0 and A(O)=A(I).

112. JANE — I,U — CONDITIONAL JUMP IF A NOT EQUAL. Jump to U if I=0 and A(O)≠0, or if I≠0 and A(I)≠A(O).

113. JAG — I,U — CONDITIONAL JUMP IF A GREATER,. Jump to U if I=0 and A(O)>0, or if I≠0 and A(I)>A(O).

114. JANG — I,U — CONDITIONAL JUMP IF A NOT GREATER. Jump to U if I=0 and A(O)≤0, or if I≠0 and A(I)≤A(O).

115. JAL — I,U — CONDITIONAL JUMP IF A LESS. Jump to U if I=0 and A(O)<0, or if I≠0 and A(I)<A(O).

116. JANL — I,U — CONDITIONAL JUMP IF A NOT LESS. Jump to U if I=0 and A(O)≥0, or if I 0 and A(I)≥A(O).

117. JBAZ — K,U — CONDITIONAL JUMP IF B ADDRESS ZERO. Jump to U if bits 12–31 of register B(K) equal zero.

118. JBAN — K,U — CONDITIONAL JUMP IF B ADDRESS NOT ZERO. Jump to U if bits 12–31 of register B(K) are not equal to zero.

119. JBZ — K,U — CONDITIONAL JUMP IF B ZERO. Jump to U if B(K) equals zero (bits 0–31).

120. JBNZ — K,U — CONDITIONAL JUMP IF B NOT ZERO. Jump to U if B(K)≠0 (bits 0–31).

121. JBG — K,U — CONDITIONAL JUMP IF B GREATER THAN ZERO. Jump to U if B(K)>0 (bits 0–31).

122. JBNG — K,U — CONDITIONAL JUMP IF B NOT GREATER THAN ZERO. Jump to U if B(K)≤0 (bits 0–31).

123. JBL — K,U — CONDITIONAL JUMP IF B LESS THAN ZERO. Jump to U if B(K)<0 (bits 0–31).

124. JBNL — K,U — CONDITIONAL JUMP IF B NOT LESS THAN ZERO. Jump to U if B(K)≥0 (bits 0–31).

125. JCZ — P1,U — CONDITIONAL JUMP C ZERO. Jump to U if C(G1)=0. G1 specified by right 2 bits of P1 field.

126. JCNZ — P1,U — CONDITIONAL JUMP C NOT ZERO. Jump to U if C(G1)≠0. G1 specified by right 2 bits of P1 field.

127. IJCZ — P1,U — INDEX JUMP C ZERO. Jump to U if C(G1)=0 and increment C(G1) by second bit of P1. G1 specified by right 2 bits of P1.

128. IJCN — P1,U — INDEX JUMP C NOT ZERO. Jump to U if C(G1)≠0 and increment C(G1) by second bit of P1. G1 is specified by the right 2 bits of P1.

| | | |
|---|---|---|
| 129. IJO | K,U | INDEX JUMP ADDRESS OVERFLOW. Jump to U if overflow occurs during indexing. Prior to jump decision, the signed quantity in bits 0–11 of B(K) is subtracted from bits 12–31 of B(K). The result is placed into bits 12–31 of B(K). |
| 130. IJNO | K,U | INDEX JUMP NOT ADDRESS OVERFLOW. Jump to U if overflow does not occur during indexing. Prior to jump decision, the signed quantity in bits 0–11 of B(K) is subtracted from bits 12–31 of B(K). The result is placed into bits 12–31 of B(K). |
| 131. RJP | K | RETURN JUMP. Jump to B(K). |
| 132. IRJ | Y | INTERRUPT RETURN JUMP. Jump to Z(Y). |
| 133. INTJ | Y | INTERRUPT JUMP. Jump to location specified by bits 12–31 of register Z(Y). The next instruction address is in Z(Y+1). Z(Y) must be either $Z_2$ or $Z_4$. |

C REGISTER MANIPULATION

| | | |
|---|---|---|
| 134. LCT | P1,P2 | LOAD C TRUE. Load the P2 field into the C register specified by the right 2 bits of the P1 field. |
| 135. INC | P1,P2 | INCREMENT C. Increment the C registers specified by the right 2 bits of P1 and P2 by the amount specified in the corresponding left 2 bits of P1 and P2. |
| 136. MRA | P1,P2 | MODIFY REGISTER ADDRESS. Increment the C registers as above and then force the register fields I, K or Y (bits 8–11) and J, L, or Y (bits 12–15) of the next succeeding instruction each to be modified by the amounts in the corresponding C registers. |

FLOATING POINT ARITHMETIC

| | | |
|---|---|---|
| 137. FAD | I,J | FLOATING ADD. Floating point add the contents of register A(I) to the contents of register A(J) and store the normalized sum in A(O). |
| 138. FSB | I,J | FLOATING SUBTRACT. Floating point subtract the contents of register A(J) from the contents of register A(I) and store the normalized difference in A(O). |
| 139. FAR | I,J | FLOATING ADD AND REPLACE. Floating point add the contents of register A(I) to the contents of register A(J) and store the normalized sum in A(O) and A(J). |
| 140. FSR | I,J | FLOATING SUBTRACT AND REPLACE. Floating point subtract the contents of register A(J) from the contents of register A(I) and store the normalized difference in A(O) and A(J). |
| 141. FMY | I,J | FLOATING MULTIPLY. Floating point multiply the contents of register A(I) by the contents of register A(J) and store the normalized product in A(O)–R. |
| 142. FMR | I,J | FLOATING MULTIPLY AND REPLACE. Floating point multiply the contents of register A(I) by the contents of register A(J) and store the normalized product in A(O)–R and A(J). |
| 143. FDV | I,J | FLOATING DIVIDE. Floating point divide the contents of register A(I) by the contents of register A(J) and store the normalized quotient in A(O) (with the remainder in R). |
| 144. FDR | I,J | FLOATING DIVIDE AND REPLACE. Floating point divide the contents of register A(I) by the contents of register A(J) and store the normalized quotient in A(O) and A(J) (with the remainder in R). |
| 145. RFS | I,J | REVERSE FLOATING SUBTRACT. Floating point subtract the contents of register A(I) from the contents of register A(J) and store the normalized difference in A(O). |
| 146. RFSR | I,J | REVERSE FLOATING SUBTRACT AND REPLACE. Floating point subtract the contents of register A(I) from the contents of register A(J) and store the normalized difference in A(O) and A(J). |
| 147. FSQR | I,J | FLOATING SQUARE ROOT AND REPLACE. Take the floating point square root of the contents of register A(I) and store in A(O) and A(J). |
| 148. FRN | | FLOATING ROUND. Round off the contents of register A(O), depending on the first digit of the R register. |
| 149. FMGR | I,J | FLOATING MAGNITUDE AND REPLACE. Store the floating point magnitude of the contents of register A(I) in A(O) and in A(J). |
| 150. AFTR | I,J,N | ADD A FLOATING TRUE AND REPLACE. Add N to the floating point contents of register A(I) and store the normalized sum in A(O) and in A(J). |
| 151. SFTR | I,J,N | SUBTRACT A FLOATING TRUE AND REPLACE. Subtract N from the floating point contents of register A(I) and store the normalized difference in A(O) and in A(J). (Bits 16–23 of N are mantissa, bits 24–31 of N are exponents.). |
| 152. MFTR | I,J,N | MULTIPLY FLOATING TRUE AND REPLACE. Floating point multiply the contents of register A(I) by N and place the normalized product in A(O)–R and in A(J). |

FLOATING POINT CONDITIONAL JUMPS

| | | |
|---|---|---|
| 153. JFG | I,U | CONDITIONAL JUMP IF FLOATING COMPARISON GREATER. Jump to U if $I=0$ and floating point $A(O)>0$, or if $I\neq0$ and floating point $A(I)>A(O)$. |
| 154. JFNG | I,U | CONDITIONAL JUMP IF FLOATING COMPARISON NOT GREATER. Jump to U if $I=0$ and floating point $A(O)\ngtr 0$, or if $I\neq0$ and floating point $A(I)\ngtr A(O)$. |
| 155. JFL | I,U | CONDITIONAL JUMP IF FLOATING COMPARISON LESS. Jump to U if $I=0$ and floating point $A(O)<0$, or $I\neq 0$ and floating point $A(I)<A(O)$. |
| 156. JFNL | I,U | CONDITIONAL JUMP IF FLOATING COMPARISON NOT LESS. Jump to U if $I=0$ and floating point $A(O)\geq 0$, or if $I\neq0$ and floating point $A(I)\geq A(0)$. |
| 157. JFZ | I,U, | CONDITIONAL JUMP FLOATING ZERO. Jump to U if $I=0$ and floating point $A(0)=0$ or if $I\neq0$ and floating point $A(0)=A(I)$. |
| 158. JFNZ | I,U | CONDITIONAL JUMP FLOATING NOT ZERO. Jump to U if $I=0$ and floating point $A(0)\neq0$, or if $I\neq0$ and floating point $A(0)\neq A(I)$. |

EXPONENT MANIPULATION

| | | |
|---|---|---|
| 159. MVX | I,J | MOVE EXPONENT. Combine the exponent in A(I) with the mantissa in A(J) and store the results in A(0) and A(J). |
| 160. ADX | I,J | ADD EXPONENT. Add the exponents in A(I) and A(J). Place the results in A(0), retaining the mantissa from A(J). |
| 161. AXR | I,J | ADD EXPONENT AND REPLACE. Add the exponents in A(I) and A(J). Place the results in A(0) and A(J), releasing the mantissa from A(J). |
| 162. MAX | I,J | MATCH EXPONENTS. Shift the exponent in register A(I) until the exponent matches the exponent of A(J). Place the result in A(0). |
| 163. MXR | I,J | MATCH EXPONENTS AND REPLACE. Shift the exponent in register A(I) until the exponent matches the exponent of A(J). Place the results in A(0) and A(J). |

| | | |
|---|---|---|
| 164. NRM | I,J | NORMALIZE AND REPLACE. Shift the mantissa in A(I) to the left until normalized, adjust the exponent, and place the result in A(0) and A(J). |
| 165. AXTR | I,J,N | ADD EXPONENT TRUE AND REPLACE. Add N to the exponent in A(I) and store the resulting floating point number in A(0) and A(J). |
| 166. RSX | I,J | REVERSE SUBTRACT EXPONENTS. Subtract the exponent in A(I) from the exponent in A(J) and place the results with the mantissa of A(J) in A(0). |
| 167. RSXR | I,J, | REVERSE SUBTRACT EXPONENTS AND REPLACE. Subtract the exponent in A(I) from the exponent in A(J) and place the result with the mantissa of A(J) in A(0) and A(J). |
| 168. UPAK | I,J | UNPACK. Convert the floating point number in A(I) to a fixed point number and place in A(0). |

LOAD FLOATING TRUE

| | | |
|---|---|---|
| 169. LFAT | J,N | LOAD FLOATING A TRUE. Load the floating point number N into A(J). Note that N includes only an eight-bit mantissa and the remaining 16 mantissa bits are filled in with zeros. |
| 170. LXTR | I,J,N | LOAD EXPONENT TRUE AND REPLACE. Replace the exponent in A(I) with N and place the results in A(O) and A(J). |

CONTROL

| | | |
|---|---|---|
| 171. NOP | | NO OPERATION. Continue to next instruction. |
| 172. HLT | | HALT. Stop the operation of the processor (Requires manual restart). |
| 173. EDS | K,U | ENABLE DUPLICATE PROGRAMS AND JUMP. Issue all subsequent program store fetches to the paired program store groups and jump to the program store location specified by the sum of the contents of register B(K) and U. |
| 174. IDS | K,U | INHIBIT DUPLICATE PROGRAMS AND JUMP. Disable duplicate fetches commenced by EDS and jump to program store location specified by the sum of the contents of register B(K) and U. |
| 175. RIL | Y,L | REMOVE INTERRUPT LOCKOUT. Load the contents of register Z(Y) into bits 12-31 of register B(L). (Clears interrupt lockout). |
| 176. LPC | K | LOAD FROM PROGRAM COUNTER. Add one to current instruction address and place the new address in the address field of B(K). |
| 177. PMT | K,U | PROGRAM MEMORY TEST. Check program store memory locations beginning at the location specified by the sum of register B(K) and U for a parity error or until the next location is that specified by the contents of the break-point address register. |
| 178. SYNC | | SYNCHRONIZE. Stop sequencing until all instruction execution in progress is completed; then continue. |
| 179. SML | | SET MASK LOCKOUT. Lockout all noncritical interrupts for 64 microseconds. Lockout removed if IRJ or RIL are executed. |

Figure 8:
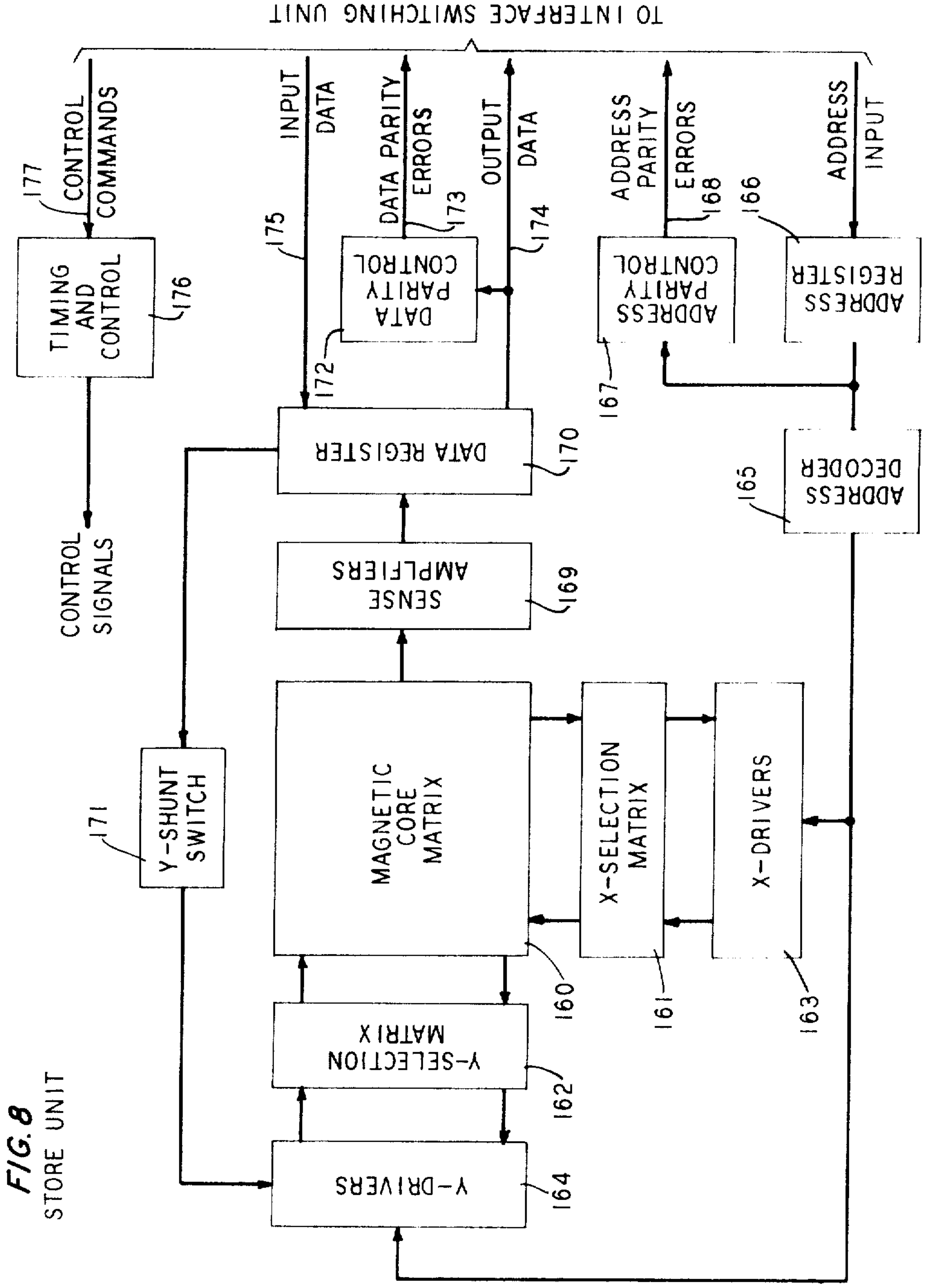
FIG. 8 is a more detailed block diagram of store units shown in FIG. 4.

Referring now to FIG. 8, there is shown a detailed block diagram of the store units illustrated in FIG. 4 by blocks 52, 53 and 56. The variable store units and the program store units comprise substantially identical storage hardware. The major difference between these stores is the duplication of all entries in the program store units. This difference results in some variation in the control circuitry and the control signaling but has little effect on the nature or operation of the storage hardware itself.

Referring then to FIG. 8, there is shown a store unit comprising a magnetic core matrix 160 including an array of magnetic cores and associated control conductors threading those cores, all in accordance with practices well known in the art. The magnetic cores of matrix 160 are addressed in accordance with conventional 2-1/2D practice by coincident signals from X-selection matrix 161 and Y-selection matrix 162.

During the read cycle, a half-select current is driven on the selected line of X-matrix 161 and a half-select current is also driven on those ones of the lines of Y-matrix 162 in each bit position, forcing the selected magnetic cores 160 to the "0" state. During the write cycle, a half-select current is driven on the selected line of X-matrix 161 and a conditional additive half-select current is applied to the selected lines of Y-matrix 162 in each bit position to force the core to the "1" state. The conditional additive current is applied selectively to the Y-matrix 162 lines in each bit position by way of the Y-shunt switch 171. Since data is inserted in each bit position of a selected word by means of logically or conditionally selecting an additive half-select current, an independent Y-matrix 162 must be used for each bit position of the memory.

These selection matrices 161 and 162 are, in turn, driven by X-drivers 163 and Y-drivers 164, respectively. The drivers 163 and 164 receive address information from address decoder 165 which, in turn, receives the memory address from address register 166. These addresses are, of course, supplied to the store unit of FIG. 8 from store accessing circuits in other parts of the data processing system. All addresses stored in register 166 are checked for parity errors in address parity control circuit 167. Any errors detected in these addresses are reported by way of line 168.

Magnetic core matrix 160, when addressed from matrices 161 and 162, produces outputs representative of the binary information stored in the addressed location. These signals are detected by sense amplifiers 169 and the binary information is stored in data register 170. Since the reading of information form the magnetic cores results in the destruction of that information, the same information is applied selectively to the bit lines by way of Y-shunt switch 171 to restore the information to the same locations in magnetic cores 160. In this way, readout is made nondestructive and the information stored in matrix 160 is retained for further utilization.

All data stored in magnetic core matrix 160 includes parity control bits which may be use to verify the parity of the stored data. Each data word stored in register 170 is therefore checked for correct parity by data parity control circuits 172 and data parity errors reported by way of line 173. The data itself is delivered by way of line 174.

When it is desired to store information in the store unit of FIG. 8, this input data is delivered by way of line 175 and stored in data register 170. At the same time, address signals are delivered to address register 166 indicating the precise location in which the input data is to be stored. The information previously stored at the addressed location in the magnetic cores 160 is first read from the magnetic cores 160, resulting in the destruction of that information. The resulting signals are not detected by the sense amplifiers 169 for this case. The input data stored in data register 170 is delivered by way of the Y-shunt switch 171 to the magnetic core matrix 160 in synchronism with the address control signals generated by address decoder 165, drivers 163 and 164 and selection matrices 161 and 162. In this way, input information is stored in matrix 160 for further utilization. The input data is also checked for parity errors by parity control circuits 172 and parity errors reported on line 173.

The operation of all of the circuits of FIG. 8 are under the control of signals generated by timing and control circuit 176. Control circuit 176 is, in turn, directed by control commands on line 177 in such a manner as to generate the appropriate control signals at the proper times and in the appropriate sequence. In order to better understand the operation of the store unit of FIG. 8, these control commands will be described in greater detail.

It will be first noted that each word in matrix 160 comprises 68 bits of binary information which, in turn, each comprise a left byte (bits 0–33) and a right byte )bits 34–67). The memory is capable of delivering either one of these bytes in response to a byte request and, moreover, detects and reports data parity errors separately for each byte. Finally, the store unit of FIG. 8 is provided with the capability of a biased read, i.e., is capable of setting the first and second bits of an addressed word to "1's" during any read cycle. These bits can then be used by the external system to recognize that the word has previously been read from memory. The store unit is also capable of altering a read cycle to a write cycle following the read portion of any memory cycle upon signals from the external system. This latter capability is called "conditional store."

The control commands delivered to control circuits 176 therefore include left, right and both byte signals as well as biased read and conditional and normal store signals. These control commands operate in circuits 176 to generate the detailed timing and control signals which act to effectuate the desired actions.

Signals delivered to and recovered from the store unit of FIG. 8 are handled through an interface switching unit indicated at the right side of FIG. 8. This interface switching unit forms a physical part of the store unit and performs the function of a buffer between the store unit and the various other units requesting service form the store unit. Since all such interface switching units have the same function and are of similar construction, only one type of interface switching unit will be described in detail. Thus, in FIG. 9 there is shown a detailed block diagram of the variable store interface switching unit shown as block 57 in FIG. 4.

Figure 9:
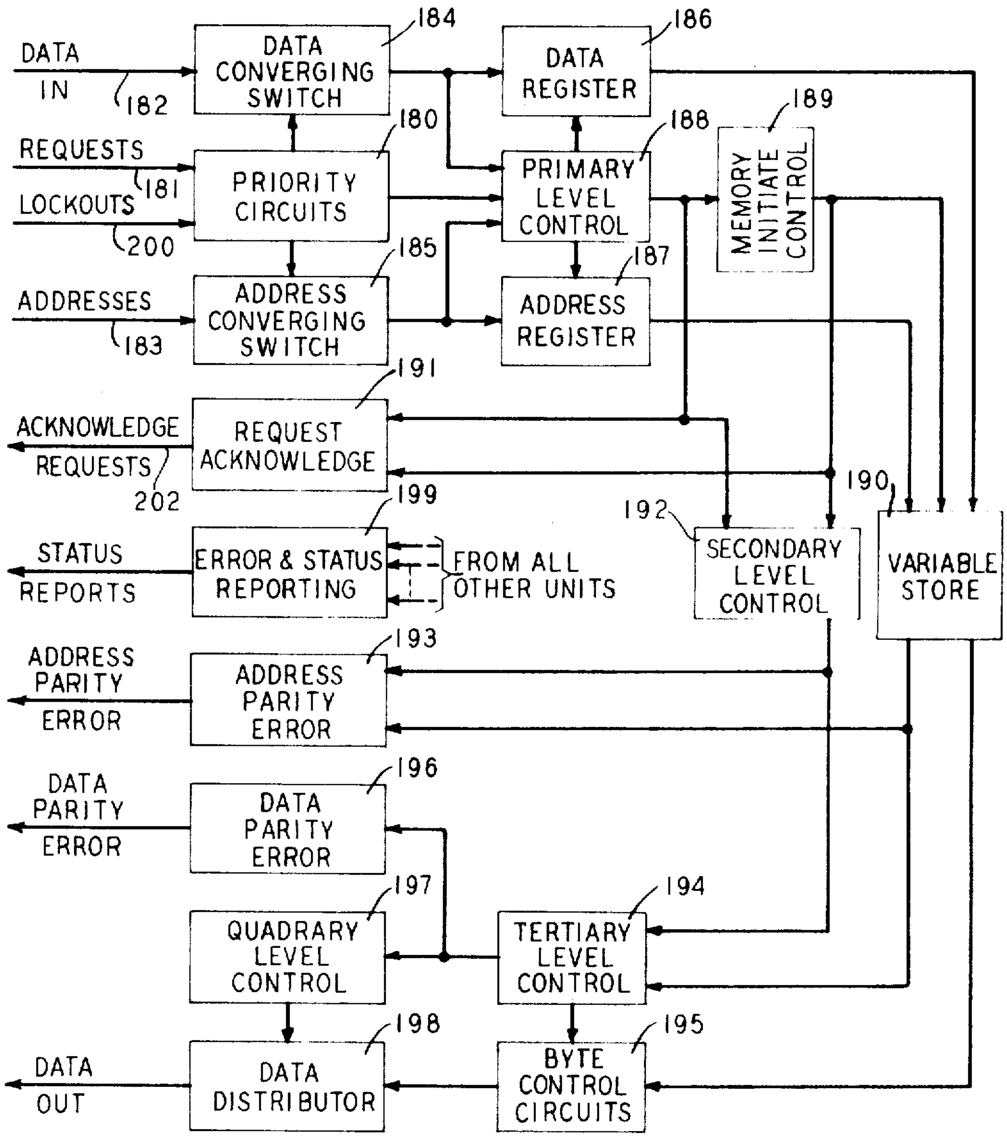
FIG. 9 is a more detailed block diagram of the interface switching unit shown in FIG. 4.

The interface switching unit of FIG. 9 comprises priority circuits 180 to which are applied requests for service on leads 181. It will be recalled, as noted in connection with FIG. 3, that the variable store units receive requests for service from processor units and input-output controllers. These requests are applied to priority circuits 180 and that request having the highest priority is given service first. That is, that data appearing on line 182 and that address appearing on line 183 which are associated with the highest priority request on leads 181 are selected by data converging switch 184 and address converging switch 185, respectively, and stored in data register 186 and address register 187, respectively. At the same time, control signals associated with that request are registered in primary level control circuit 188. These control signals include the byte selection bits, fetch and store designating signals and cancel request signal. This latter signal can be used to cancel the request at any time prior to actual accessing of the variable store unit.

The control signals in primary level control circuit 188 are stored, processed, retimed and passed on to memory initiate control circuit 189. Circuit 189 generates the actual control signals which initiate a memory cycle in variable store unit 190. In addition, signals from primary level control circuit 188 and memory initiate control circuit 189 are applied to request acknowledge circuit 191 which generates a signal on line 202 acknowledging the servicing of the corresponding request. The requesting unit uses this acknowledgement to terminate the request, since it has now been serviced.

The address and data information form registers 186 and 187 is passed on to variable store unit 190 simultaneously with the memory initiate signal from circuit 189. At the same time, the various other control signals are passed on to secondary level control circuit 192. These control signals in circuit 192, together with control outputs from variable store unit 190, are applied to address parity error circuit 193. Circuit 193 generates and passes on to the appropriate requesting unit an indication of an address parity error in the request just previously acknowledged. The control signals from secondary control circuit 192 are passed on to tertiary level control circuit 194. Since the variable store unit 190 is arranged to access and deliver half-word bytes, control circuit 194 is used to direct byte control circuit 195 so as to handle the half-word bytes in the proper manner. Since a full-word from variable store unit 190 is delivered to control circuit 195 in the form of a sequence of two half-word bytes, byte control circuits 195 are controlled in such a fashion as to reassemble the data bytes into the full data word.

Data parity errors detected by variable store unit 190 are reported form tertiary level control circuit 194 to data parity error circuit 196 and, in turn, are reported to the unit requesting the data fetch or data store. Control signals from tertiary level control circuit 194 are also passed on to the quadrary level control circuit 197 which controls a data distributor 193 so as to pass the output data to the appropriate requesting unit at a time the requesting unit is prepared to receive that data.

Error and status reporting circuit 199 is provided to detect and store indications of internal errors occurring in any of the other circuits of the variable store interface switching unit. Circuit 199 prepares and delivers status reports of the operating condition of the entire interface switching unit to the status unit, illustrated as block 60 in FIG. 3.

The control circuitry of the interface switching unit of FIG. 9 is divided into four levels (primary, secondary, tertiary and quadrary) to separate the timing and control required at each stage of servicing a request. Moreover, this separation of the control allows the overlapping of successive requests, permitting the processing of each request prior to the completion of the processing of the previous request.

In accordance with the present invention, the priority circuits 180 are arranged to selectively lock out any particular one or ones of the requesting units. This is accomplished by lockout signals on leads 200 applied to priority circuits 180. These lockout signals inhibit the servicing of the corresponding requests while permitting the servicing of all other requests. In this way, communication between this particular variable store unit and any requesting unit is terminated Similar lockouts are, of course, provided for locking out any of the other units of the data processing system by selectively disabling such communication in the appropriate interface switching units. The details of this lockout control will be taken up hereinafter.

Figure 10:
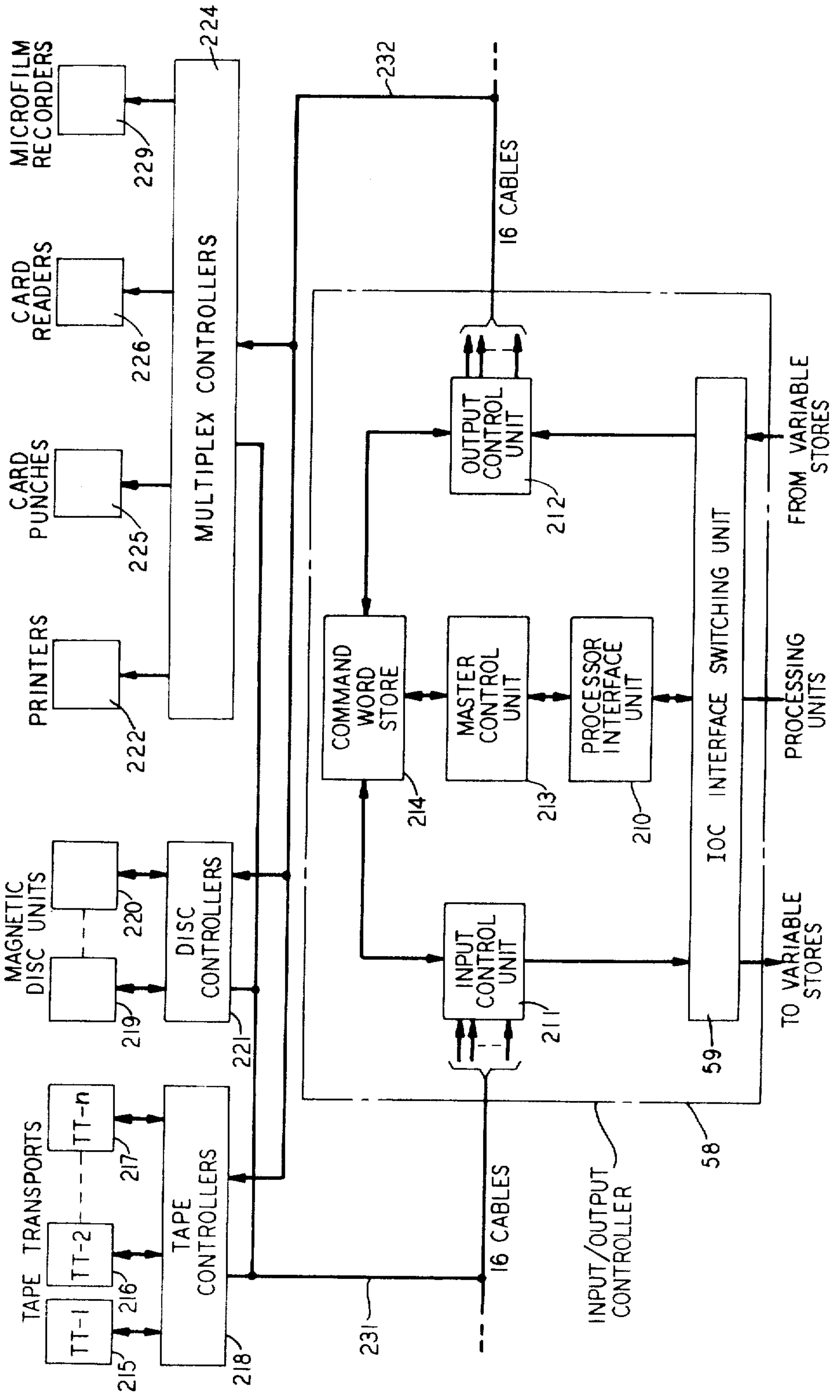
FIG. 10 is a more detailed block diagram of the input-output controller shown in FIG. 3.

In FIG. 10 there is shown a more detailed block diagram of the input-output controller shown as block 58 in FIG. 3 and the recording subsystem shown as block 16 in FIG. 1. The input-output controller 58 comprises input-output controller interface switching unit 59, a processor interface unit 210, an input control unit 211, an output control unit 212, a master control unit 213 and a command word store 214. Before proceeding to a detailed description of the operation of these units, a general overview of the functions of the input-output controller will be given.

The input-output controller (IOC) 58 directs the instruction flow form the processing units to the peripheral devices making up the recording subsystem. In FIG. 10, the peripheral devices are represented by the tape transport units 215, 216 and 217, under the control of the tape controllers 218; the magnetic disc units 219 through 220, controlled by the disc controllers 221; the printers 222, the card punch units 225, the card readers 226, and the microfilm recorders 229, all under the control of the multiplex controllers 224. All of these peripheral devices are well known to those of ordinary skill in the art.

The IOC 58 directs the instruction flow from the processing units to these peripheral devices, thus allowing the processing units to exert control over the peripheral devices, and also directs data flow between the variable store units and the peripheral devices. In the performance of this function, IOC unit 58 accepts and executes commands from the processing units or from any of the peripheral devices to initiate input and output function. Furthermore, the IOC unit 58 can direct the peripheral devices to perform input and output functions independent of the processing units.

The processing units are constructed so as to view the IOC unit 58 as a portion of the variable store and thereby render the IOC unit 58 completely independent of any particular processor except during that instant of time for which it is addressed by a particular processing unit. Commands are transferred to IOC unit 58 in the same fashion that store operations are transferred to variable store units from the processing unit. A processor store request to IOC unit 58 causes the IOC to accept a command word from the processing unit.

Under the control of command words from the processing unit, IOC 58 is able to retrieve, from the variable store units, detailed sequences of commands necessary to implement all of the input-output operations. In this way, following a single command from a processing unit, the input-output controller is able to operate completely independently from all of the processing units and to complete relatively large input and output functions with no further assistance form the processing units.

Returning to FIG. 10, the master control unit 213 maintains control over the entire IOC unit 58 and performs all of the bookkeeping functions required for IOC operation. It executes all of the control and monitoring commands except a few direct commands issued by the processing unit. Master control unit 213 initiates data transfer operation in both the input control unit 211 and the output control unit 212, terminates these operations and processes all internal IOC errors. Since there are no data paths between master control unit 213 and units outside of IOC 58, the master control unit 213 uses input control unit 211 when it is necessary to write a word into variable store and uses output control unit 212 when it is necessary to fetch a word form variable store. These same units are used to transmit and accept command words to and from the peripheral devices.

Processor interface unit 210 interfaces directly with the processing units. It therefore contains all of the processor interrupt circuits and executes commands received form the processing units.

Command word store 214 is a small, temporary storage facility having one location for each of the input cables 231 and each of the output cables 232. These locations are used by the master control unit 213 for temporary storage of data or order transfer commands for the associated channel.

Output control unit 212 controls the transfer of binary words from the variable store units to the peripheral devices. It is an asynchronous unit which, upon request from a peripheral device or from the master control unit 213, transfers the desired word or words from the variable store unit to the requesting unit. The necessary control and address information for such transfers is obtained from the associated storage location in command word store 214. Indeed, the placement of the appropriate command word in the associated location of command word store 214 is a signal to output control unit 212 to respond to the request from the associated peripheral devices. When the last data or order word is transferred to the peripheral device, a termination notice is sent by output control unit 212 to master control unit 213. Multiword transfers are handled by decrementing a word count field in the transfer command word stored in command word store 214.

The input control unit 211 is very similar to output control unit 212 except that it controls the transfer of binary data words from the peripheral devices to the variable store. It is likewise under control of command words stored in command word store 214.

Each peripheral device controller has an input and an output cable used to transfer binary information to and from the associated peripheral devices. An input-output cable pair, together with the associated control wires, is called an I/O channel and thus 16 channels are provided by the arrangement of FIG. 10. Each channel has an input termination and an output termination each of which is called a logical port, these ports being identified as port 0 and port 1. The 32 ports have been numbered consecutively from zero to 31 to permit port-oriented instruction formats.

There are three different types of binary words that can be transferred between IOC 58 and the peripheral devices. These are (1) command words containing control information for the master control unit 213; (2) order words intended as control information for the peripheral devices and (3) data words to be sent either to the variable store units or to the peripheral devices. The command words are transferred over the input cables, the order words over the output cables and the data words over both cables. The control wires are used to control these transfers.

The transfer of one or more order words and one or more data words is called an Order Transfer Job or a Data Transfer Job, respectively. The number of words to be transferred in one job is contained in a command word corresponding to that job. The input control unit 211 handles input data transfer jobs, while output control unit 212 handles output data transfer jobs and order transfer jobs. All of these jobs are initiated by the master control unit 213 but, once initiated, are controlled by the contents of command word store 214. When the control units 211 and 212 complete the job, a termination signal is sent to master control unit 213 to permit the initiation of the next sequence of operations.

The master control unit 213 includes two 64-bit history registers which contain information on the status of all the ports at all times. They are defined as history register 1 and history register 2. History register 1 contains the information on the availability of ports 0 through 19, while history register 2 contains the information on the availability of ports 20 to 31. The status of each port is represented by a three-bit code which is interpreted as follows:

| Code | Meaning |
|---|---|
| 000 | Port idle but not inhibited |
| 001 | Port inhibited |
| 010 | Order transfer in progress |
| 011 | Port inhibited during order transfer |
| 100 | Data transfer in progress |
| 101 | Port inhibited during data transfer |

Other status indications are possible with the remaining codes of the three-bit set.

---

A portion of history register 2 (bits 39 through 46) is called the Base Address Register and contains an eight-bit base address. The base address identifies the first location of a 2048-word block in the variable store units. Since detailed sequences of command words are stored in the variable store unit, this base address provides a reference to the appropriate sector of the variable store units for such sequences. The base address is used in the manner to be hereinafter described.

All words are transferred in an asynchronous manner through the use of a request pulse and an acknowledge pulse for each transmission of a word. Requests are sent by the unit desiring action and acknowledgements are returned to the requester to indicate that the action has been performed. If, for example, a peripheral device has obtained data which it wishes to transfer to the variable store unit, the peripheral device sends a request pulse to the IOC unit 58 and places the data word on the appropriate cable to input control unit 211. Input control unit 211 temporarily stores the word in a buffer register and sends an acknowledge pulse back to the peripheral device indicating that the word has been accepted. The peripheral device can then remove the binary word from the data cable and proceed to the next word by sending a request.

The input control unit 211 decodes the address portion of the received data and generates a write request for the appropriate variable store unit. The remainder of the variable store address, along with the data word, are then placed on liens to interface switching unit 59. The variable store unit acts on the request, accepts the data and address information and returns an acknowledge pulse to input control 211. Unit 211 can then remove the data and address words and proceed on to the next task.

When a peripheral device requests data from the variable store units, the address portion of the command word is decoded by output control unit 212 to generate a fetch request for the appropriate variable store unit. The variable store address is placed on the output lines to interface switching unit 59 and when the request is fulfilled, an acknowledgement is returned to output control unit 212. The fetched word is placed in buffer storage in output control unit 212 and then is gated to the appropriate peripheral device on the proper output cable, along with the acknowledgement indicating that the original request has been fulfilled.

Although control units 211 and 212 can operate on only one request at a time, these requests can be sent by any of the peripheral devices at any time. These requests are queued in the control units until they can be filled.

In order to understand the detailed program flow, it is first necessary to note the organization of a portion of the variable store units. The 79 word block of variable store locations, referred to by the base address register and called the deposit box, is set aside for use by IOC 58. The deposit box is analogous to a traffic policeman directing traffic and serves to switch and direct program initiation and flow.

The various I/O job and status lists which must be referred to as the IOC proceeds with its jobs are organized as a chained list of words called a link chain. These link chains are reached by locator words termed head pointers. The head pointers are stored in the deposit box. The head pointer contains two addresses; a link pointer address which locates the next word in a link chain and a command pointer address which locates the first command word of an I/O job to be executed. Only the head pointers (or locator words) need be stored in the deposit box; the link chains and I/O job programs may be located anywhere in variable store. The master control unit 213 includes a command counter for sequencing through the I/O routines referred to by the head pointer.

Before proceeding to a detailed explanation of the instruction repertoire of the input-output controller, it is necessary to point out some differences between processor and IOC instructions. The processor considers all IOC instructions as data. They are located physically in variable store and not in program store where the processor instructions are located. This permits dynamic modification of IOC programs during program execution.

The instruction repertoire is divided into direct commands, indirect commands, and peripheral commands. Direct commands are used to initiate input-output jobs in the course of, but independent of, the operating system. These commands are input to the IOC via the processor interface unit 210.

The indirect commands are the commands used by the IOC to implement the transfer of data or to control the IOC program sequence to accomplish a specific task. They are all stored in variable store prior to their use during program execution. As noted above, they form the contents of linked sequences for detailed task accomplishment.

The peripheral commands are initiated by the peripheral devices and sent to the IOC to initiate a job. The head pointer to the linked chains is a command word used by the IOC and the processors as a bookkeeping operator. The head pointer contains the information necessary for loading and taking words from variable store I/O job and status lists.

The following is a listing of the commands words recognized by the input-output controller:

Direct Commands: (From Processor Unit; 34-bit format)

| | | | |
|---|---|---|---|
| 1. | CL10 | | CLEAR IOC. Set the IOC to the initialized state, inhibiting all ports and clearing all intermediate registers. This command isolates the IOC from all peripherals in preparation for the receipt of the LBA command. |
| 2. | LBA | A | LOAD BASE ADDRESS. Loads a variable store address A into the base address register of the master control unit representing the first location of a deposit box. |
| 3. | CLPT | P | CLEAR PORT. Initialize the IOC port P. |
| 4. | CLCH | P | CLEAR CHANNEL. Initializes the channel P. (both ports). |
| 5. | ENPT | P | ENABLE PORT. Clears the inhibit from port P and allows it to resume execution of commands. |
| 6. | ENCH | P | ENABLE CHANNEL. Clears the inhibit from channel P and allows it to resume execution of commands. |
| 7. | INCH | P | INHIBIT CHANNEL. Inhibit the channel P from executing commands. |
| 8. | INPT | P | INHIBIT PORT. Inhibit the port P from executing commands (except STE, STEI, SEIO, and PUI). |
| 9. | IIO | P | INITIATE I/O OPERATION. Set the port P initiation flag. |
| 10 | SSA | P,A | SNAPSHOT ON ADDRESS. Compare variable store address associated with port P with address A. When they match, gate the next data word at port P to the snapshot data register. |
| 11. | SSW | P, BE, D, WC | SNAPSHOT ON WORD COUNT COMMAND. Count items D on port P until count BE is reached. Then count the word transfers on port P to count WC and gate next word at port P into snapshot data register. |

The following commands are recognized by the input-output controller, but come from variable store as data, rather than from the processor unit.

Indirect Commands (64-bit format)

| | | | |
|---|---|---|---|
| 12. | FAST | A1, A2, E | FETCH AND STORE. Fetch the contents of variable store location A2 and store in variable store location A1. If E is a "1," obtain the next command from next variable store location following this command. If E is "0," terminate the job. |
| 13. | ODT | Δ,W,E L,A | OUTPUT DATA TRANSFER. Transfer W+1 words from A in variable store to the peripheral device associated with this port. Increment A by Δ and decrement W by one after each transfer until W=0. If E=1, get next command from L; if E=0, terminate. If L=0, get the next command from the next variable store location. |
| 14. | ORT | Δ,W,E, L,A | OUTPUT ORDER TRANSFER. Same as ODT except that order words rather than data words are transferred to the peripheral device. |
| 15. | IDT | Δ,W,E, L,A | INPUT DATA TRANSFER. Inverse of ODT, for transferring data from the peripheral device to the variable store. |
| 16. | LO | E,L,A | LOCK. Biased fetch from variable store at A. If bits zero and one are "1," store location from which LO was fetched in the deposit box; if bits zero and one are not "11," obtain the next command from L. If L=0, use the present location plus two. |
| 17. | ULO | E,L,A | UNLOCK. Fetch the word from variable store at A, reset bits zero and one to "0" and restore to A. If E=1, get next command from L; if E=0, terminate. If L=0, get the next command from the next variable store location. |
| 18. | SBO | F,E,A | SET BIT TO LOGIC 0. Fetch word A, set bit F to "0" and restore to A. If E=1, obtain next command from the next variable store location; if E=0, terminate. |
| 19. | SB1 | F,E,A | SET BIT TO LOGIC 1. Fetch word A, set bit F to "1" and restore to A. If E=1, obtain next command from the next variable store location; if E=0, terminate. |

| | | | |
|---|---|---|---|
| 20. | RA | E,L,A | RECORD ADDRESS. Store the address portion of the data transfer command (ODT, ODTS, ORT, IDT, IDTS) associated with this port in A. If E=1, obtain next command from L; if E=0, terminate. If L=0, sequence to next variable store location. |
| 21. | TRA | E,A | TRANSFER. If E=1, obtain next command from A; if E=0, terminate. |
| 22. | TSK | F,M,E, J,A | TEST, SKIP. Fetch word A from variable store and OR test F half of word with mask M. If test produces all "1's," take the next command from the location of present command +J; if not, take the next command from the location following the present command (E=1) or terminate (E=0). |
| 23. | SBTS | F,M,E, J,A | SET BIT, TEST, SKIP. Fetch word A, set bit F to "1" and restore to A. Before restoring, OR test set bit half of word with M. If test produces all "1's," take the next command from present location +J; if not, take the next command from present location +2(E=1) or terminate (E=0). |
| 24. | TST1 | (Pattern) | TEST 1. Store this command in the command word store as specified by this port. Set port busy flag. |
| 25. | TST2 | (Pattern) | TEST 2. Same as TEST 1. |
| 26. | FASM | A1, A2,E | FETCH AND STORE MODIFIED. Fetch variable store words A and A2, substitute bits 12–31 of A1 for bits 12–31 of A2, and restore results to A2. If E=1, obtain next command from the location following the location of this command; if E= 0, terminate. |
| 27. | FIX | U,E, L,A | FETCH AND STORE INDEX. Fetch the contents of A and store in control register 2. Add U and restore to A. If E=1, obtain next command from L; if E=0, terminate. If L=0, sequence to next variable store location. |
| 28. | TSSB | F,M,E, J,A | TEST, SKIP, SET BIT. Fetch contents of A, OR test F half of word with M, set F bit to "1" and restore to A. If test produces all "1's," obtain next command from variable store at the location of the present command +J; if not, obtain next command from the next following variable store location (E=1) or terminate (E=0). |
| 29. | IDTS | Δ,W,E, L,A | INPUT DATA TRANSFER SNAPSHOT. Same as IDT. Reset snapshot register if it contains SSW with bit 17 set. |
| 30. | ODTS | Δ,W,E, L,A | OUTPUT DATA TRANSFER SNAPSHOT. Same as ODT. Reset snapshot register if it contains SSW with bit 17 set. |
| 31. | RCW | E,L,A, | RECORD COMMAND WORD. Store the command word associated with this port in A. If E=1, get next command from L; if E=0, terminate. If L=0, increment to next variable store location. |
| 32. | RC2 | E,A | RECORD C2 COMMAND. Store the contents of control register 2 in A. If E=1, get next command by incrementing the variable store address counter; if E=0, terminate. |
| 33. | IIC | E,A1, A2 | INSERT INTO CHAIN COMMAND. Biased fetch (from A2) a head pointer. If lockout bits=11, store location of this command into the deposit box. If the lockout bit≠11, fetch A2 link word and restore to A1, storing IIC in A2. If E=1, increment Variable Store address counter; if E=0, terminate. |
| 34. | BOPE | A1, A2 | BRANCH ON PERIPHERAL END. If PRIO flag is set, get next command from A1; if SEIO flag is set, get next command from A2. If neither is set, get next command from the next variable store location. |
| 35. | RBOPE | A1,A2 | RECORD C2, BRANCH ON PERIPHERAL COMMAND Store the contents of control register at A2. If PRIO or SRIO flag is set, get next command from A1; if neither, use the next variable store location. |
| 36. | LSBOU | O,F,E, A1,A2 | LOCK, SET BIT TO LOGIC 0, UNLOCK. Biased fetch A2. If bits 1 and 2 are "11," load address of this command in the deposit box. If "11," and O=1, set bit F to "0" and restore. If 0, fetch A1, set bit F to "0" and restore. If E=1, obtain next command from the next location; if E=0, terminate. |
| 37. | LSB1U | O,F,E, A1,A2 | LOCK, SET BIT TO LOGIC 1, UNLOCK. Same as LSBOU except set F bit to "1." |
| 38. | LSBTSU | O,F, M,J,A | LOCK, SET BIT, TEST, SKIP, UNLOCK. Biased fetch of A. If L=11, store the location of this command in the deposit box. If L≠11, OR F half of word with M and set bit F to "1." If O=0, restore with L bits cleared, to A1; if O=1, set L bits to "11" and restore. If OR produces all ones, get next command from present location +J. If not and E=1, go to next location. If E=0, terminate. |
| 39. | UHR1 | E,A | UNLOAD HISTORY REGISTER 1. Store the contents of history register 1 in variable store at A. If E=1, get next command; if E=0, terminate. |
| 40. | UHR2 | E,A | UNLOAD HISTORY REGISTER 2. Store the contents of history register 2 in variable store at A. If E=1, get next command in variable store; if E=0, terminate. |
| 41. | ULH | E,A | UNLOAD LOCK HISTORY REGISTER. Store the contents of the lock history register at A. If E=1, get next command from next variable store location; if E=0, terminate. |
| 42. | USS | E,P,A | UNLOAD SPECIFIED COMMAND WORD STORE LOCATION. Store the contents of the command word store specified by P in variable store at A. If E=1, get the next command from the next variable store location; if E=0, terminate. |

The following commands are recognized by the input-output controller and come from any one of the peripheral devices.

Peripheral Commands (32-bit format)

| | | | |
|---|---|---|---|
| 43. | BBT | I,U | BEGIN BLOCK TRANSFER. Fetch the contents of variable store at BAR +(requesting channel number) +80; using fetched word as address, fetch the contents, Z, of that word plus U, executing the command at Z on port I. (U must be even). BAR is the base address register, holding the address of the deposit box. |
| 44. | EBT | I,U | END BLOCK TRANSFER. Fetch the command in command word store at (requesting channel) +I. Fetch the contents, Z, of the VS location specified by BAR +(requesting channel number) +80. Store the fetched command word in Z +U. |
| 45. | DEN | I,U, | DIRECT ENTRY. Same as BBT, except it cannot be used to initiate any sequence including ODT, ODTB, IDT, IDTB, ORT or LO. |
| 46. | EIO | I | END I/O OPERATION. Terminate the operation on (requesting port) +I and set the PEIO flag. Fetch command from command word store at requesting port; if E=1, obtain next command from L. |
| 47. | PIIO | I,U | PERIPHERAL INITIATE I/O. Fetch the contents of variable store at BAR +(requesting channel) +64. Fetch the head pointer using the fetched address +U. Continue as IIO. |
| 48. | STEI | I,N,W | STATUS ENTRY INDEXED. Fetch the contents of variable store at BAR +(requesting channel) +128 |

| | | |
|---|---|---|
| | | Using this as an address and adding N, fetch the status entry head pointer, execute and up date. |
| 49. SEIO | I,N,W | STATUS ENTRY AND END I/O OPERATION. Fetch the contents of variable store at BAR +(requesting channel) +128. Using the fetched address +N, fetch a status entry head pointer, execute and up date. |
| 50. PUI | N,H | PROCESSOR UNIT INTERRUPT. Fetch the contents Z of variable store at BAR +154. Fetch interrupt test head pointer at Z in variable store and execute. Interrupt processor N (if N=0, interrupt first available processor). |

Figure 11:
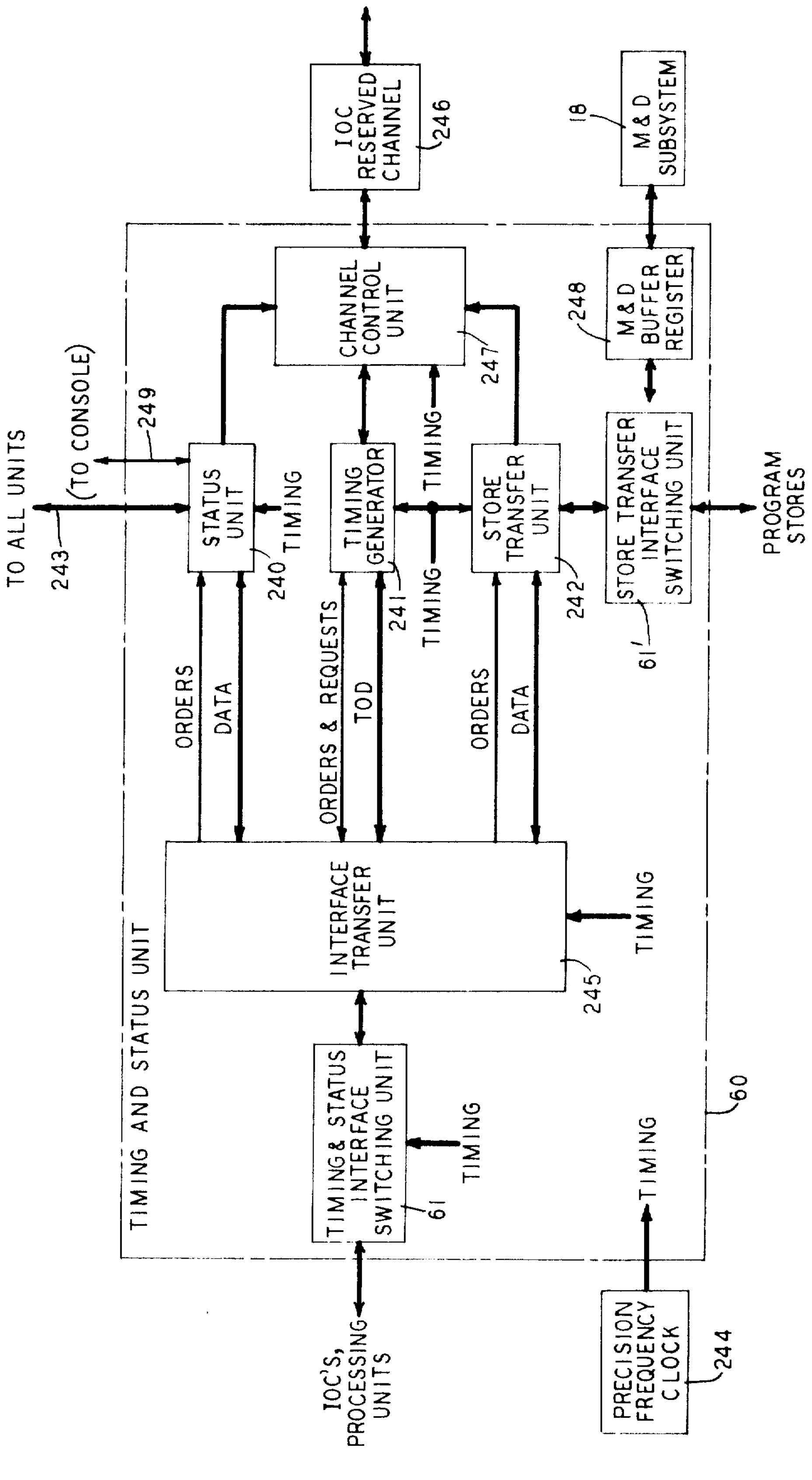
FIG. 11 is a more detailed block diagram of the timing and status unit shown in FIG. 3.

In FIG. 11 there is shown a more detailed block diagram of the timing and status unit 60 shown in block form in FIG. 3. The timing and status unit 60 includes three major subunits, the status unit 240, the timing generator 241, and the store transfer unit 242. Each of these units performs a particular function for the overall data processing system. The status unit 240 for example, forms the interface with a status console which is used by operating personnel to monitor the operation of the system, to extract data from the system and to insert data into the system for the purpose of maintenance and control. In addition, the status unit 240 collects, stores and dispenses a considerable amount of basic status information concerning the operating system. It is interconnected with all of the other units of the data processing system by status lines 243 which permit the collection of status information independent of all of the normal data paths in the operating system.

The timing generator 241 interfaces between the operating system and the precision frequency clock 244. Clock 244 provides the basic timing for the entire data processing system. The timing generator 241 originates command words to the input-output controller to cause that controller to perform specific sequences of operations at specific times. The timing generator 241 also provides real time pulses to the peripheral devices of FIG. 10 to control the timing of peripheral operations. In addition, the timing generator 241 can provide the calendar clock time-of-day (TOD) to the processing units or to the input-output controllers upon request.

The precision frequency clock 244 provides a 5 mHz timing signal to the timing generator 241 which includes a 48-bit calendar clock TOD counter. The least significant bit of this TOD counter, therefore, represents 0.2 microseconds and the full count of the clock is equal to approximately 1 year. In addition, the precision frequency clock 244 provides a 42-bit binary-coded-decimal (BCD) word to the timing generator where the least significant bit is equal to 1 millisecond. A processing unit can request this BCD TOD in order to synchronize the precision frequency clock 244 and the timing generator 241.

The store transfer unit 242 has the single purpose of altering the contents of the program stores 52 and 53 of FIG. 3. It is the only unit which has this capability and thus all program store modifications must be accomplished through store transfer unit 242. The store transfer unit 242 receives order and data words and distributes program store modifications by way of the store transfer interface switching unit 61' to the appropriate program store units. The store transfer unit 242 also monitors errors in the received information and reports these errors as status information to the status unit 240.

The three units described above share communication paths into and out of the timing status unit 60. One of these paths is by way os the timing and status interface switching unit 61. Status interface switching unit 61 away from the timing and status interface switching unit 61 in much the same fashion that it is transferred into and out of the other major units, such as the variable store unit. In order to permit standardization of the interface switching units, an interface transfer unit 245 is provided to multiplex the access of the status unit 240, the timing generator 241 and the store transfer unit 242 into the single interface switching unit 61.

In order to provide a means of interrupting the operating system, the three functional units 240, 241 and 242 also share a single channel 246 of the input-output controller. This channel sharing is under the control of a channel control unit 247.

The maintenance diagnostic subsystem 18 also interfaces with the timing and status unit 60 by way of the M & D buffer register 248. In this way, the maintenance diagnostic subsystem 18 can receive reports from and control the operation of the entire timing and status unit 60.

The status unit 240 has four major interfaces. These interfaces consist of the manual interface between the status control console and the status unit by way of leads 249, the hardwired interface between the status unit 240 and all of the other units of the central logic and control by way of leads 243, and the two software interfaces by way of the interface switching unit 61 and the IOC channel 246. It is the purpose of the status unit to collect system status information, to inform the operating programs of the system's status, and to execute those functions initiated by the software and distributed by the hardwired interface. One of these hardwired outputs comprises the lockout signals that are able to inhibit data transfers at the interface switching unit, and thus permit system partitioning, segmenting and isolation. The status unit 240 utilizes the IOC channel 246 for interrupt purposes whenever a significant change occurs in the system status.

Figure 12:
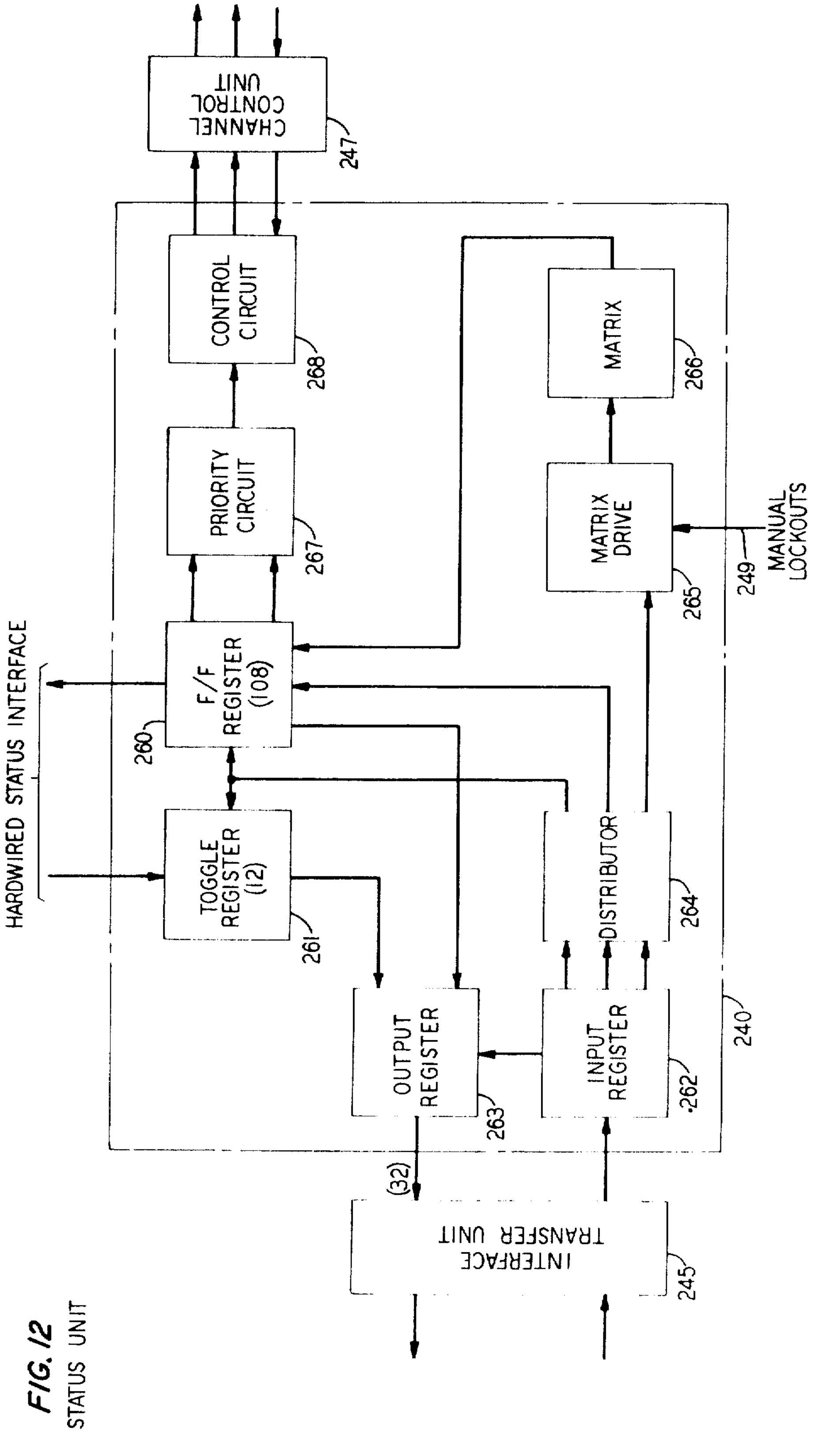
FIG. 12 is a yet more detailed block diagram of the status portion of the timing and status unit of FIG. 11.

A more detailed block diagram of the status unit 240 can be found in FIG. 12. As illustrated in FIG. 12, the status unit includes a plurality of status registers divided into two basic types referred to as the flip-flop registers 260 and the toggle registers 261. There are provided 108 of the flip-flop registers 260 and 12 of the toggle registers 261, thus making 120 registers altogether. Each status register interfaces exclusively with a particular module of the data processing system.

Communication with the status unit 240 by way of interface transfer unit 245 is by way of an input register 262 for receiving information into the status unit 240 and an output register 203 for transferring information from the status unit. Input register 262 distributes data and order words by way of distributor 264 to the flip-flop registers 260, the toggle registers 261 and the matrix drive circuit 265. In addition to being controlled by program-derived signals from distributor 264, matrix drive 265 is also under the control of manually derived signals from the status control console by way of leads 249. The matrix drive circuit 265, together with the matrix circuit 266, provide the basic lockout system for the data processing circuits. In general, a cross-point type of matrix is provided whereby the coincidence of lockout requests from the various units are sued to generate lockout signals which control the actual interruption of data transfers between these units. These lockout signals are distributed by way of flip-flop registers 260 to the various interface switching units at which the lockout is effectuated.

The status information in flip-flop register 260 is continually monitored to ascertain the status conditions in the central logic and control. These status indications are ordered, as to priority, priority circuit 267, and appropriate correctional or interrupt operations initiated by signals generated in control circuit 268 and transferred to the input-output controller by way of channel control unit 247.

The 120 status words register in 261 and 262 are associated with various hardware units of the data processing system on a one-for-one basis in most cases. Thus 16 status words are available and correspond to the 16 variable store units; 32 status words are available and correspond to the 32 program store units; and 10 status words are available to correspond to the 10 processing units. Some of the units, such as the timing and status units, require five different words to represent all of the status information with respect to that unit. Status words are also available to represent the status of the various peripheral units illustrated in FIG. 10 as well as various units external to the central logic and control 15 of FIG. 1.

Each bit of each status word represents a particular status condition with regard to the corresponding hardware unit.

These words are 24 bits in length. For the purpose of illustration, the following are the designations of the status bits for three types of status words.

VARIABLE STORE STATUS WORD

| Bit No. | |
|---|---|
| 0 | Test Enable |
| 1 | Data Parity Error |
| 2 | Address Parity Error |
| 3 | GSB T/O Error |
| 4 | PU 1 Lockout |
| 5 | PU 2 Lockout |
| 6 | PU 3 Lockout |
| 7 | PU 4 Lockout |
| 8 | PU 5 Lockout |
| 9 | PU 6 Lockout |
| 10 | PU 7 Lockout |
| 11 | PU 8 Lockout |
| 12 | PU 9 Lockout |
| 13 | PU 10 Lockout |
| 14 | IOC 1 Lockout |
| 15 | IOC 2 Lockout |
| 16 | IOC 3 Lockout |
| 17 | IOC 4 Lockout |
| 18 | Power ON |
| 19 | Interlock |
| 20 | Power Marginal |
| 21 | Spare |
| 22 | Spare |
| 23 | spare |

PROGRAM STORE STATUS WORD

| Bit No. | |
|---|---|
| 0 | Test Enable |
| 1 | Data Parity Error |
| 2 | Address Parity Error |
| 3 | Resume T/O Error |
| 4 | GSB T/O Error |
| 5 | PU 1 Lockout |
| 6 | PU 2 Lockout |
| 7 | PU 3 Lockout |
| 8 | PU 4 Lockout |
| 9 | PU 5 Lockout |
| 10 | PU 6 Lockout |
| 11 | PU 7 Lockout |
| 12 | PU 8 Lockout |
| 13 | PU 9 Lockout |
| 14 | PU 10 Lockout |
| 15 | STU 1 Lockout |
| 16 | STU 2 Lockout |
| 17 | DUP Mode PS 0 & 16 |
| 18 | Power On |
| 19 | Interlock |
| 20 | Power Marginal |
| 21 | Spare |
| 22 | Spare |
| 23 | Spare |

IOC STATUS WORD

| Bit No. | |
|---|---|
| 0 | Test Enable |
| 1 | PIU Fault |
| 2 | Error While Servicing Error |
| 3 | Error test Lockout |
| 4 | IOC 2 Lockout |
| 5 | IOC 3 Lockout |
| 6 | IOC 4 Lockout |
| 7 | PU 1 Lockout |
| 8 | PU 2 Lockout |
| 9 | PU 3 Lockout |
| 10 | PU 4 Lockout |
| 11 | PU 5 Lockout |
| 12 | PU 6 Lockout |
| 13 | PU 7 Lockout |
| 14 | PU 8 Lockout |
| 15 | PU 9 Lockout |
| 16 | PU 10 Lockout |
| 17 | IOC 1 Lockout |
| 18 | Power On |
| 19 | Interlock |
| 20 | Power Marginal |
| 21 | Spare |
| 22 | Spare |
| 23 | Spare |

Figure 13:
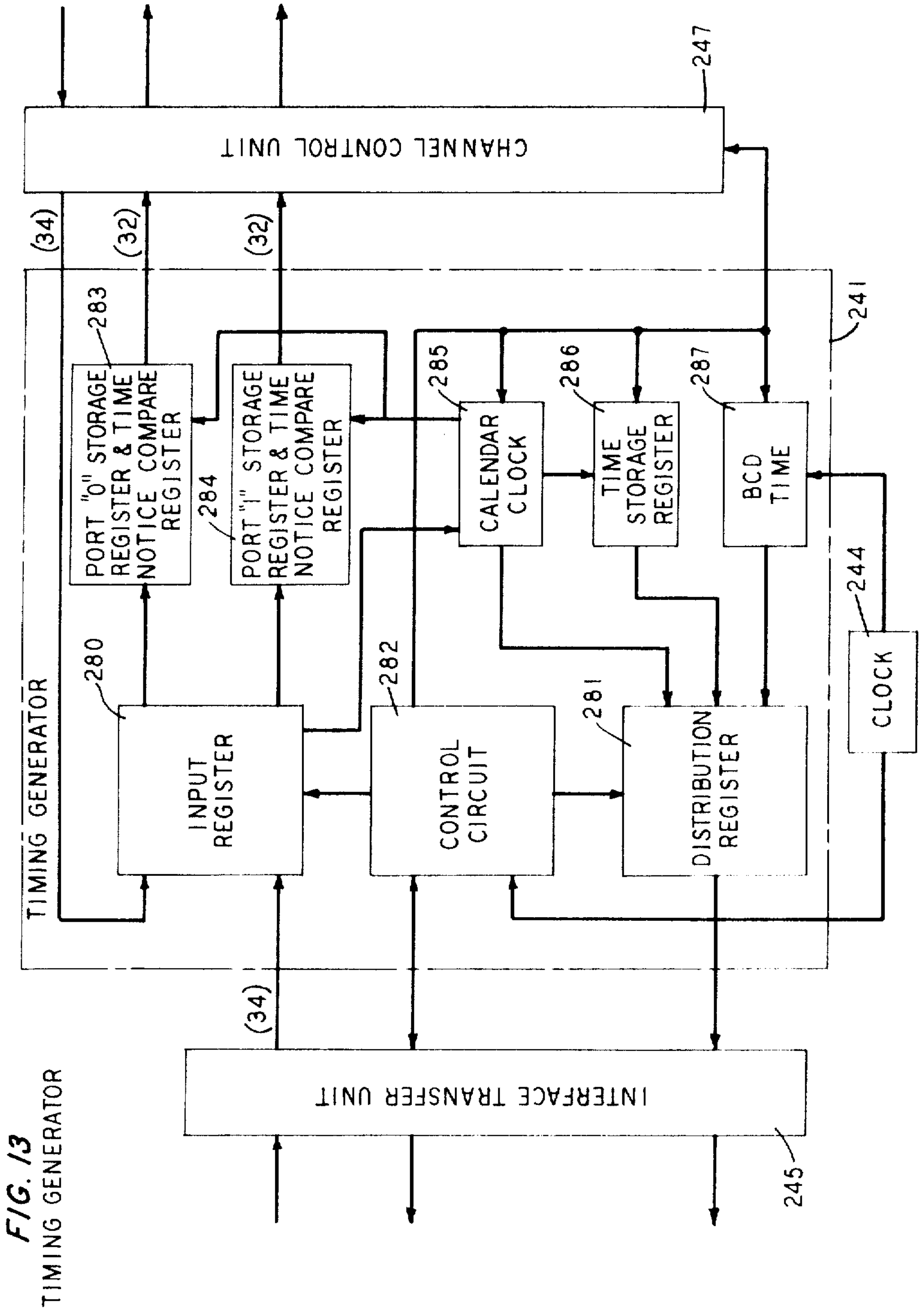
FIG. 13 is a more detailed block diagram of the timing generator portion of the timing and status unit of FIG. 11.

In FIG. 13 there is shown a more detailed block diagram of the timing generator 241 (FIG. 11) including an input register, 280 and a distribution register 281 for receiving and distributing data to and from the timing generator 241. Order words are received and distributed by a control circuit 282 by way of interface transfer unit 245. Control circuit 282 controls the movement of data into and from registers 280 and 281. Data in input register 280, for example, can be transferred to a port "0" storage register 283 or received from port "1 " storage register 284 to permit exchange of data with the input-output controller by way of the channel control unit 247.

The control circuit 282 also controls the calendar time-of-day clock 285, time the storage register 286, and the BCD register 287. In response to an appropriate order word, control circuit 282 causes the contents of calendar clock 285 to be read into time storage register 286 for transfer, by way of distribution register 218 and interface transfer unit 245, to a processing unit requesting time-of-day information. Similarly, in response to a request, control circuit 282 causes the BCD time-of-day from clock 244 to be entered into BCD time register 287, thereafter to be transferred, by way of distribution register 281 and interface transfer unit 245, to a requesting processing unit.

Figure 14:
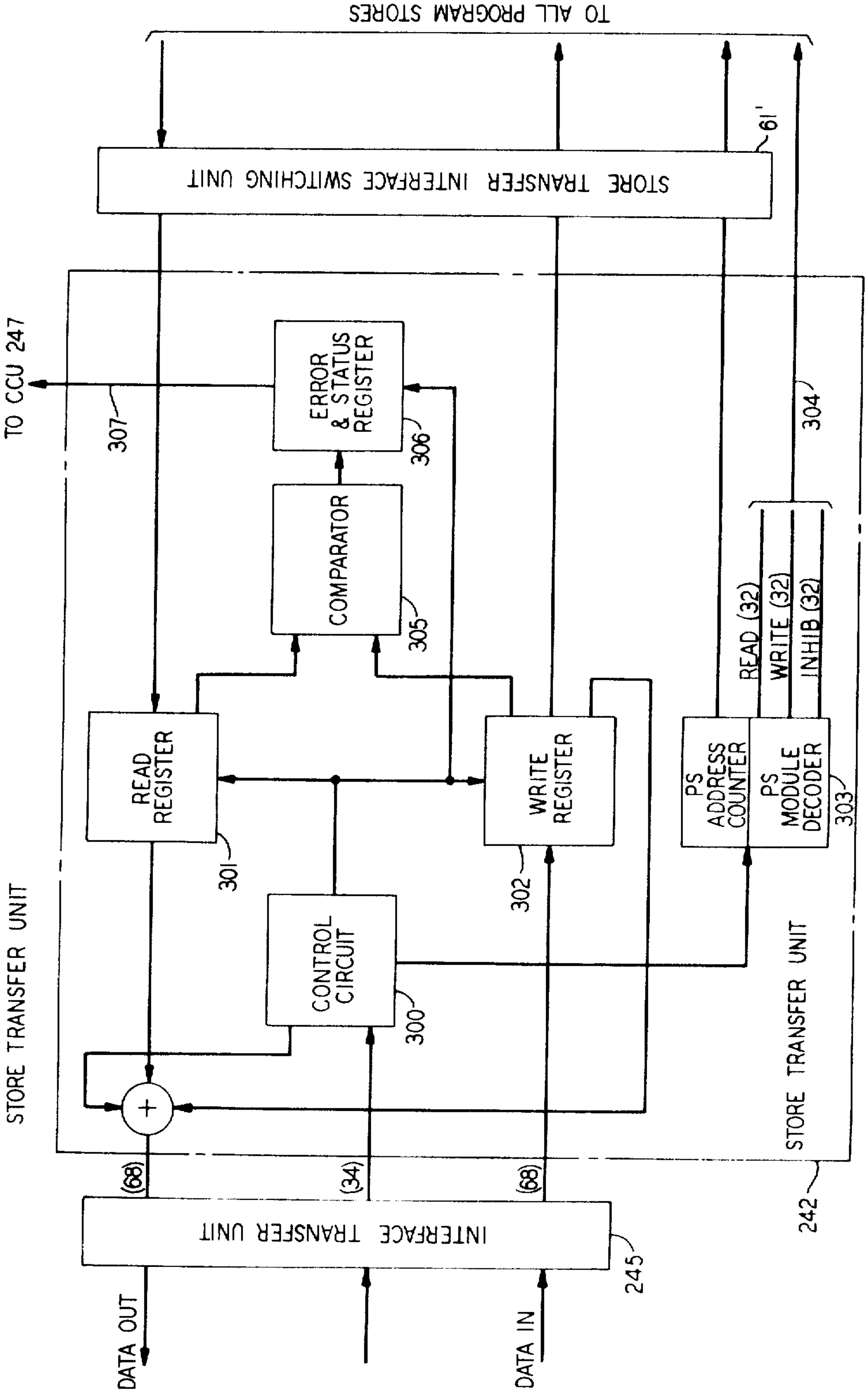
FIG. 14 is a more detailed block diagram of the store transfer portion of the timing and status unit of FIG. 11.

In FIG. 14 there is shown a more detailed block diagram of the store transfer unit 242 (FIG. 11) including a control circuit 300 which receives orders for execution by the store transfer unit. The store transfer unit receives program words from the program store units by way of interface switching unit 61' into read register 301. Similarly, program words to be stored in the program store units are entered into write register 302 and distributed to the program store units by way of interface switching unit 61'.

Control circuit 300 also controls a program store address counter and module decoder 303. Circuit 303 holds the identity of the particular program store module which is being written into or read from and decodes this identification to generate access signals leads on 304. These access signals include three types; read, write and inhibit. Unit 303 also includes a counter circuit for identifying the particular address within the identified program store module. This address register is in the form of a counter so that the program store addresses may be accessed sequentially without receiving further directions from the outside of the store transfer unit.

A comparative circuit 305 is provided to compare the contents of read register 301 and write register 302. In this way, a program word just read from the program store module can be compared with the program word to be written into that same program store location. If a match does not occur, an error signal is transferred t0 error and status register 306 to indicate the discrepancy. This signal is transferred by way of leads 307 to the channel control unit 247 and then to the input-output controller for interrupt purposes.

In order to better understand the operation of the timing and status unit, including the operation of the timing generator, the status unit and the store transfer unit, the following order words are described in detail. These words direct the execution of the particular operations by the respective units. They are divided into three sets, one set for each unit.

Timing Generator Orders

| | | | |
|---|---|---|---|
| 1. | MC | P | MASTER CLEAR. Clear all registers of the timing generator and flip-flops for port P, and inhibit order requests. |
| 2. | ETNC | P | ENABLE TIME NOTICE COMPARATOR. Clear the MC and DTNC inhibits, clear the late order counter and load a BBT request for port P to initiate the sending of orders to the timing generator from the input-output controller master control unit. |

| | | |
|---|---|---|
| 3. DTNC | P tf | DISABLE TIME NOTICE COMPARATOR. Inhibit new order requests for Port P. (Normally, after the completion of each order, a BBT request is sent to the IOC to obtain new orders). The inhibit can be released only by ETNC. |
| 4. SMO | P, (masks) | SET MASK ORDER. This order sets comparison masks for the indicated port P. These masks include a compare mask, a late order mask and a program repetition period (PRP) mask, one of each for each of ports 0 and 1. |
| 5. GTN | P,TN, CWP | GENERATE TIME NOTICE. Compare the time notice (TN) with the calendar clock time-of-day (TOD) and, when equal, load a COMP request for port P into the priority list. When executed, the COMP causes the command word CWP to be sent to the IOC. |
| 6. GTP | P,TN, DC | GENERATE TIME PULSE. Compare the time notice TN with the calendar clock time-of-day (TOD) and, when equal, send real time pulses to the peripheral devices specified by the distribution code DC. |
| 7. GNP | P,TN, DC | GENERATE NOTICE AND PULSE. Compare the time notice TN with the calendar clock time-of-day (TOD) and, when equal, send real time pulses to the peripheral devices specified by DC, and load a COMP into the priority list to send CWP to the IOC. |
| 8. LRR | RT | LOAD RESET REGISTER. Transfer the reset time RT to the counter reset register. In response to a later gating pulse, the calendar clock is reset to this value. |
| 9. TTA | P,TW | TEST TURNAROUND. Transfer test word TW into the port P storage register and load a TTA request into the priority list. When executed, the TTA request sends a BBT to the IOC which, in turn, requests transfer of the test word TW. |

Status Unit Orders

| | | |
|---|---|---|
| 10. MC | | MASTER CLEAR. Clear all status unit control registers, inhibiting all hardwired status bit interfaces. This lock can be removed only by UHI. (Does not clear the status word registers). |
| 11. RC | | REGISTER CLEAR. Clear all status word registers. |
| 12. SAB | WA,BI | SET ADDRESSED BIT. Set the bits in the word at address WA as indicated by the bit indicators BI. |
| 13. CAB | WA,BI | CLEAR ADDRESSED BIT. Clear the bits in the word at address WA as indicated by the bit indicators BI. |
| 14. UHI | | UNLOCK HARDWIRED INTERFACE. Remove the locks imposed by MC or LWIO. |
| 15. LWHI | WG,WI | LOCK WORD HARDWIRED INPUT. Place an inhibit on the hardwired inputs to the status words specified by the word group (WG) and word indicator (WI) fields, and remove all other input inhibits. Does not affect partition inhibits. |
| 16. LWHO | WG,WI | LOCK WORD HARDWIRED OUTPUT. Place an inhibit on the hardwired outputs from the status words specified by the word group (WG) and word indicator (WI) field, and remove all other output inhibits. Does not affect partition inhibits. |
| 17. LWIO | WG,WI | LOCK WORD INPUT-OUTPUT. Place inhibits on both the hardwired inputs and the hardwired outputs from the status words specified by WG and WI, clearing all other inhibits. |
| 18. DAWR | WG,WI | DISABLE ADDRESSED WORD REQUEST. Disable the words specified by WG and WI from generating their respective command word interrupts. Can be removed only by EAWR. |
| 19. EAWR | WG,WI | ENABLE ADDRESSED WORD REQUEST. Remove the enable from the words specified by WG and WI imposed by DAWR. |
| 20. EPPC | | ENABLE PROGRAM PARTITION CONTROL. Impose all of the previously received program-controlled partitioning orders (SPT, SPC, CPC) on the system by locking the appropriate partitioning control leads. |
| 21. DPPC | | DISABLE PROGRAM PARTITION CONTROL. Remove the partitioning imposed by EPPC (The pattern is preserved, however, for further use by another EPPC order). |
| 22. SPD | A,B, BI | SET PARTITION DRIVE. Set the B one-half of the partition drive register A to the list pattern indicated by bit indicators BI. This order must be preceded by SPT, CPD or another SPD within specified time limits (partition time-out). |
| 23. CPD | A,B, BI | CLEAR PARTITION DRIVE. Clear the B one-half of the partition drive register at the bit positions indicated by bit indicators BI. (Must appear before partition time-out). |
| 24. SPT | | START PARTITION COUNTER. Start the partition time-out counter. |

Store Transfer Unit Orders

| | | |
|---|---|---|
| 25. MC | | MASTER CLEAR. Clear all data and control registers. |
| 26. NOOP | | NO OPERATION. Reset the time-out counter with no other operation. |
| 27. WRST | A | WRITE STORE. Write the program words appearing in the write register into the program store, beginning at location A and advancing the program store address counter (PSAC) for each write operation. |
| 28. RDST | A | READ STORE. Read program words into the read register, beginning at program store location A, and advancing the program store address counter (PSAC) for each read operation. |
| 29 RDWT | A | READ/WRITE. Fetch sequential program words into the read register, beginning at program store location A, forward these words to a processing unit for modification, and restore the modified words to the same program store locations via the write register, advancing the PSAC after each round trip. |
| 30. WRTC | A | WRITE/COMPARE. Write the program words appearing in the write register into the program store, beginning at location A, fetch the word back to the read register and compare with the just stored word, advancing the PSAC after each comparison. Whenever the two do not compare, set an error word in the error. |
| 31. VSTR | A | VERIFY STORE. Read the program words from the program store, beginning at location A, and compare these words with incoming words from the processor unit or the IOC, advancing the PSAC after each comparison. Whenever the two do not compare, set an error word in the error and status register. |
| 32. EOP | | END OPERATION. Terminate the task initiated by WRST, RDST, RDWT, WRTC or VSTR. |

The error indications from error and status register 306 (FIG. 14) can be summarized by the following list:

Each error is indicated by a different error word, each including a particular program store address.

1. Comparator Error. A compare error has occurred during the execution of WRTC or VSTR at the indicated program store address.
2. Data Parity Error at ITU. A parity error has been detected by the interface transfer unit (ITU) in data being transferred to or from the specified address.
3. Data Parity Error at PS. A parity error has been detected by the program store (PS) in an instruction being transferred to or from the specified address.
4. Address Parity Error. A parity error has been detected by the program store (PS) in this address.
5. Program Store Read Time Out. A specified time has elapsed since a read request has been sent to the program store at the specified address, and no acknowledgement has been received. Causes the PSAC to advance and an attempt is made to read the next word.
6. Program Store Write Time Out. A specified time has elapsed since a write request has been sent to the program store at the specified address, and no acknowledgement has been received. Causes the PSAC to advance and an attempt is made to write the next word.

Figure 15:
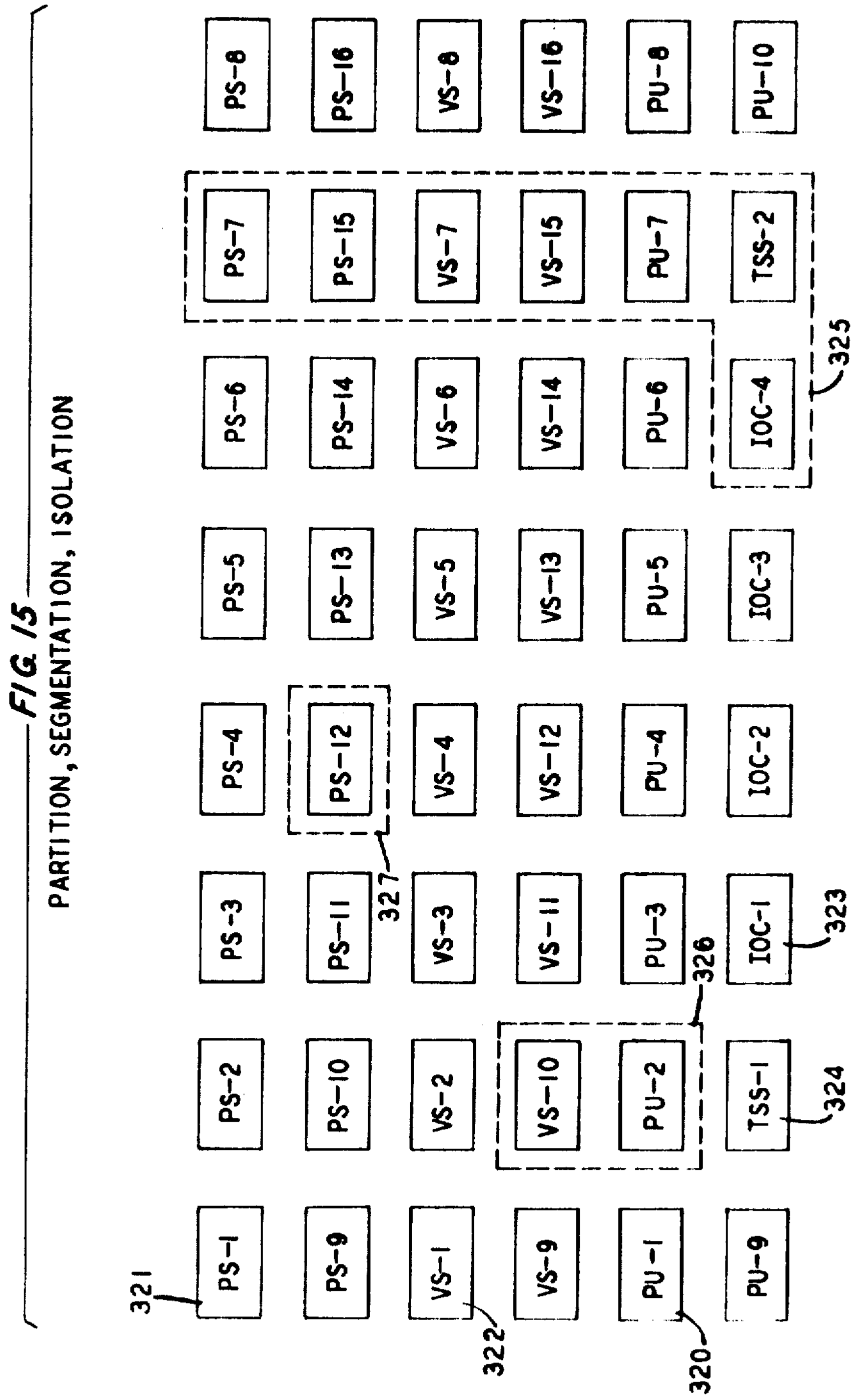
FIG. 15 is a graphical illustration of a multiprocessor computer showing the differences between partition, segmentation and isolation.

In FIG. 15 there is shown a graphical illustration of the partitioning, segmentation, and isolation capabilities of the data processing system in accordance with the present invention. Each block in FIG. 15 represents one of the major modules illustrated in FIG. 2. There are included in the data processing system ten processing units such as processing unit 320, 16 program store units such as program store unit 321, 16 variable store units such as variable store unit 322, four input-output controller units such as controller 323, and two timing and status units such as timing and status unit 324. The remainder of the units of the data processing system are peripheral subsystems to the central logic and control and may be viewed as an extension of the IOC or as part of the I/O subsystem.

A partition is defined as a combination of data processing modules including at least one processing unit, at least one program store unit, at least one variable store unit, at least one input-output controller, and at least one timing and status unit. Moreover, such a partition not only includes each of the basic types of units, but is also capable of independent operations as a stand-alone data processing system. One of the many possible partitions of the units illustrated in FIG. 15 is indicated by dashed block 325. In accordance with the above definition of partition, partition 325 is capable of accepting independent programs and independent data and processing that data in accordance with those programs with no reference whatsoever to the operations of the balance of the system. The balance of the system may, of course, be operating on a different program, using different data, all independently of partition 325.

A segment in the present context is defined as a plurality of basic units which is less than that required for independent data processing or which is not in fact being used for independent data processing. One such segment is illustrated by box 326 in FIG. 15. The purpose of segmentation might be, for example, to interact at least two of the units for diagnostic purposes, in initial setup, or for experimental purposes. Since a segment is not complete and cannot perform independent data processing operations, the interaction of the units of the segment must be controlled from an operator console.

Isolation in this context is defined as a separation of an individual unit from the balance of the system. The box 327 indicates one possible isolation of a program store unit. Isolation is normally necessary following the detection of a fault in the unit to be isolated. Once it is isolated, diagnostic tests may be performed o the unit to locate the fault. The fault may then be corrected and the isolated unit returned to service. Similarly, units may be maintained in an isolated condition as standby units for other units actively participating in data processing system. Since the modules of each of the module types are identical, such substitutions are possible.

The maintenance and diagnostic subsystem 18 (MDS) provides a unified and comprehensive means of maintenance for the various modules of the data processing system of FIG. 1. The major functions of the MDS 18 are:

1. To initialize the central logic and control 15,
2. To aid in system recovery,
3. To provide special paths for automatic or manual diagnostics, and
4. To provide a centralized control point for:
   1. Status monitoring
   b. Equipment allocation,
   c. Manual diagnostics, and
   d. Software debugging.

The MDS 18 utilizes special data paths 43 (FIG. 2) which provide access to critical registers of the operating modules of the data processing system. Normally, the MDS 18 is utilized automatically whenever routine exercises detect a fault. In such cases, software automatically accesses the special data paths of MDS 18 by way of channels of the IOC circuit 58 (FIG. 3). Software then attempts to diagnose and isolate the fault to a replaceable unit by using various test and diagnostic routines. If these procedures fail to isolate the fault, software transfers the task to manual control for further diagnostics.

Figure 16:
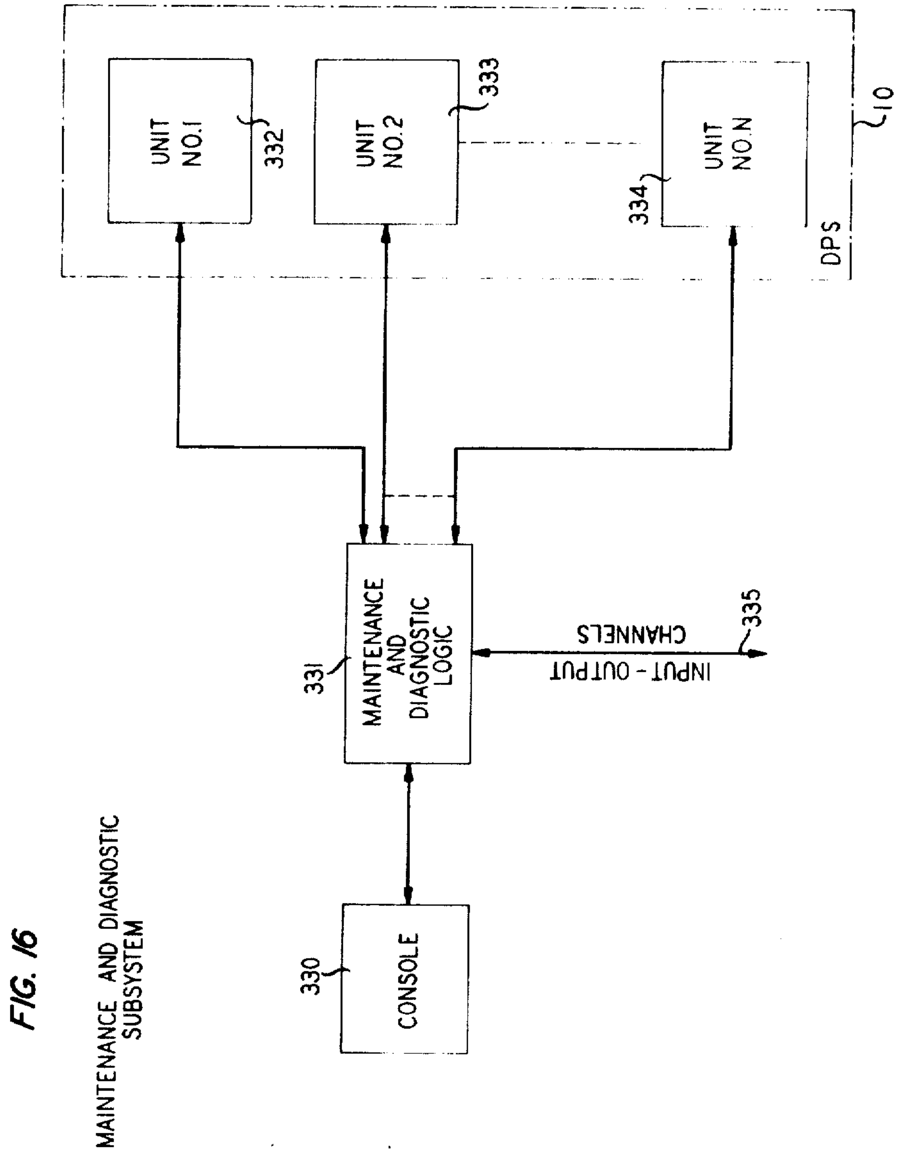
FIG. 16 is a general block diagram of the maintenance and diagnositc subsystem useful in the data processing system of FIG. 1.

In FIG. 16, a maintenance console 330 includes status display, manual controls, automatic controls, and various other control elements. A maintenance and diagnostic logic circuit 331 forms the interface between the console 330 and the modules 332, 333, 334 of the CLC 15. Logic circuit 331 also has access to IOC channels 335 for direct software control of this interface.

In general, fault detection, isolation and recovery for the data processing system 10 of FIG. 1 occur in the following echelons:

ROUTINE EXERCISES AND DETECTION PROGRAMS

These programs include real time exercises, diagnostic programs and various verification programs. These programs use the normal data paths as well as the data bussing system of the MDS subsystem.

ISOLATION AND SYSTEM RECOVERY

Once a fault is detected, one of two procedures is followed. If the fault is catastrophic, system recovery is initiated. If not, attempts are made, by programs, to isolate the faulty equipment, possibly by segmenting suspected modules.

AUTOMATIC DIAGNOSTICS

Once the faulty equipment is isolated, diagnostic programs are initiated. These programs use either the normal data paths or the MDS data bussing system, and attempt to isolate the fault to a single replaceable circuit.

SEMIAUTOMATIC DIAGNOSTICS

Should the above procedures fail to automatically isolate the fault to a replaceable circuit, then the operator can initiate semiautomatic procedures at the console by calling for routines, stored on magnetic tape, and utilizing the MDS bussing system.

MANUAL DIAGNOSTICS

If all of the above procedures fail to isolate the fault, the console operator can initiate manual tests at the console.

Figure 17:
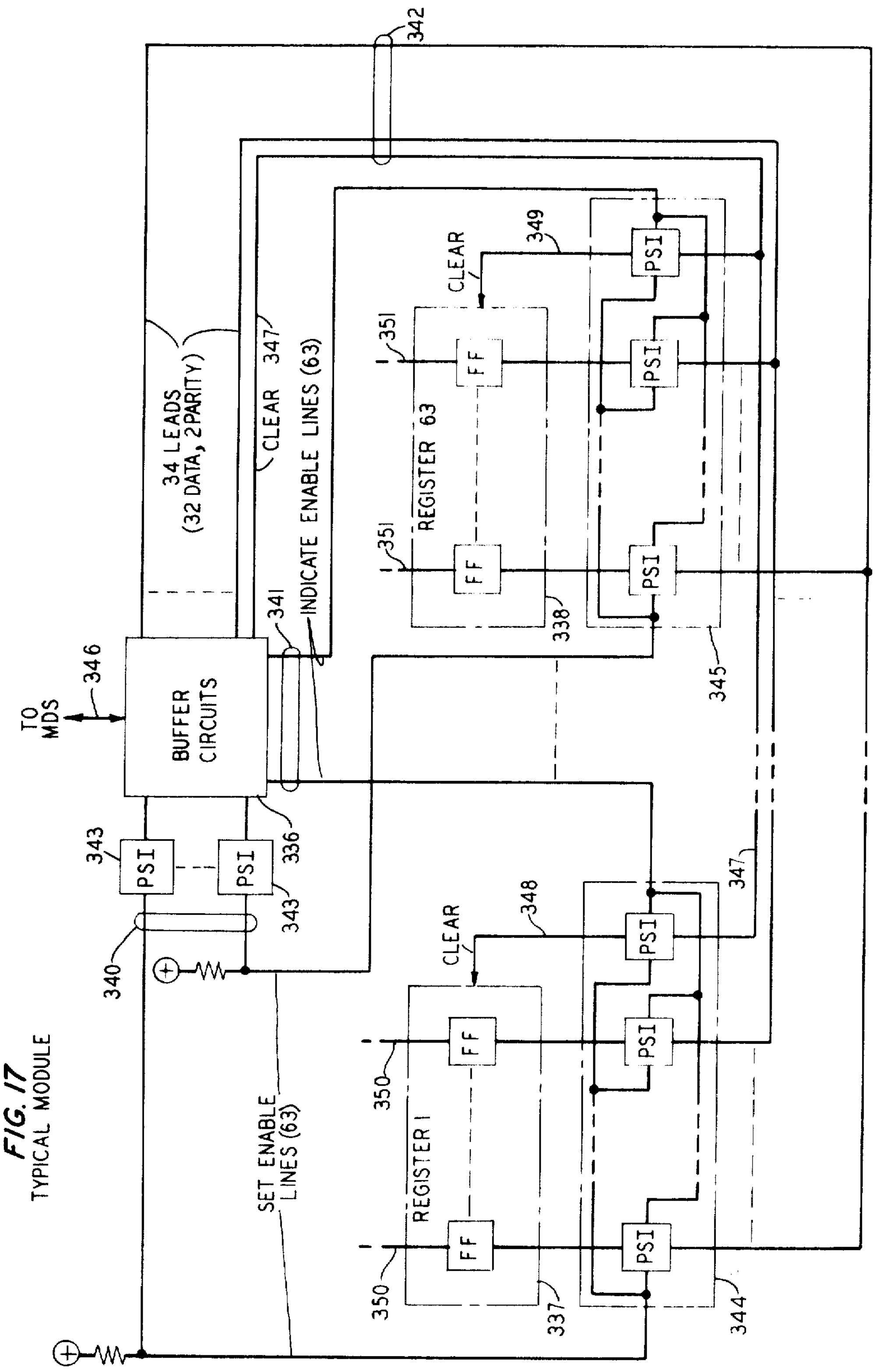
FIG. 17 is a block diagram of that portion of the maintenance and diagnostic subsystem associated with each module of the data processing system of FIG. 1.

In order to implement the independent data bussing for maintenance and diagnostics, special wiring and circuits are provided in each module of the data processing system. An arrangement in a typical module is illustrated in FIG. 17. A buffer circuit 336 is provided as the interface between the maintenance and diagnostic subsystem proper and the internal registers 337, 338 of the module. The buffer circuit, in general, receives data words, register addresses and control signals from the maintenance and diagnostic logic circuit 331 (FIG. 16) and inputs the data words into the internal registers 337, 338 or retrieves data from these registers, under the control of the register addresses and the control signals.

A set of 35 data lines 342 are provided to interconnect all of the internal registers 337, 338 to the buffer circuit 336. These lines are time-shared by the registers. Up to 63 different internal registers can be accommodated by the arrangement of FIG. 17. If a further member of registers must be accessed, additional buffer circuits such as buffer circuit 336 must be provided. If it is desired to provide access to registers smaller than 35 bits, or even single bit control flip-flops, these smaller registers and control flip-flops can be grouped together to form 35 bit ensembles and treated as a single word by the data bussing system.

In addition to the data lines 342, buffer circuit 336 also provides two basic control signals called "set enable" and "indicate enable."The set enable signals correspond to write the control signals and appear on leads 340. 63 such set enable signals are provided, one for each of the 63 registers 337, 338. A set enable signal on one of leads 340 causes the data then present on data lines 342 to be written into the identified register, Similarly, 63 indicate enable line 341 are provided, one for each of registers 337, 338, to read data from registers 337, 338, and place this data on data lines 342.

To protect the normal operation of the data circuits when the buffer circuits 336 are removed from the module for maintenance purposes, each of the set enable lines 340 must be isolated from the buffer circuit 336 by an isolation circuit 343, called a pulse set and indicate (PSI). The PSI circuits 343, to be described in detail hereinafter, prevent open circuits, appearing on the set enable lines 340 when buffer circuit 336 is removed, from affecting the operation of the balance of the circuit. Such isolation is not required for the indicate enable lines 341 since reading the contents of the registers 337, 338 does not interfere with their normal operation.

In order to provide reading and writing capability over a single set of data lines 342, each such line is isolated from the flip-flops of the register by a pulse set and indicate circuit. Thus, the flip-flops of register 337 are each connected through a pulse set and indicate circuit, contained in circuit 344, to the corresponding ones of data lines 342. Similarly, each flip-flop of register 338 is also connected through a pulse set and indicate circuit, contained in circuit 345, to the corresponding one of data lines 342. The set enable signals on leads 340 are connected to the PSI circuits 344 and 345 to control the writing of data from data lines 342 to registers 337, 338, while the indicate enable signals on leads 341 are connected to the PSI circuits 344, 345, to control the reading of data from registers 337, 338, to the data lines 342. The details of this control will be described in connection with FIG. 24.

The buffer circuit 336 communicates with the maintenance and diagnostic subsystem by means of a cable 346. Cable 346 carries the data from data lines 342, converted to serial form, along with address information for accessing any particular register, and control signals for timing, set enable and indicate enable functions. The details of this arrangement will be discussed in connection with FIG. 18.

One of the data lines 342, clear line 347, is used to clear the registers 337, 338, over the maintenance and diagnostic subsystem. A set enable signal on one of leads 340, together with a clear signal on lead 347, causes the appropriate one of registers 337, 338, to be cleared by a signal on leads 348, 349, respectively. This permits clearing a register without the necessity of writing all zeros into that register over data lines 342.

It will be noted that each of registers 337, 338, has normal communication paths 350, 351 respectively, to communicate with the balance of the module in which they are located. These normal communication paths have been described in detail in connection with FIGS. 3 through 14. It is apparent, then, that the access paths illustrated in FIG. 17 are completely separate and independent of the normal operating connections within the module. Moreover, these maintenance and diagnostic interconnections are also completely separate and independent of the intermodule connections through the interface switching circuits, as illustrated schematically in FIG. 2.

Figure 18:
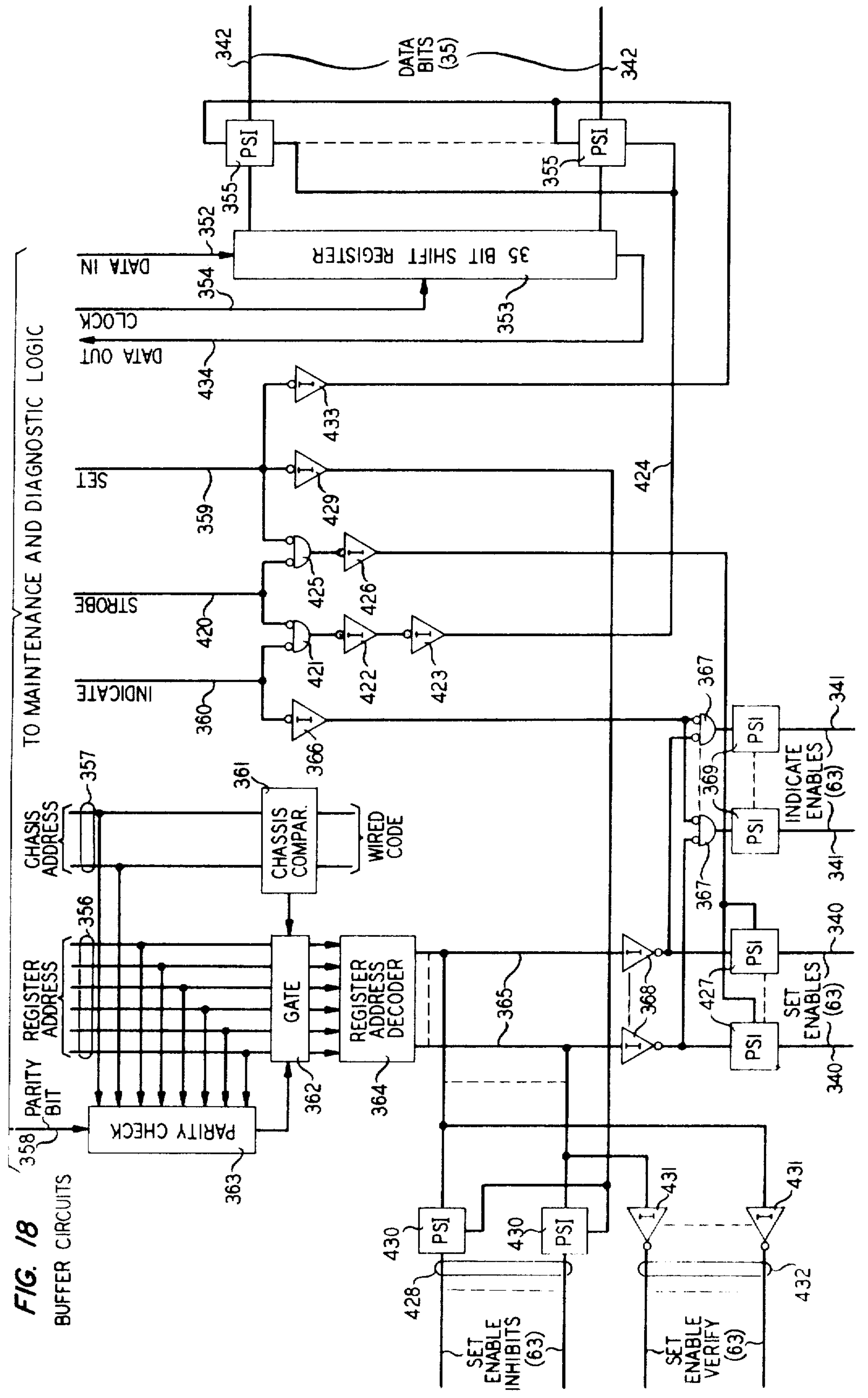
FIG. 18 is a detailed block diagram of the buffer circuit shown in block form in FIG. 17.

In FIG. 18 there is shown a detailed diagram of the buffer circuits 336 shown in the block form in FIG. 17. In general, the buffer circuits of FIG. 18 perform the following functions: receiving data from the maintenance and diagnostic subsystem; setting data into one of the internal registers of the module in which it is located; reading data from one of the internal registers of the module in which it is located; and transmitting data from the module to the maintenance and diagnostic subsystem. At least one buffer circuit as illustrated in FIG. 18 is provided for each of the modules illustrated in FIG. 2. Additional buffer circuits can be provided in those modules requiring the servicing of more than 63 different registers.

Data is transferred from the maintenance and diagnostic logic 331 to the buffer circuit of FIG. 18 in serial form on lead 352. This data is gated in serial fashion into shift register 353 under the control of clock signals on lead 354. In a similar fashion, data is transferred from the shift register 353 to the maintenance and diagnostic logic 331 in serial form on a lead 434. If it is desired to write data into a module register, that data is first transferred serially into register 353. The write data is then transferred in parallel to the selected register on leads 342. If it is desired to read data from a module register, parallel data on leads 342 is first transferred to shift register 353. The read data is then transferred serially to the maintenance and diagnostic logic 331. Transfers to the internal registers of the modules by way of data lines 342 takes place through pulse set and indicate circuits 355 which provide bilateral switching capabilities.

Register address and control signals are supplied in parallel to the buffer circuit of FIG. 18 from the maintenance and diagnostic logic 331. The register address appears on leads 356 and indicates the identity of one of 63 registers in binary coded form. At the same time, a chassis address appears on leads 357. The chassis address is used to distinguish between different buffer circuits if more than one is provided on the same module. The two binary bits permit distinguishing up to four different buffer circuits in the same module. A single parity bit for the register address is also provided on lead 358. At the same time, either a set signal appears on lead 359 or an indicate signal appears on lead 360.

Modules having more than one buffer circuit receive the same chassis address on leads 357. This chassis address is compared in compare circuit 361 with a permanently wired chassis code different for each buffer circuit in the module. Where a match occurs, a signal is generated to partially enable gate 362. The parity of the signals on leads 356 and 357 is determined in parity check circuit 363 and compared to the parity bit on lead 358. If a match occurs, a signal is generated to complete the enablement of gate 362.

When fully enabled, gate 362 transfers the register address on leads 356 to register address decoder 364 which decodes the six-bit register address into a signal on one out of 63 output lines 365.

When it is desired to read data from a register, a signal appears on indicate lead 360. This indicate signal, by way of inverter circuit 366, is ANDED in one of AND-gates gates 367 with a signal from one of leads 365, by way of one of inverter circuits 368, to provide a signal to one of pulse set and indicate circuits 369. The output from one of PSI circuits 369, corresponding to the register identified by the code on leads 356, is applied to one of indicate enable leads 341 (FIG. 17). This indicate enable signal permits the contents of the identified register to be applied to data lines 342. A strobe timing signal on lead 420 is combined with the indicate signal on lead 360 in gate 421 and applied, by way of inverters 422 and 423, to PSI circuits 355. This signal on lead 424 provides a set enable to the PSI circuits 355 to pass signals on to shift register 353 and thus enter the data word into register 353.

Conversely, when it is desired to write data into a module register, a set signal appears on lead 359. This set signal, by way of inverter circuit 433, is used to provide an indicate enable signal to the PSI circuits 355, thereby allowing the contents of shift register 353 to be gated on data lines 342. The set signal is also combined with the strobe signal on lead 420 in gate 425 and applied, by way of inverter circuit 426 to enable PSI circuits 427. When enabled, one of PSI circuits 427 applies a set enable signal to one of leads 340. This signal permits the data on data lines 342 to be set into the identified register as described with reference to FIG. 17.

Means are provided to inhibit the set enable function by the operating circuits when setting data into these module registers would interfere with other operations taking place. In order to inhibit the set enable function or any register, an inhibit signal is placed on the appropriate one of set enable inhibit leads 428. When a set operation is attempted, the set signal on lead 359 is applied by way of inverter 429 to PSI circuits 430 to allow the inhibit signal on leads 428 to clamp the output of decoder 364 to the state preventing operation. No set enable signal can then be generated on the corresponding one of leads 340. In order to verify each set enable, the output of decoder 364 is returned, by way of inverters 431 and set enable verify leads 432, to the maintenance and diagnostic subsystem.

To summarize, a complete sequence of events at the buffer circuit of FIG. 18 consists of an input data interval, a control interval, and an output data interval. For write or set operations, data is serially gated into shift register 353 during the input data interval. For read or indicate operations, the input data interval does not serve a useful purpose. During the control interval, address and control information are decoded and the appropriate set or indicate operation is initiated at the addressed module register. During the output data interval, the contents of the shift register 353 are returned to the maintenance and diagnostic logic 331 via serial data transfer. The returned data word will be the contents of the addressed module register for indicate operations or will be the word previously delivered during the input data interval for setting in the module register for the set operation.

It will be noted that the circuit of FIG. 18 is duplicated at least once for each of the modules of the data processing system. Similarly, the interconnection between the buffer circuit of FIG. 18 and the maintenance and diagnostic subsystem are also duplicated for each module. Where more than one buffer circuit is used in a single module, the connections are wired in parallel to all of the buffer circuits. Output signals are ORed together to provide a single set of signals for the module.

Before proceeding to a more detailed description of the maintenance the diagnostic subsystem in accordance with the present invention, it will be first noted that all of the circuits of the data processing system heretofore illustrated are made up of a few basic types of logic circuits. Each of these basic types will be illustrated in detail and descriptions provided of their specific operations.

Thus, in FIG. 19A, there is shown a detailed circuit diagram of a basic gate circuit 370 comprising a plurality of transistors 371 through 373, the bases of which are connected to a corresponding one of input terminals 374 through 376, and all of the collectors connected to a single output terminal 377 of the gate circuit 370. The biases from source 378 on the transistors 371 through 373 are arranged such that the voltage on output terminal 377 remains at a high voltage level only if all of the transistors 371 through 373 remain in an OFF condition.

An input signal at any one of input terminals 374 through 376 turns on the corresponding one of transistors 371 through 373 and thus reduces the voltage at output terminal 377 to near zero volts. If the high voltage condition is taken as binary "1" and the zero volt condition taken as a binary "0," the circuit of FIG. 19A can be described by the truth table of FIG. 19D, where FIG. 19D is limited to two input signals. The gate of FIG. 19A can be described alternatively as a NAND gate, illustrated schematically in FIG. 19B, or a NOR gate, illustrated schematically in FIG. 19C. The Boolean expression for the outputs of these gates are shown in the figures. This particular configuration was chosen as a basic gate because of the versatility of this basic logic function. Moreover such basic gates are preferably fabricated in integrated circuit form and thus large numbers of said gates can be concentrated in very small physical areas.

In FIG. 20A there is shown a basic configuration of flip-flop circuit 380 comprising two transistors 381 and 382 cross-coupled in the basic multivibrator configuration and including input terminals 383 and 384 and having output terminals 385 and 386. Input terminal 383 may be termed the "set" input terminal while 384 may be considered the "clear" input terminal. Similarly, output terminal 385 may be considered the "0" output terminal and terminal 386 may be considered the "1" output terminal. The flip-flop symbol is illustrated in FIG. 20B. Such a flip-flop has the well-known properties of assuming either of two stable states until triggered to the other state by an input trigger signal.

Figure 21A:
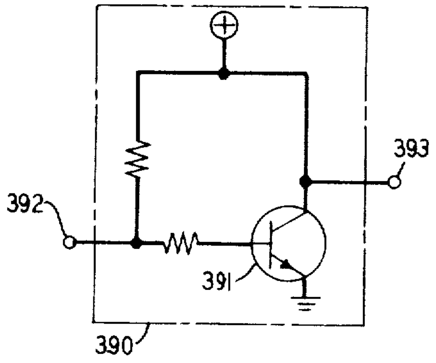
FIGS. 21A and 21B are a circuit diagram and symbols, respectively, of an inverter circuit useful in realizing the circuits of the remainder of the drawings.
Figure 21B:
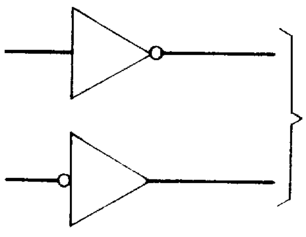

In FIG. 21A, there is shown an inverter circuit 390 comprising a transistor amplifier 391 having an input terminal 392 and an output terminal 393. Input terminal 392 is connected to the base of transistor 391 while output terminal 393 is connected to the collector of transistor 391. The inverter circuit 390 has the property of producing, on its output terminal 393, a binary signal which is inverse of the binary signal at its input terminal 392. In FIG. 21B there are shown two alternative symbols representing the inverter circuit of FIG. 21A.

Figure 22A:
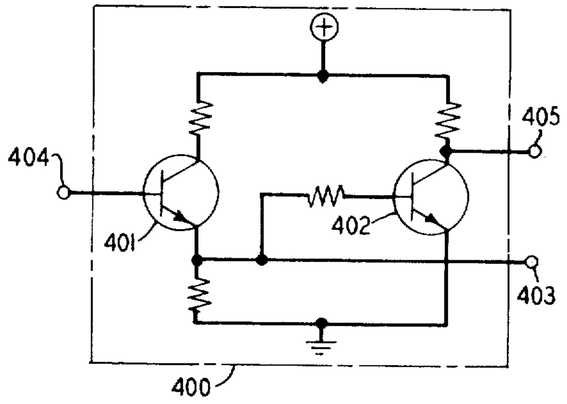
FIGS. 22A and 22B are a circuit diagram and symbol, respectively, of an emitter follower circuit useful in realizing the circuits of the remainder of the drawings.
Figure 22B:
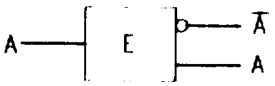

In FIG. 22A, there is shown an emitter follower circuit 400 including transistors 401 and 402. Transistor 401 is connected in a standard emitter follower configuration and provides on output terminal 403 a signal identical to the signal at input terminal 404. Transistor 402 is connected in the standard common emitter configuration and provides, on output terminal 405, a signal which is inverse of the signal at terminal 403. The symbol of the emitter follower of FIG. 22A is shown in FIG. 22B.

Figure 23A:
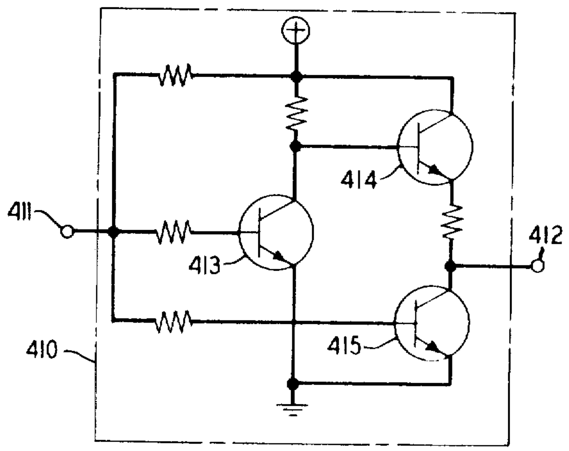
FIGS. 23A and 23B are a circuit diagram and symbol, respectively, of a cable driver circuit useful in realizing the circuits of the remainder of the drawings.
Figure 23B:
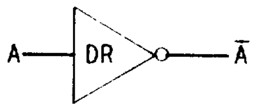

In FIG. 23A there is shown a circuit diagram of a cable driver 410 having an input terminal 411 and an output terminal 412. Included in driver circuit 410 are three transistors 413, 414 and 415. Together, these transistors form a two stage power amplifier which is used to drive binary signals through lengths of cable to the various components of the data processing system. The signal at output terminal 412, however, is the inverse of the signal at input terminal 411. A symbolic representation of the cable driver of FIG. 22A is shown in FIG. 23B.

Figure 24B:
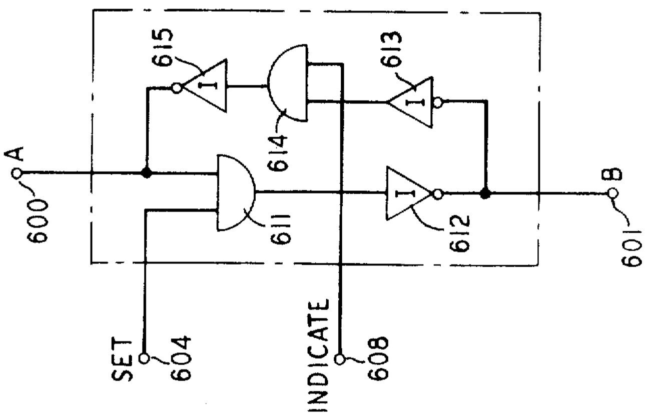
FIGS. 24A and 24B are a detailed circuit diagram and a logic diagram, respectively, of a pulse set and indicate circuit useful in the implementation of the circuits of the present invention.
Figure 24A:
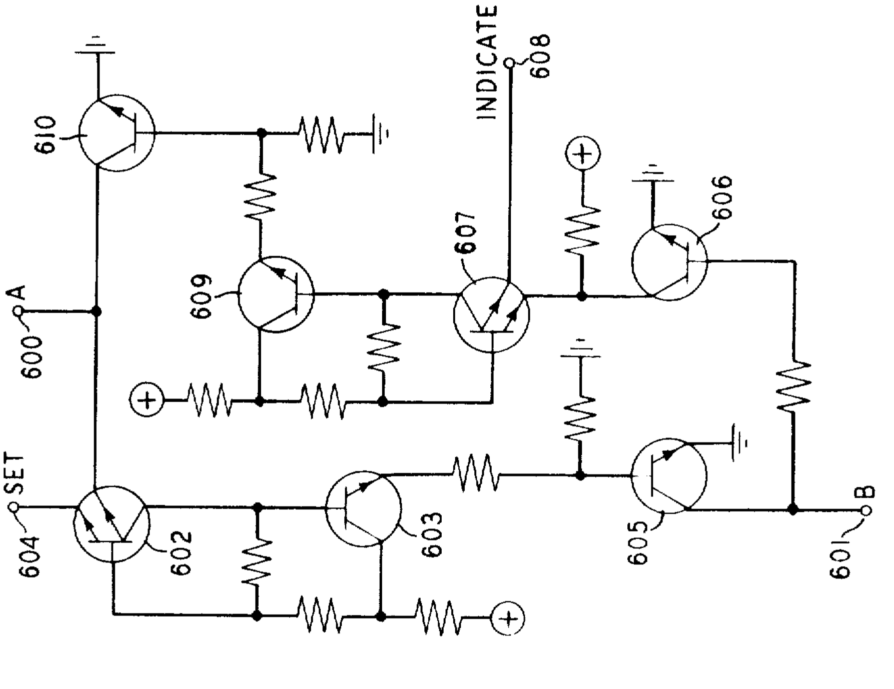

In FIG. 24A, there is shown a detailed circuit diagram of a pulse set and indicate circuit suitable for use in the circuits of FIGS. 17 and 18. In general, the pulse set and indicate (PSI) circuit of FIG. 24A is an isolation circuit to provide isolation between terminals 600 and 601. Thus, terminal 600 is connected to one emitter of dual emitter transistor 602, the collector of which is connected to the base of transistor 603. The other emitter of transistor 602 is connected to the set input terminal 604.

The emitter of transistor 603 is connected to the base of transistor 605, the collector of which is connected to terminal 601. The above-described connection permits transmission from terminal 600 to terminal 601 under the control of signals at terminal 604.

Similarly, terminal 601 is connected to the base of transistor 606 the collector of which is connected to one emitter of dual emitter transistor 607. The other emitter of transistor 607 is connected to indicate input terminal 608. The collector of transistor 607 is connected to the base of transistor 609 the emitter of which drives the base of transistor 610. The collector of transistor 610 is connected to terminal 600. This latter circuit connection permits transmission from terminal 601 to terminal 600 under the control of signals at terminal 608.

The operation of the pulse set and indicate circuit of FIG. 24A can be more easily seen in the logic circuit of FIG. 24B. In the circuit of FIG. 24B, terminals 600 and 604 are connected to the inputs of AND-gate 611, corresponding to dual emitter transistor 602 in FIG. 24A. The output of AND-gate 611 is connected to terminal 601 through inverting amplifier 612, corresponding to transistors 603 and 605.

Terminal 601, in turn, is connected through inverting amplifier 613 (corresponding to transistor 606) to one input of AND-gate 614, corresponding to dual emitter transistor 607. The other input to AND-gate gate 614 is connected to terminal 608. The output of AND-gate 614 is connected through inverting amplifier 615, corresponding to transistors 609 and 610, to terminal 600.

In operation, signals on set input terminal 604 control the transmission of signals from terminal 600 to terminal 601 while signals on indicate input terminal 608 control the transmission of signals from terminal 601 to terminal 600.

In FIG. 25 there is shown a general block diagram of the maintenance and diagnostic logic shown as block 331 in FIG. 16, This circuit includes four sequences 500, 501, 502 and 503, each of which accepts test instructions and data from either an input-output channel from IOC 58 (FIG. 3) or from a maintenance and diagnostic console. Thus sequencers 500 and 501 are each connected to a different console by way of lines 504 and 505, respectively, while sequencer 502 is connected to IOC channel 506 and sequencer 503 is connected to IOC channel 507.

Two maintenance data switches 508 and 509 are provided to control communications with the operating modules of the data processing system. Each of sequencers 500 through 503 has access to each of data switches 508 and 509.

Up to fourteen data tress 510 through 511 are provided to distribute data to 98 modules 512, 513, 514, 515, each data tree being connected to seven modules. Data trees 510, 511, can be controlled by either of data switches 508 or 509, thus permitting communication with any module even when one of data switches 508 or 509 becomes disabled. Each of sequencers 500, 501, 502 and 503 has access to each of data switches 508 and 509 on a first-come, first-served, basis.

In operation, one of the sequences, sequencer 503 for example, accepts a task by way of an instruction from IOC channel 507 and decodes the operation. Sequencer 503 then requests service from the data switches 508 and 509.

The first available data switch accepts the request and sends the test data to the appropriate one of data trees 510, 511. The data tree selected returns the address of the module to be accessed to the maintenance switch and thence to all of the sequencers 500 through 503. The originating sequencer (sequencer 503 in the example), verifies this module address while the other sequencers check to see if that module is participating in a current test. If so, the test is inhibited and access aborted.

If the test is allowed to proceed, the appropriate one of data trees 510 through 511 sends the test data on to the appropriate one of modules 512 through 515. Test results are returned by the same path and sequencer 503 reports the results by way of IOC channel 507. This procedure is repeated for a sequence of tests until the complete test is run.

Figure 26:
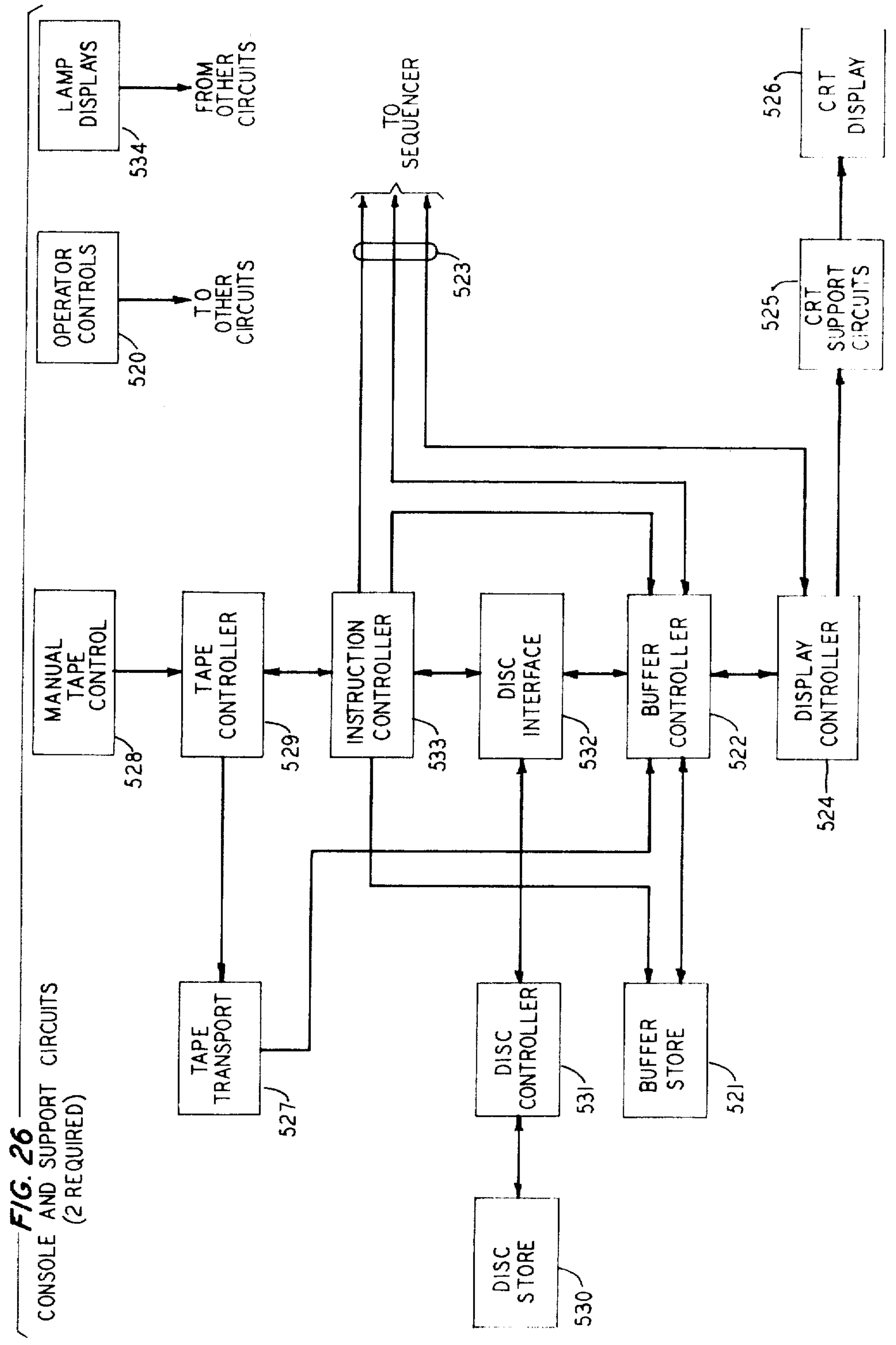
FIG. 26 is a detailed block diagram of the operator console and support circuits shown in block form in FIG. 16.

Before proceeding to a detailed description of the M & D logic of FIG. 25, it will be first useful to describe the maintenance and diagnostic console used with FIG. 25. As noted in connection with FIG. 25, two such consoles are provided to initiate test procedures through the maintenance and diagnostic subsystem. In FIG. 26 there is shown a block diagram of one such console along with its supporting circuits.

The major function of the console of FIG. 26 is fault location by semiautomatic or manual tests if automatic fault isolation is not possible by programmed tests over the IOC channels 506 and 507 in FIG. 25. The console is also very useful in the initial integration of the data processing system and in system recovery after a catastrophic failure. The primary advantage of the console is the placement of an operator in the fault isolation decision-making process to provide flexibility. Initial installation and system recovery utilize special programs which use the console for verification of operation in a step-by-step manner.

In FIG. 26, control commands are initiated manually at the control panel 520 or by programmed sequences stored in buffer store 521 by way of buffer controller 522. These control commands are forwarded to the connected sequencer by way of lines 523 which, in turn, return data which is formatted in display controller 524 and passed on to the display support circuits 525. The support circuits 525 include analog control circuits for the control of a cathode ray tube display 526.

A magnetic tape unit 527 is provided as a storage medium for diagnostic programs. When such a program is required, manual tape control 528 applies signals to tape controller 529 to drive the tape unit 527 to proper position. These programs are then transferred, by way of buffer controller 522, to buffer store 521. Buffer store 521 is a high speed, random access storage medium, such as magnetic core storage, to provide rapid access to the program currently in use. Buffer store 521 also has the system recovery programs in permanent residence.

A disc storage unit 530 contains formatting information as an aid in distinguishing the data received from the various registers of the data processing system. This information is accessed by a disc controller 531 an delivered to disc interface 532. It is then stored in buffer store 521 by way of buffer controller 522. When required, this format information is passed on through display controller 524 and support circuits 525 to display 526.

Instruction sequencers in buffer store 521 are under the control of instruction controller 533 which communicates with the sequencers of FIG. 25. Instructions are passed, one at a time, to one of the sequencers which executes the instruction and returns the results to controller 533. These results are analyzed and displayed, and then the next instruction is accessed from buffer store 521 and passed on to the sequencer. In this way, an entire test program can be automatically executed or can be interrupted at any time by the console operator. The console operator may terminate the test in progress and proceed to a different test if he desires. Major system conditions are reported on a lamp display 534 for the use of the operator. Indicator lamps display the status of the console and the contents of key registers.

In general, the console operator uses switches to select any test program from tape unit 527. The test program is transferred to buffer store 521 and execution begins. If a fault or error arises as these test sequences are being executed, a noncompare is signalled and the automatic execution stops. At this point, the operator proceeds at his own discretion, either selecting other test programs for further fault isolation or using manual tests to isolate the faulty unit.

The operator also has the capability of accessing individual instructions of a test program in buffer store 521 and altering instructions if desired. Similarly, the operator can change test data or even construct small test programs. A step-by-step mode is provided which allows the operator to sequentially step through a program and observe the contents of the register being tested. The operator then initiates the execution of each new instruction.

Figure 27:
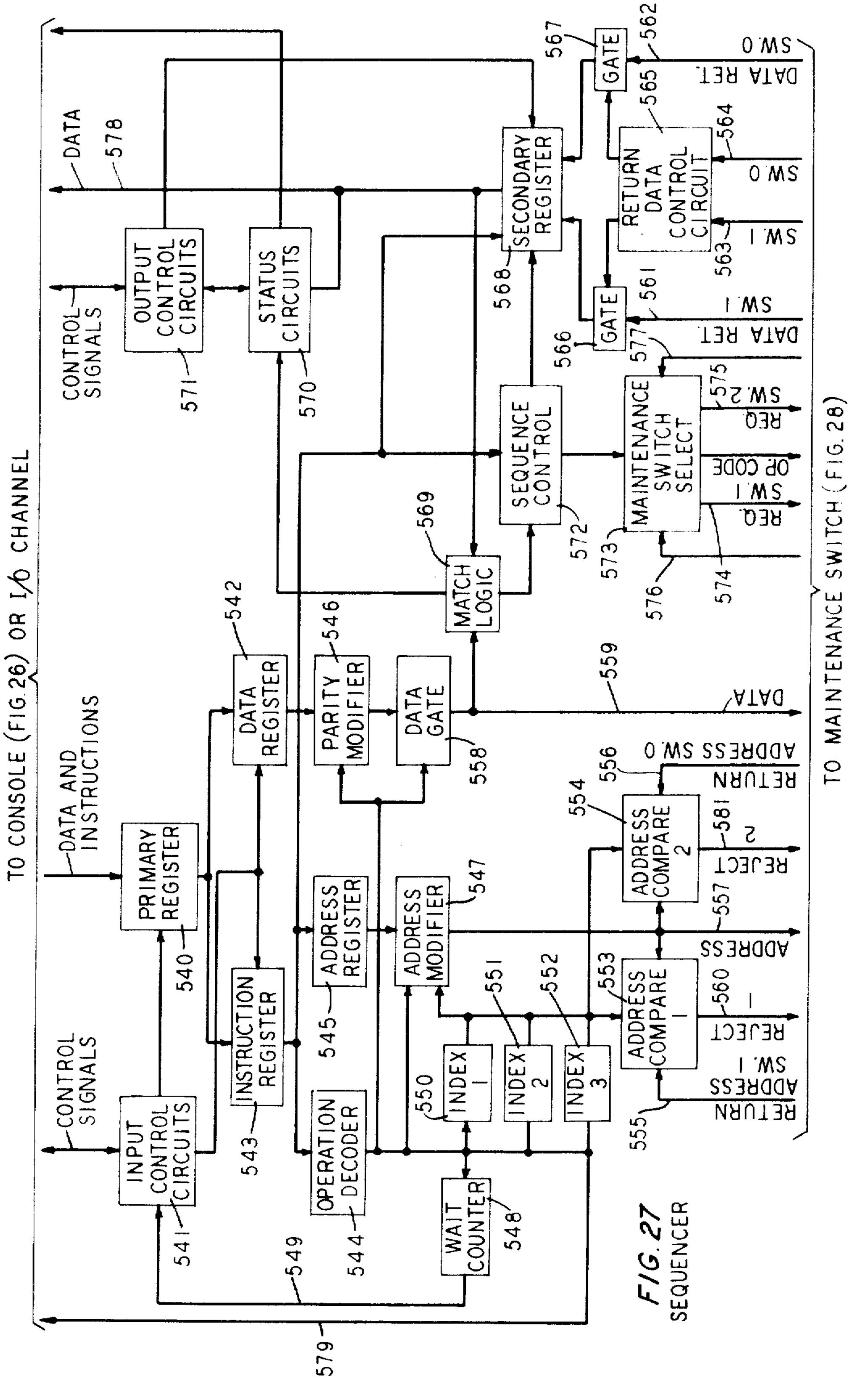
FIG. 27 is a detailed block diagram of the sequencer circuit shown in block form in FIG. 25.

The maintenance and diagnostic sequencer shown as blocks 500 through 503 in FIG. 25 is illustrated in detail in FIG. 27. In general, the sequencer of FIG. 27 executes the maintenance and diagnostic programs by using either of the two maintenance data switches 508 or 509 (FIG. 25) to access all of the modules of the data processing system. Each of the four sequencers may interface with an operator console or with a channel to the input-output controller. The sequence of operations are virtually identical for either application and will be discussed together.

The four sequencers are completely independent and the failure in one will not affect the others. This permits the maintenance of the failed equipment in the maintenance and diagnostic system itself to be performed by the operating portions of that maintenance and diagnostic system.

The sequencer of FIG. 27 requests input from the console IOC or channel, decodes the instruction portion of the data received, notifies the appropriate equipments of their tasks, passes data and instructions on to the maintenance switches, monitors certain tasks to assure completion and returns specified test data to the console or IOC channel.

It can be seen that the sequencer of FIG. 27 performs two major tasks, i.e., reading data from one of the registers of the operating modules, or setting data into one of the registers of the operating modules. Each of these tasks is performed under program control, by way of instructions and data delivered to primary register 540. Control signals such as requests and acknowledgements are delivered to input control circuits 541. The information delivered to primary register 540 includes both data and instructions. The data is delivered to data register 542 while the instructions are delivered to instruction register 543. Each instruction includes an operation portion and an address portion. The operation portion is delivered to operation decoder 544 while the address portion is delivered to address register 545.

It is sometimes desired to force the parity of data words to an erroneous parity condition in order to test the parity checking circuits of the operating system. A parity modifier circuit 546 is, therefore, provided, under the control of operation decoder 544, to selectively set parity in the data words. Similarly, an address modifier circuit 547 is provided to selectively modify the addresses in address register 545.

A wait counter 548 is provided into which a number may be written by operation decoder 544. This count is counted down to zero and, in the meantime, the sequencer of FIG. 27 is inhibited from receiving new data or new instruction by way of inhibit lead 549 to input control circuits 541.

Each address in register 545 includes a module address as well as a register address within the module. Since many test sequences involve successive tests in the same module, the module addresses are stored in the sequencer of FIG. 27 in the index registers 550, 551 and 552. Thus, up to three different modules can be involved in a test sequence and these module addresses stored in index registers 550, 551 and 552. Moreover, in order to prevent other sequences from inadvertently setting data into one of these modules, these module addresses are compared in address compare circuits 553 and 554 with return addresses from the maintenance switches on leads 555 and 556 respectively. If no inhibit is encountered, the modified address is delivered to the maintenance switch of FIG. 28 by way of lead 557. The data for a particular test is delivered by way of data 558 from parity modifier circuit 546 to data line 559. Address comparators 553 and 554 are also used to compare the address on line 557 with the return addresses on lines 555 and 556. These return addresses are generated by the maintenance switch and data tree in the course of providing the appropriate access to requested module. If these addresses do not match up, reject signals are generated on leads 560 and 561, respectively, to prevent the completion of the test.

After the test is completed at the addressed module, test data is returned to the sequencer of FIG. 27 by way of line 561 from maintenance switch 1 or by way of line 562 from maintenance switch 0. Control signals from the two maintenance switches are also returned by way of leads 563 and 564 to return data control circuit 565. Control circuit 565 operates data gates 566 and 567 to enter the returned data in to secondary register 568. This returned data is applied to a magic logic circuit 569 to which there is also applied the transmitted data on data line 559. Match logic circuits 569 compares the returned data with the data transmitted, and if an appropriate match does not occur, transmits a signal to status circuits 570 to indicate this condition. This error signal can be used by way of output control circuits 571 to terminate the current test sequence and alert the console operator to the test failure condition.

If the match logic circuit 569 determines that the returned data is correct, the signal is sent to sequence control circuit 572 to continue the test. Sequence control circuit 572 transmits the next test instruction from instruction register 543 through maintenance switch select circuit 573 to the available one of the maintenance switches. This is accomplished by sending a request signal to each of the maintenance switches on leads 574 and 575. The maintenance switch first replying, by way of acknowledgement lead 576 or 577, is selected to perform the next test instruction transmission and the other maintenance switch is locked out.

The overall operation of the sequencer 27 can be summarized as follows: each of the major data instruction and address lines to the sequencer of FIG. 27 has associated with it control lines to provide control signals and timing signals for the data on the associated line. If the timing of these control signals is incorrect, a status bit is set in the status circuits 570. The pattern of status bits in status circuits 570 can be read out on data line 578 under the control signals from output control circuits 571.

The primary register 541 receives and holds data with parity from the console or the input-output channel. The instruction register 543 holds signals from primary register 540 to provide control signals by way of operation decoder 544 to the secondary register 568, the parity modifier 546, the address modifier 547, the wait counter 548, and the index registers 550 through 552. In addition, operation decoder 544 returns acknowledgement signals by way of lead 579 back to the console or the IOC channel.

The secondary register 568 receives data from either of the maintenance switches or from the operation decoder 544. When a request is sent to a selected maintenance switch, secondary register 568 is enabled to receive the return data from the maintenance switch. The secondary register 568 delivers this data by way of line 578 to the console or the IOC channel.

The match logic circuit 569 monitors the output of data gate 558 and secondary register 568 and provides control signals to sequence control circuits 572. These signals indicate data matches and are used by sequence control circuit 572 to compare tasks and to check returned data from the maintenance switches. The maintenance switch select circuit 573 receives requests for reading or writing data into or from a module register and controls the transmission of these requests to the two maintenance switches.

It can be seen that the sequencer of FIG. 27 executes one instruction to completion before accepting the next instruction. When an instruction execution has been completed, the sequencer of FIG. 27 requests data from the console or the IOC channel by way of input control circuits 541. Data is then transmitted to primary register 540 and then on to instruction register 543 and operation decoder 544 for decoding to determine further action.

Instructions in register 543 may be executed more than once in response to control signals. The execution of each instruction involves the transmittal of address information on line 557 and data on line 559 via the maintenance switches and the data trees to the addressed module. As discussed in connection with FIG. 18, data is returned following the set enable or indicate enable operations. This return data is analyzed and appropriate action taken, usually including returning the data by way of line 578 to the source originating the instruction. Each transmission of return data from secondary register 568 is accomplished by sending a data request by way of output control circuit 571 and receiving a data acknowledgement. The status circuits 570 may be wired directly to the operator console to be indicated on operator displays or is gated to return data line 578 in the case of an IOC channel. After the completion of these operations, the sequencer of FIG. 27 is again available for the execution of further instructions and the cycle is reinitiated by control circuits 541.

Figure 28:
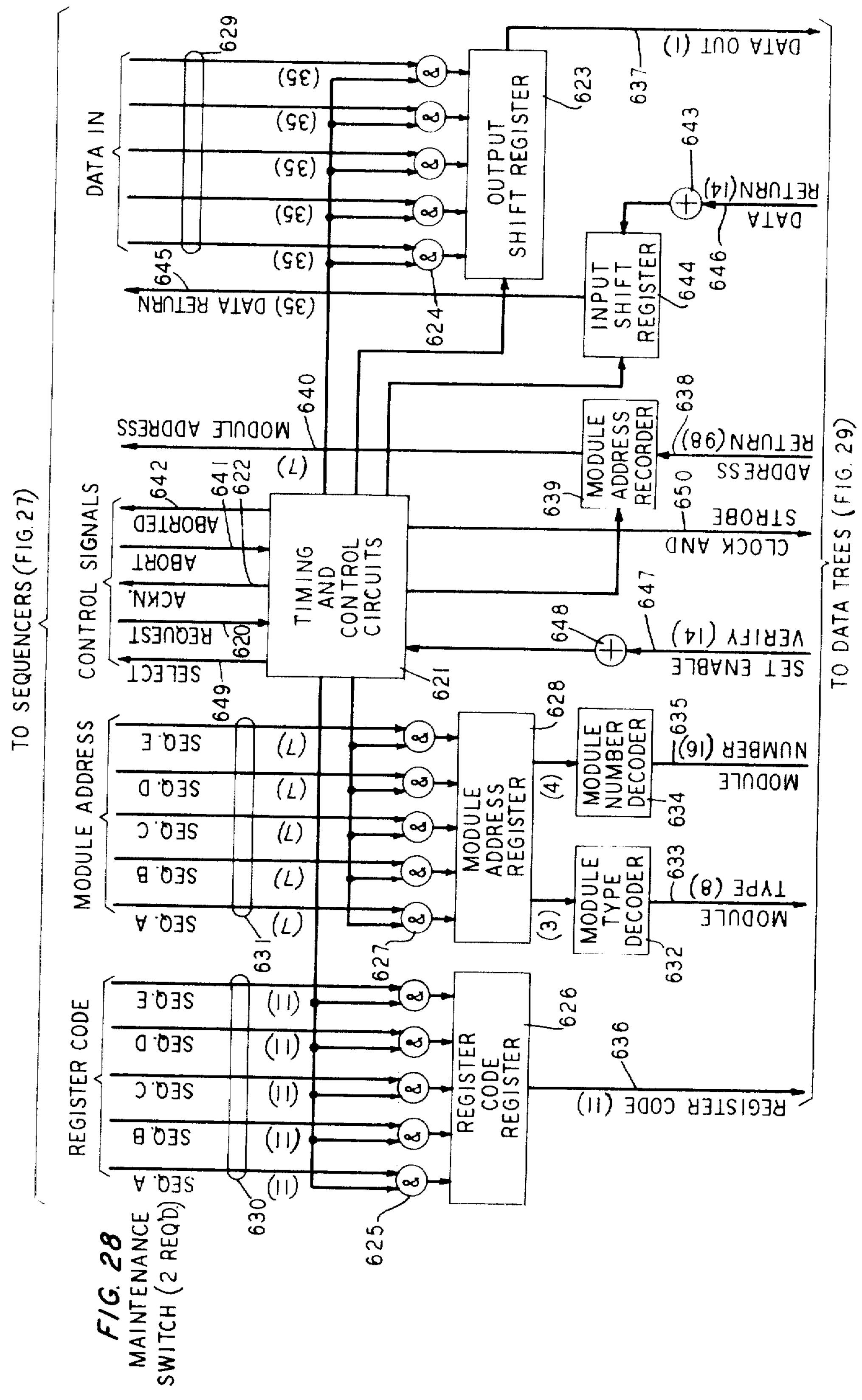
FIG. 28 is a detailed block diagram of the maintenance switch shown in block form in FIG. 25.

In FIG. 28 there is shown a detailed block diagram of one of the maintenance switches shown as blocks 508 and 509 in FIG. 25. In general, the maintenance switch of FIG. 28 accepts data and instructions from any one of the sequencers (FIG. 27) and delivers that data and instructions to an appropriate one of data trees 510 through 511 (FIG. 25).

Requests for service are delivered to the maintenance switch of FIG. 28 on lead 620 to timing and control circuit 621. Timing and control circuit 621 ascertains whether or not the maintenance switch is available and, if so, returns an acknowledgement on lead 622 and gates the data into output shift register 623 by way of one of gates 624 from the appropriate sequencer. Timing and control circuit 621 also gates the register code from the appropriate sequencer by way of one of gates 625 to register code register 626, and the module address by way of one of gates 627 to module address register 628.

The data appears on 35 parallel leads on one of cables 629. The register code appears in parallel on eleven parallel leads in one of cables 630, and the module address appears on seven parallel leads in one of cables 631. It will be noted that provision is made for up to five sequencer inputs. This corresponds to the four sequencers of FIG. 25 with provision for one additional spare sequencer.

The 11 bits of the register code on one of cables 630 includes six bits of register address, two bits of chassis address, two bits for set and indicate signals and one parity bit. The use of these signals in the operating modules has been described in detail with reference to FIG. 18.

The module address on cables 631 includes three bits to encode the module type and four bits to encode the module number. The module types have been described with reference to FIG. 2. Since the maximum number of each kind of module is sixteen and four bits are adequate to encode the module number.

The three bits of module type identification in module address register 628 are applied to module type decoder 632 to produce an output on one-out-of-eight output leads 633. Similarly, the four-bit module number is applied from module address register 628 to module number decoder 634. This four-bit code is decoded in the decoder 634 to provide an output in one-out-of-sixteen output leads 635. It can be seen that the signals on leads 633 and 635 are sufficient to completely identify any module of the data processing system.

The register code on cable 636, the module type and module number on leads 633 and 635, and the data on output lead 637 are all supplied to each of the data trees illustrated in block form in FIG. 25. That data tree which communicates with the identified module returns an address indication on one-out-of-98 leads 638. This address return is applied to a module address recoder 639 where the signal on one-out-of-98 leads is converted to a seven-bit binary number on cable 640. It can be seen that recoder 635 performs the function inverse to that of decoders 632 and 634. The module address returned on cable 640 is used in the sequencer of FIG. 27 for verification purposes and to lock out modules engaged in tests already in progress. For this purpose, an abort signal is provided on lead 641 to disable the gates 625, 627, and 624, clear the instructions and data and return an abort acknowledge signal on lead 642.

Data returned from the operating modules are combined in OR-gate 643 and applied to input shift register 644. This data is then provided in parallel on 35 data leads 645 to the sequencer. There are fourteen data return leads 646, one corresponding to each of the data trees 510 through 511 of FIG. 25. Also returned from the operating module is a set enable verify signal on one of fourteen leads 647. As was noted in connection with FIG. 18, the set enable verify signals indicate that the set enable has been implemented at the buffer circuit. These set enable verify signals are combined in OR-gate 648 and applied to timing and control circuits 621. They cause a select signal to appear on leads 649 to be returned to the sequencer to indicate this condition. Timing and control circuits 621 also provide clock and strobe signals on leads 650 for use in the buffer circuit.

IN FIG. 29 there is shown a detailed block diagram of a data tree useful for the data trees 510 through 511 of FIG. 25. Each data tree includes seven selectors 600 through 666 and identified as the S through Y selectors. The selector circuits 660 through 666 receive the module type and module number signals from each of the maintenance switches on leads corresponding to leads 667 and 668 and provide the return address on leads corresponding to lead 669.

Each of selectors 660 through 665 controls a pair of gates, one corresponding to each of the maintenance switches. These gates are identified by reference numerals 670 through 683. The even-numbered gates correspond to maintenance switch 1 while the odd-numbered gates correspond to maintenance switch 0. Thus, signals on cable 684 from maintenance switch 1 are applied in parallel to each of the even-numbered gates, while signals on cable 685 from maintenance switch 0 are applied in parallel to each of the odd-numbered gates. Cables 684 and 685 each carry sixteen bits including eleven bits of register code, a serial pulse data line, and four clock and strobe lines.

When operated, each of gates 670 through 683 permits the application of the 16 outgoing lines to one of combining gates 686 through 692. Since signals arrive from only one of the maintenance switches at a time, only one of each pair of gates 670 through 683 operates. The 16 bits on cable 684 or 685 is therefore delivered through one of OR-gates 686 through 692 and through a corresponding one of cable driver circuits 693 through 699 to the corresponding one of output cables 700 through 706.

Each of output cables 700 through 706 is connected to a specific one of the operating modules of the data processing system. The signals on these cables are used, as described in connection with FIG. 18, to control the writing and reading of test data in the operating modules. Three signals are returned from each operating module on one of cables 707 through 713. These signals include a serial data return line and the set enable verify lead. These signals are returned through the odd-numbered ones of gates 670 through 683 to OR-gate 707, or through the even-numbered ones of gates 670 through 683 to OR-gate 708. The signals are combined by the OR-gate 708 on cable 709 for return to maintenance switch 1, and are combined in OR gate 707 on cable for return to maintenance switch 0.

A maintenance and diagnostic subsystem has been described which is suitable for gathering and distributing test signals in a large data processing system. Moreover, these test signals are distributed and collected by means of a data bussing system which is completely independent of the normal data paths in the data processing system. For this reason, maintenance and diagnostic activities can take place during the operation of the system. This permits greater efficiency in system operation because it is not necessary to withdraw the system from use for routine maintenance. Furthermore, it is not even necessary to burden the normal operating system with these maintenance functions. Due to the modular construction of the data processing system, it is also possible to withdraw single modules from the operating system for maintenance and diagnostic purposes.

What is claimed is:

1. A modular data processing system comprising
- a plurality of modules interconnected by normal data paths to form a data processing system,
- a source of automatic maintenance and diagnostic control signals,
- means independent of said normal data paths for interconnecting said source and said modules, and
- means, responsive to said control signals and utilizing said independent interconnecting means, for testing said modules while said module is an operational part of said data processing system.

2. The modular data processing system according to claim 1 wherein said source of control signals includes a manually controlled console.

3. The modular data processing system according to claim 1 wherein said source of control signals includes at least one of said modules which is under program control.

4. The modular data processing system according to claim 1 wherein said independent interconnecting means includes a time-shared data bus within each of said module for accessing the registers of that module on a time-division basis.

5. The modular data processing system according to claim 2 wherein said console includes slow access storage means and fast access storage means, means for transferring data for current use from said slow access storage means to aid fast access storage means, and means for distributing data from said fast access storage means sequentially to said independent interconnecting means.

6. The modular data processing system according to claim 4 further including means for setting data into any register of each said module, and means for indicating the data stored in any register of each said module.

7. The method of detecting and isolating faults in a data processing system comprising the steps of 1. exercising said data processing system by programs utilizing the normal data paths in said data processing system, on a regular schedule,
2. in response to the detection of an error condition in step 1, manually initiating more detailed semiautomatic test sequences over data paths separate and independent from said normal data paths, said semiautomatic test sequence continuing automatically until a fault is detected, and then operating an alarm,
3. on failure of step 2 to isolate a fault to a single replaceable unit, initiating manual testing sequences over said separate data paths to identify said single replaceable unit.

8. An automated testing and diagnostic system for a digital computer comprising, a data bussing system for providing access to selected storage points in said digital computer, said bussing system being separate and independent from the data paths used for computation in said computer, a source of a sequence of test instructions for reading and writing data from and into said selected storage points, and instruction distribution means for sequentially utilizing said test instructions to execute specified tests and return test data over said data bussing system.

9. The automated testing and diagnostic system according to claim 8 wherein said instruction source includes a manually operated control console.

10. The automated testing and diagnostic system according to claim 8 wherein said instruction source includes the internal storage of said digital computer.

11. The automated testing and diagnostic system according to claim 8 wherein said data bussing system includes time-shared data links to a plurality of said selected storage points.

12. The automated testing and diagnostic system according to claim 11 wherein each said time-shared data link includes bilateral switching means for gating signals selectively in either direction on said link.

13. The automated testing and diagnostic system according to claim 9 wherein said console includes magnetic tape storage means for storing a plurality of said sequences of test instructions for possible use, a magnetic core storage means for storing one of said sequences of test instruction for current use, and means for transferring said one sequence of test instructions from a magnetic tape storage means to said magnetic core storage means.

14. In combination a plurality of data processing units, a plurality of data storage units, means for interconnecting each of said units of each type to all units of all different types to form an operative data processing system, a automatic fault detection and isolation unit, and a data bussing system independent of said interconnecting means for connecting each of said units to said fault detection and isolation unit.

15. The combination according to claim 14 further including time-shared data links within each said unit for connecting storage elements in each unit to said data bussing system.

16. The combination according to claim 15 further including bilateral switching means in each said time-shared data link for selectively gating data signals in either direction on said link.

17. The combination according to claim 14 wherein said fault detection and isolation unit includes a manually operated control console.

18. The combination according to claim 17 wherein said control console includes means for originating instructions for setting up test conditions over said data bussing system, means for receiving test results over said data bussing system, and means for displaying said test results.

19. The combination according to claim 14 wherein said fault detection and isolation unit includes means for communicating with at least one of said data transfer control units, and means for accessing sequences of test instructions in at least one of said data storage units by way of said communicating means.

20. The combination according to claim 17 wherein said control console includes a magnetic tape unit for bulk storage of a plurality of sequences of test instructions, a magnetic core storage unit for rapid access storage of one of said sequences of test instructions, and means for transferring said one sequence of test instructions from said magnetic tape unit to said magnetic core storage unit.

21. The combination according to claim 20 wherein said magnetic core storage unit further includes a sequence of instructions for bringing said operative data processing system into full operation initially or following a breakdown.

22. A maintenance and diagnostic subsystem for use with a multielement digital computing system including normal data paths interconnecting the elements of said system, said system comprising a source of test instructions for testing the various elements of said digital computing system, a test instruction distributing network for distributing said test instruction to said various elements of said digital computing system, said distributing network being separate from said normal data paths of said digital computing system, means for sequencing through said test instructions, one at a time, means responsive to said test instructions for detecting faults in said elements, and means for disabling said sequencing means in response to said fault detecting means 23. The maintenance and diagnostic subsystem according to claim 22 wherein said source of test instructions comprises the internal memory of said digital computing system, and program means in said digital computing system for controlling said source of test instructions in said internal memory.

24. The maintenance and diagnostic subsystem according to claim 22 wherein said source of test instructions comprises a control console having a repertoire of sequences of said test instructions in storage for prospective use, and means for accessing and utilizing selected ones of said sequences.

* * * * *